(12) United States Patent
Naito et al.

(10) Patent No.: US 9,124,616 B2
(45) Date of Patent: Sep. 1, 2015

(54) COMPUTER SYSTEM MANAGEMENT METHOD AND CLIENT COMPUTER

(75) Inventors: Tomotada Naito, Yokohama (JP);
Makoto Kayashima, Yamato (JP);
Shinichi Tsunoo, Sagamihara (JP);
Hiroshi Nakagoe, Yokohama (JP);
Hiromi Isokawa, Sagamihara (JP);
Norio Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 797 days.

(21) Appl. No.: 12/934,235

(22) PCT Filed: Jun. 28, 2010

(86) PCT No.: PCT/JP2010/061000
§ 371 (c)(1),
(2), (4) Date: Sep. 23, 2010

(87) PCT Pub. No.: WO2012/001763
PCT Pub. Date: Jan. 5, 2012

(65) Prior Publication Data
US 2011/0320508 A1 Dec. 29, 2011

(51) Int. Cl.
*H04L 29/08* (2006.01)
*G06F 17/30* (2006.01)
*G06F 21/55* (2013.01)

(52) U.S. Cl.
CPC .......... *H04L 67/125* (2013.01); *G06F 17/3012* (2013.01); *G06F 17/30575* (2013.01); *G06F 21/554* (2013.01); *H04L 67/22* (2013.01)

(58) Field of Classification Search
CPC ................... G06F 17/30575; G06F 17/3012
See application file for complete search history.

(56) References Cited

U.S. PATENT DOCUMENTS

| 5,745,686 | A | 4/1998 | Saito et al. |
| 5,822,533 | A | 10/1998 | Saito et al. |
| 5,897,643 | A | 4/1999 | Matsumoto |
| 6,067,541 | A * | 5/2000 | Raju et al. ............................. 1/1 |
| 6,119,208 | A * | 9/2000 | White et al. .................. 711/162 |
| 6,408,336 | B1 | 6/2002 | Schneider et al. |

(Continued)

FOREIGN PATENT DOCUMENTS

| JP | 8-292961 | 11/1996 |
| JP | 9-044432 | 2/1997 |

(Continued)

OTHER PUBLICATIONS

Hitachi Software Engineering Co., Ltd, et al.; Information Security Governance; Jan. 31, 2008; pp. 65-66; 117-125 (with partial translation).

(Continued)

*Primary Examiner* — Rehana Perveen
*Assistant Examiner* — Huen Wong
(74) *Attorney, Agent, or Firm* — Foley & Lardner LLP

(57) ABSTRACT

The present invention efficiently displays in a tree structure form a file operation history. A file storage identifier, an operation identifier, and a count are stored as additional meta-information in an alternate data stream with respect to each file stored in a client terminal file system. The operation identifier manages a number of operations (operation generations). The count manages copy frequencies. This meta-information is also sent to a management apparatus, and used for displaying the file operation history in a tree structure form.

11 Claims, 52 Drawing Sheets

(56) References Cited

U.S. PATENT DOCUMENTS

| | | | |
|---|---|---|---|
| 6,412,017 B1 * | 6/2002 | Straube et al. | 719/313 |
| 6,889,231 B1 * | 5/2005 | Souder et al. | 1/1 |
| 6,996,672 B2 * | 2/2006 | Lubbers et al. | 711/114 |
| 7,788,235 B1 | 8/2010 | Yeo | |
| 7,933,870 B1 * | 4/2011 | Webster | 707/638 |
| 7,966,426 B2 * | 6/2011 | Smith et al. | 709/248 |
| 8,011,003 B2 | 8/2011 | Rowney et al. | |
| 8,180,743 B2 | 5/2012 | Claudatos et al. | |
| 8,181,036 B1 | 5/2012 | Nachenberg | |
| 8,191,156 B2 | 5/2012 | Kubo | |
| 8,286,253 B1 | 10/2012 | Lu et al. | |
| 8,341,418 B2 | 12/2012 | Yoshimura | |
| 8,352,535 B2 | 1/2013 | Peled et al. | |
| 8,370,948 B2 | 2/2013 | Troyansky | |
| 8,407,341 B2 | 3/2013 | Gillette et al. | |
| 2002/0095592 A1 | 7/2002 | Daniell et al. | |
| 2002/0099837 A1 | 7/2002 | Oe et al. | |
| 2005/0131902 A1 * | 6/2005 | Saika | 707/10 |
| 2005/0134894 A1 | 6/2005 | Littman et al. | |
| 2005/0144308 A1 | 6/2005 | Harashima et al. | |
| 2005/0288939 A1 | 12/2005 | Peled et al. | |
| 2006/0069809 A1 * | 3/2006 | Serlet | 709/248 |
| 2006/0224589 A1 | 10/2006 | Rowney et al. | |
| 2007/0083938 A1 | 4/2007 | Aoki et al. | |
| 2007/0276866 A1 * | 11/2007 | Bodin et al. | 707/104.1 |
| 2008/0077971 A1 | 3/2008 | Wright et al. | |
| 2008/0077996 A1 | 3/2008 | Kubo | |
| 2008/0109494 A1 * | 5/2008 | Chitre et al. | 707/201 |
| 2008/0263111 A1 * | 10/2008 | Asano et al. | 707/204 |
| 2008/0313198 A1 * | 12/2008 | Kim et al. | 707/100 |
| 2009/0241197 A1 | 9/2009 | Troyansky | |
| 2010/0306456 A1 * | 12/2010 | Schmidberger | 711/103 |
| 2011/0131279 A1 | 6/2011 | Karnik | |
| 2012/0297463 A1 | 11/2012 | Orbach et al. | |
| 2013/0055047 A1 * | 2/2013 | Sharon et al. | 714/764 |
| 2013/0104191 A1 | 4/2013 | Peled et al. | |

FOREIGN PATENT DOCUMENTS

| | | |
|---|---|---|
| JP | 9-054735 | 2/1997 |
| JP | 11-259459 | 9/1999 |
| JP | 2002-288030 | 10/2002 |
| JP | 2003-044297 A | 2/2003 |
| JP | 2005-149243 | 6/2005 |
| JP | 2005-189995 | 7/2005 |
| JP | 2006-302170 | 11/2006 |
| JP | 2007-183911 A | 7/2007 |
| JP | 2007-334386 | 12/2007 |
| JP | 2008-052570 | 3/2008 |
| JP | 2008-102827 A | 5/2008 |
| JP | 2008-130077 A | 6/2008 |
| JP | 2008-181446 | 8/2008 |
| JP | 2009-020812 | 1/2009 |
| JP | 2009-187374 | 8/2009 |
| JP | 2009-237804 A | 10/2009 |
| JP | 2010-003051 | 1/2010 |
| JP | 2010-015543 A | 1/2010 |
| JP | 2010-123112 A | 6/2010 |
| WO | WO-2008/129915 A1 | 10/2008 |
| WO | WO-2009/147855 A1 | 12/2009 |
| WO | WO 2010/074094 | 7/2010 |

OTHER PUBLICATIONS

Ichiyanagi, Yoshimi, et al.; A description model for data access control in Salvia operating system; IPSG SIG Technical Reports; 2005-CSEC-30(33); Jul. 21, 2005; pp. 235-242.

Nikkei BP Government Technology, No. 006; Dec. 15, 2004; pp. 42-48.

PCT International Search Report and Written Opinion on application No. PCT/JP2010/002461 dated Jun. 15, 2010; 11 pages.

PCT International Search Report and Written Opinion on application No. PCT/JP2010/061013 dated Oct. 5, 2010; 7 pages.

PCT International Search Report on Application No. PCT/JP2010/061000 dated Jun. 28, 2010; 3 pages.

USPTO non-final action on U.S. Appl. No. 12/808,130 mailed Jun. 26, 2012; 23 pages.

USPTO non-final action on U.S. Appl. No. 12/937,952 mailed Aug. 29, 2012; 18 pages.

U.S. Appl. No. 12/937,952, filed Oct. 14, 2010, Onodera, et al.

U.S. Appl. No. 12/808,130, filed Jun. 14, 2010, Kayashima, et al.

USPTO Notice of Allowance on U.S. Appl. No. 12/937,952 dated May 15, 2013; 27 pages.

USPTO Notice of Allowance on U.S. Appl. No. 12/808,130 mailed May 27, 2014; 11 pages.

USPTO Final Office Action on U.S. Appl. No. 12/808,130 mailed Jan. 23, 2013; 22 pages.

* cited by examiner

SEQUENCE OF STEPS FOR DIALOG OPERATION MONITORING AND
BROWSER MONITORING WHEN DOWNLOADING VIA BROWSER

SEQUENCE OF STEPS FOR DIALOG OPERATION MONITORING AND BROWSER MONITORING WHEN UPLOADING VIA BROWSER

SEQUENCE OF STEPS FOR DIALOG OPERATION MONITORING AND TCP COMMUNICATION MONITORING WHEN UPLOADING VIA E-MAIL

BROWSER MONITORING FLOWCHART

FILE OPERATION MONITORING FLOWCHART

FIG. 29

EXAMPLE OF FILE OPERATION TRACE (CONTENT OF PC MANAGEMENT DB)

| FID | OID | OPERATION TYPE | OPERATION-SOURCE PATH | OPERATION-DESTINATION PATH | ... |
|---|---|---|---|---|---|
| 00000001 | 0 | FILE CREATION | - | C:\text.txt | |
| 00000001 | 00 | COPY | C:\text.txt | C:\test\text.txt | |
| 00000001 | 000 | RENAME | C:\test\text.txt | C:\test\text2.txt | |
| 00000001 | 0000 | DELETE | C:\test\text2.txt | - | |
| 00000001 | 01 | MOVE | C:\text.txt | D:\text.txt | |
| 00000001 | 010 | DELETE | D:\text.txt | - | |

SEQUENCE OF STEPS FOR FILE OPERATION MONITORING
WHEN PERFORMING FILE OPERATION

FLOWCHART FOR CREATING NEW IN-FILE TRACE INFORMATION

FIG. 35

COUNT-CHARACTER CONVERSION CHART

| COUNT | CHARACTER | COUNT | CHARACTER | COUNT | CHARACTER |
|---|---|---|---|---|---|
| 0 | 0 | 20 | K | 40 | e |
| 1 | 1 | 21 | L | 41 | f |
| 2 | 2 | 22 | M | 42 | g |
| 3 | 3 | 23 | N | 43 | h |
| 4 | 4 | 24 | O | 44 | i |
| 5 | 5 | 25 | P | 45 | j |
| 6 | 6 | 26 | Q | 46 | k |
| 7 | 7 | 27 | R | 47 | l |
| 8 | 8 | 28 | S | 48 | m |
| 9 | 9 | 29 | T | 49 | n |
| 10 | A | 30 | U | 50 | o |
| 11 | B | 31 | V | 51 | p |
| 12 | C | 32 | W | 52 | q |
| 13 | D | 33 | X | 53 | r |
| 14 | E | 34 | Y | 54 | s |
| 15 | F | 35 | Z | 55 | t |
| 16 | G | 36 | a | 56 | u |
| 17 | H | 37 | b | 57 | v |
| 18 | I | 38 | c | 58 | w |
| 19 | J | 39 | d | 59 | x |

EXAMPLE OF FILE OPERATION TRACE (WHEN OID IS 31 DIGITS)

FIG. 39

| FILENAME | SENDER NAME | HASH VALUE |
|---|---|---|
| SPECIFICATION.doc<br>CLIENT LIST.xls | kayashi@sdl.hitachi.co.jp<br>namba@sdl.hitachi.co.jp<br>⋮ | 7c080a1586d1ef8088a38465ebcaba8a<br>ef8088a38465ebca7c080a1586d17c08 |
| 1301 | 1302 | 1303 |

| FID | OID | COUNT |
|---|---|---|
| 9f76f25d-5363-482d-a245-f3154a967edd<br>7d46325f-b3a3-452e-a645-f38540367e74<br>⋮ | 0<br>0 | 0<br>0 |
| 4101 | 4102 | 4103 |

EXAMPLE OF FILE OPERATION TRACE COMPRISING Web/E-MAIL/PRINT

4210

| FID | OID | OPERATION TYPE | OPERATION-SOURCE PATH | OPERATION-DESTINATION PATH | ... |
|---|---|---|---|---|---|
| 9f76f2 ... | 0 | INCOMING E-MAIL | user@test.jp | -(INPUT-SOURCE DB) | |
| 9f76f2 ... | 00 | SAVE ATTACHMENT | -(INPUT-SOURCE DB) | C:\test\text.txt | |
| 9f76f2 ... | 000 | PRINT | C:\test\text.txt | - | |
| 9f76f2 ... | 001 | MOVE | C:\test\text.txt | C:\test\text3.txt | |
| 9f76f2 ... | 0010 | DELETE | C:\test\text3.txt | - | |
| 9f76f2 ... | 01 | SAVE ATTACHMENT | -(INPUT-SOURCE DB) | D:\text.txt | |
| 9f76f2 ... | 010 | Web UPLOAD | D:\text.txt | http://test.jp/test.txt | |
| 9f76f2 ... | 02 | RENAME | C:\text.txt | C:\text2.txt | |

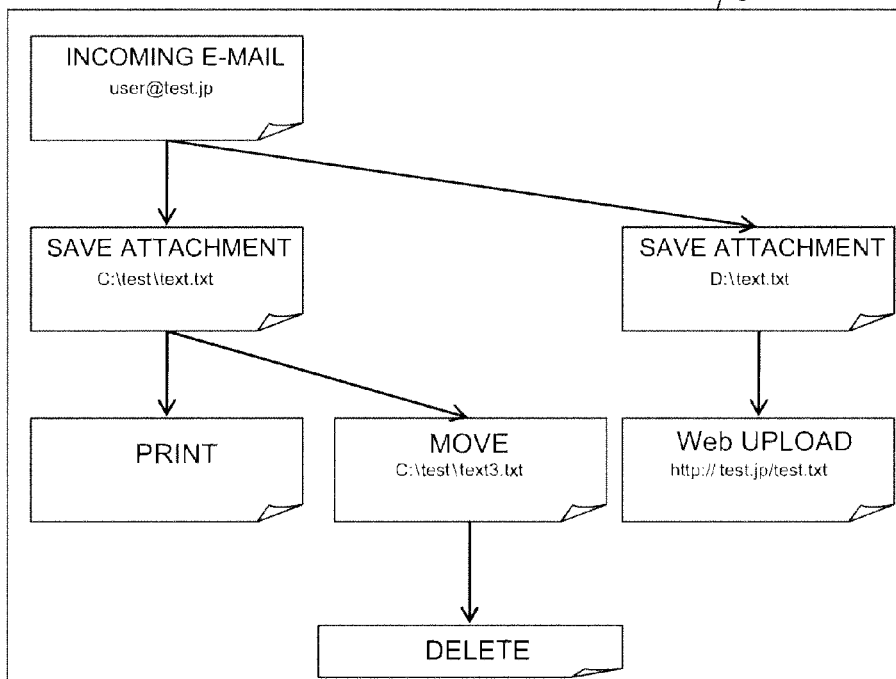

SEQUENCE OF STEPS FOR HTTP COMMUNICATION MONITORING AND FILE I/O MONITORING WHEN DOWNLOADING VIA BROWSER

SEQUENCE OF STEPS FOR TCP COMMUNICATION MONITORING AND FILE I/O MONITORING WHEN UPLOADING VIA MAILER

SEQUENCE OF STEPS FOR TCP COMMUNICATION MONITORING WHEN TRANSFERRING FILE VIA MAILER

FIG. 49

| BROWSER OUTPUT DB DATA | | | | |
|---|---|---|---|---|
| UPLOAD FILE | HASH VALUE | From | Server | URL |
| C:\Test\file.doc | 7c080a1586d1ef8088a38465ebcaba8a | XXX | XXXX | XXXX |
| D:\data.dat | ef8088a38465ebca7c080a1586d17c08 | XXX | XXXX | XXXX |

4902

4902A  4902B  4902C  4902D
4902E

| FID | OID | COUNT |
|---|---|---|
| 9f76f25d-5363-482d-a245-f3154a967edd | 0 | 0 |
| 7d46325f-b3a3-452e-a645-f38540367e74 | 0 | 0 |

| MAIL INPUT DB DATA | | |
|---|---|---|
| FILENAME | SENDER NAME | HASH VALUE |
| SPECIFICATION.doc<br>CLIENT LIST.xls | kayashi@sdl.hitachi.co.jp<br>namba@sdl.hitachi.co.jp<br>⋮ | 7c080a1586d1ef8088a38465ebcaba8a<br>ef8088a38465ebca7c080a1586d17c08 |
| 4903A | 4903B | 4903C |

4903

| FID | OID | COUNT |
|---|---|---|
| 9f76f25d-5363-482d-a245-f3154a967edd<br>7d46325f-b3a3-452e-a645-f38540367e74<br>⋮ | 0<br>0 | 0<br>0 |
| 4903D | 4903E | 4903F |

FIG. 52

| FILENAME | FID | OID | COUNT |
|---|---|---|---|
| C:\test\text2.txt | 9f76f25d-5363-482d-a245-f3154a967edd | 000 | 0 |
| D:\test\text.txt | 9f76f25d-5363-482d-a245-f3154a967edd | 010 | 0 |
| C:\text2.txt | 9f76f25d-5363-482d-a245-f3154a967edd | 02 | 0 |

5601

COMPUTER SYSTEM MANAGEMENT METHOD AND CLIENT COMPUTER

CROSS-REFERENCE TO RELATED APPLICATION(S)

This application is related to U.S. patent application Ser. No. 12/937,952, filed Oct. 24, 2010, and U.S. patent application Ser. No. 12/808,130, filed Jun. 14, 2010.

TECHNICAL FIELD

The present invention relates to a computer system management method and a client computer.

BACKGROUND ART

The system disclosed in Patent Literature 1 is an example of an operation detecting system for detecting either a malicious or a suspicious operation. In the technology described in Patent Literature 1, an administrator (user), after creating an illegal operation pattern beforehand and registering same in a database of a log analysis server, determines risk in accordance with the degree of matching with the contents of a pre-registered user operation log.

CITATION LIST

Patent Literature

PTL 1

Japanese Patent Application Laid-Open No. 2009-20812

SUMMARY OF INVENTION

Technical Problem

The operation pattern of the technology described in the Patent Literature 1 is able to detect an information leak with respect to a file stored in the client PC itself, but an intentional leak by the client PC administrator cannot easily be detected in a case where access has been obtained to multiple server computers external to the client PC. Furthermore, a file operation history cannot be readily displayed in the above-mentioned prior art.

Solution to Problem

In order to achieve the above-mentioned object, the present invention uses information related to a file operation history as additional meta-information. The additional meta-information is stored in either a predetermined storage area inside a file, or in another area outside of the file. This meta-information may comprise file storage identification information, which is assigned in a case where the file is stored in a file system of a client computer, operation generation identification information showing a number of operations, and copy frequency information showing copy frequency. When a file is put into operation, meta-information is created and associated with respect to a destination file. The meta-information is also sent to and stored in a management apparatus. A file operation history can be detected and displayed based on the meta-information held in the management apparatus. In addition, the present invention comprises an illegal operation detection system for detecting an illegal file operation. The illegal operation detection system comprises a monitoring apparatus and a management terminal. The monitoring apparatus treats the microprocessor of a client computer as a monitoring target, and monitors an operation with respect to the information on a screen of an output apparatus coupled to the monitoring target. The management terminal treats the monitoring apparatus as a management target, and manages a monitoring result of the monitoring apparatus. The monitoring apparatus, in response to an operation for inputting information to the monitoring target, identifies an access source of the input information being inputted into the monitoring target, and, in addition, assigns to the input information an identifier denoting the access source of the relevant input information, and in response to an operation for outputting information from the monitoring target, identifies the output destination of the output information being outputted from the monitoring target, and, in addition, retrieves an identifier denoting an access source of the output information, determines whether or not a combination of the output destination of the identified output information and the access source of the retrieved output information conforms to an illegal operation condition, and creates an alert in accordance with the result of this determination.

BRIEF DESCRIPTION OF DRAWINGS

FIG. 29 shows an example in which a file operation is traced based on information stored in a management server.

FIG. 35 shows a table for converting a count value to a character code.

FIG. 39 shows a portion of a database that is used for tracing the operation history of a file or the like attached to an e-mail.

FIG. 40 shows how to display the operation history of the e-mail file attachment as a tree structure.

FIG. 49 shows a portion of a database that is used for monitoring the operation history of a file uploaded via a Web browser.

FIG. 50 shows a portion of a database that is used for monitoring the operation history of a file that is attached to an incoming e-mail.

FIG. 52 shows an example of a variation for storing information for managing the operation history of a file.

DESCRIPTION OF EMBODIMENTS

The embodiment of the present invention will be explained hereinbelow. First of all, a method for detecting an illegal file operation will be explained, and next a method for managing a history of file operations will be explained. In addition, a method for acquiring a file path will be explained.

Example 1

This example comprises a first means for monitoring the content of an operation with respect to an application program running on a client PC (Personal Computer) serving as the "client computer", identifying an access source of input information being inputted by the client PC, and, in addition, assigning an identifier to the input information showing the access source of the relevant input information, and a second means for identifying an output destination of output information being outputted from the client PC, and, in addition, checking an identifier that has been assigned to the output information, and generating an alert in accordance with a condition for the access source and the output destination of the output information.

Figure 1:
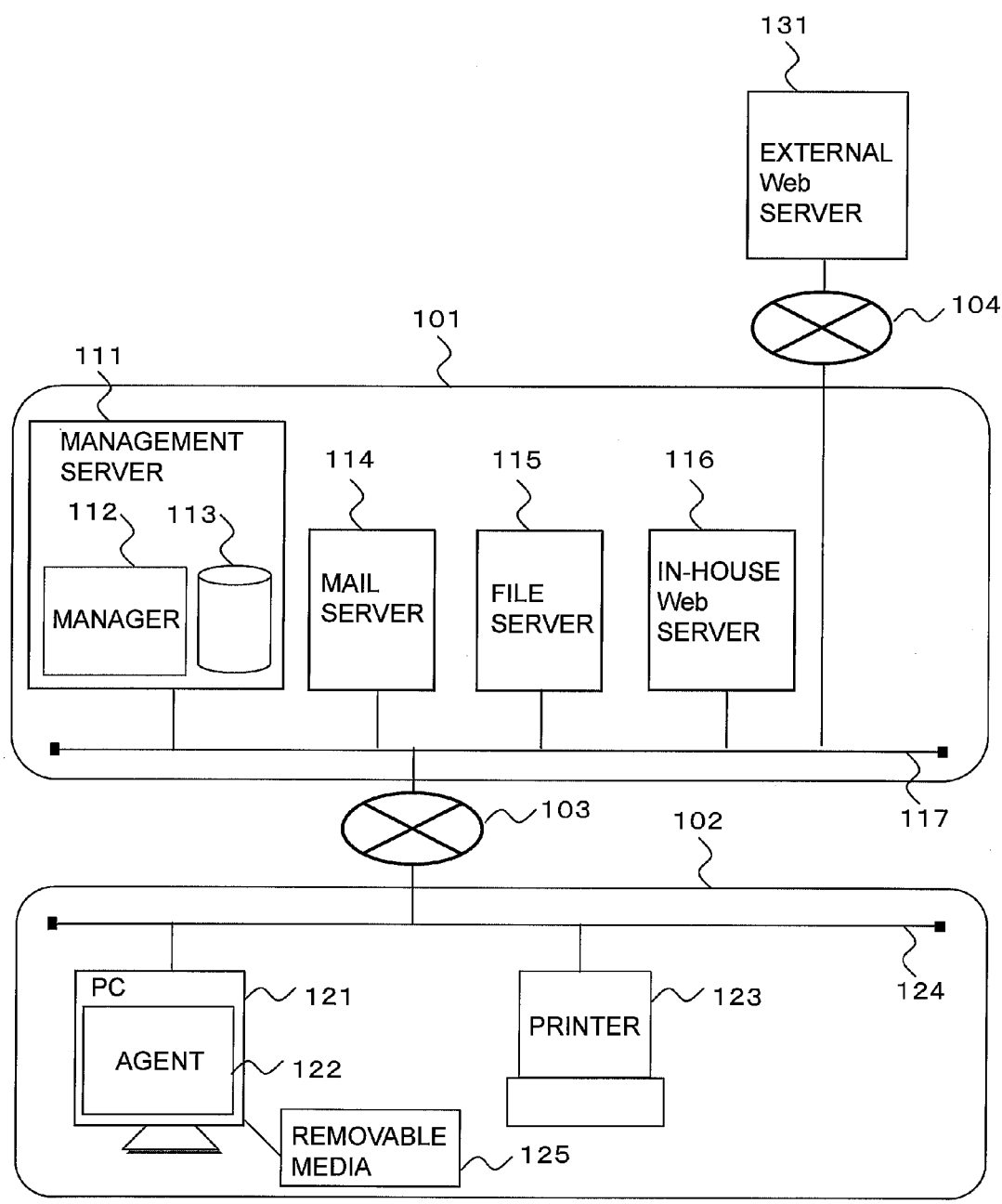
FIG. 1 is a system block diagram showing an embodiment of a computer system of the present invention.

A first example of the present invention will be explained hereinbelow based on the drawings. FIG. 1 is a system block diagram showing an embodiment of an illegal operation detection system of the present invention. In the illegal operation detection system of the present invention, a LAN (Local Area Network) 117 inside an information center 101 and a network 124 inside a site 102 are coupled via a wide area network 103, and the above-mentioned information center 101 is also coupled to the Internet via another wide area network 104. The illegal operation detection system comprises a management server 111 installed inside the information center 101, and a client PC 121 installed inside the site 102.

The management server 111 treats the inside of the information center 101 and the inside of the site 102 as a management area, treats the machines, for example, a mail server 114, a file server 115, an in-house Web server 116, a client PC 121, a network printer 123, and so forth deployed inside this management area as management targets, and manages these management targets. A manager 112, which is in charge of the entire illegal operation detection system, and a disk 113, which stores a PC management DB (Database) utilized by the above-mentioned manager to manage multiple client PCs operate in this management server 111. The management server 111 corresponds to the "management terminal" and/or the "management apparatus".

Each client PC 121 comprises a microprocessor loaded with various types of application programs. An agent 122, which serves as a monitoring apparatus that treats each client PC 121 as a monitoring target, and monitors operations with respect to the information on a screen of an output apparatus coupled to this monitoring target, runs on each client PC 121. The client PC 121, for example, comprises a computer, like a personal computer, a personal digital assistant, or a mobile telephone.

A user, who uses the client PC 121, performs a task using an e-mail, a Web server, a file server, and so forth. For this reason, the mail server 114, the file server 115, and the in-house Web server 116 are installed and coupled via the LAN 117 at the information center 101. Furthermore, an external Web server 131 accessible from the client PC 121 is coupled via the Internet.

A network printer 123 used in printing is also coupled to the network 124 at the site 102. Furthermore, the external Web server 131 and a flash memory or other such removable media 125 from among the storage media coupled to the client PC 121 are not management targets of the management server 111, and are processed as test targets.

Figure 22:
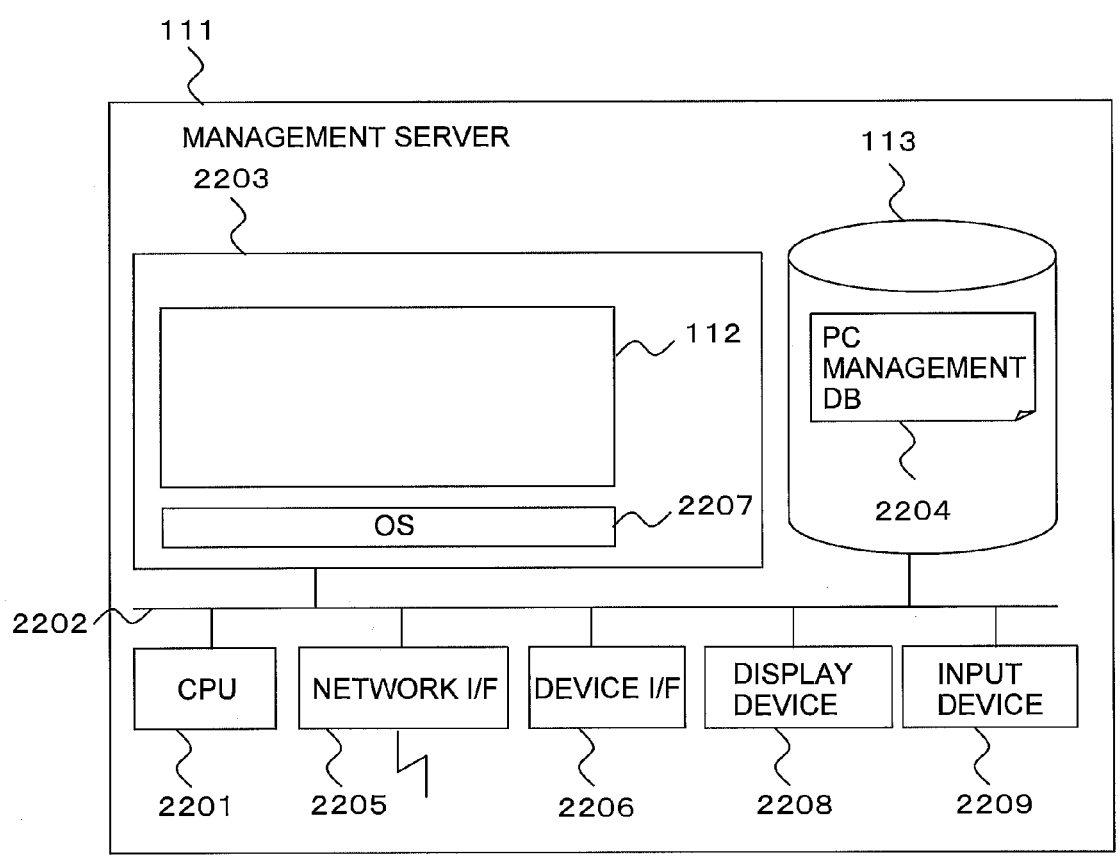
FIG. 22 is a diagram showing an example of the configuration of a management server of the present invention.

FIG. 22 is a block diagram showing an example of the configuration of the management server 111 of the present invention. The management server 111 comprises a CPU (Central Processing Unit) 2201, a bus 2202, a memory 2203, a disk 113, a PC management DB 2204, which is inside the disk 113, a network I/F 2205, a device I/F 2206, an input device 2208, and a display device 2209. The device I/F 2206, for example, comprises a USB (Universal Serial Bus) interface or the like. An OS (Operating System) 2207 is loaded into the memory 2203, and operates the manager program 112.

Figure 2:
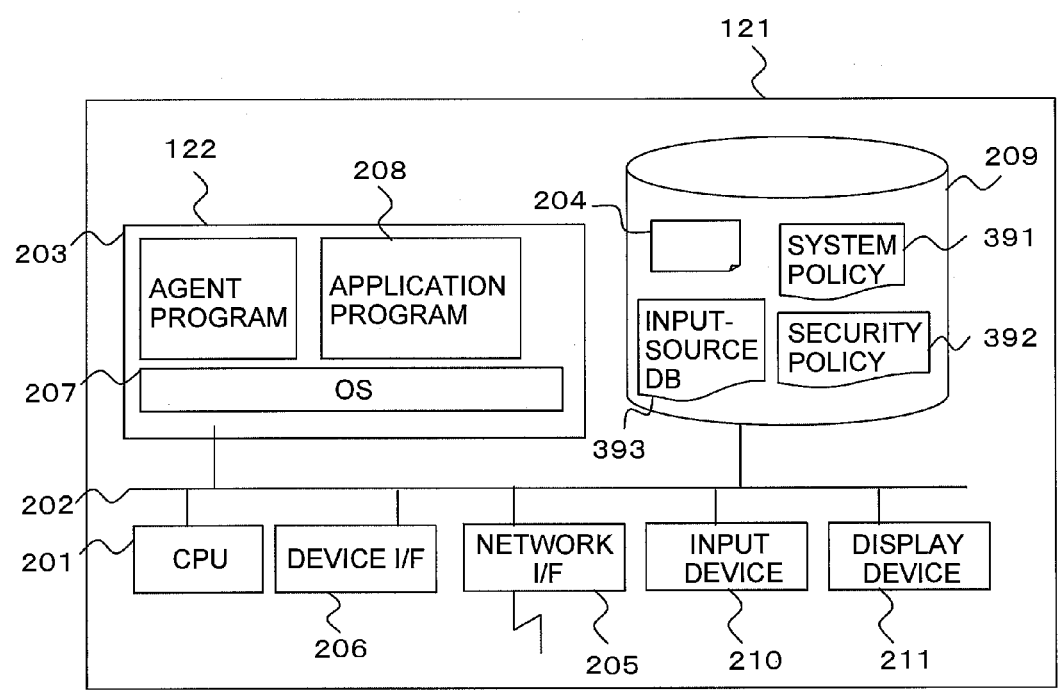
FIG. 2 is a diagram showing an example of the configuration of a client PC in the present invention.

FIG. 2 is a block diagram showing an example of the configuration of the client PC 121 of the present invention. The client PC 121 comprises a CPU (Central Processing Unit) 201, a bus 202, a memory 203, a local file system 204, a network I/F 205, a device I/F 206, a disk 209, an input device 210, and a display device 211. The device I/F 206, for example, comprises a USB (Universal Serial Bus) interface or the like. An OS (Operating System) 207 is loaded into the memory 203. Multiple application programs (may also be abbreviated as applications) 208, such as the agent 122 program, which is a component of the illegal operation detection system, a file explorer, a Web browser (may also be abbreviated as browser), a mailer, and a word processor or a spreadsheet, are stored in the memory 203 and run on the OS 207.

A user, who utilizes the client PC 121 here uses any of the application programs 208 to save a file attached to an e-mail addressed to him that has arrived at the mail server 114, or a file stored in the file server 115, or a file registered in the in-house Web server 116 as a local file in the local file system 204 inside the file system-formatted disk 209 of the client PC 121.

A file 209 saved to the local file system 204 is exported outside of the client PC 121 using any of the application programs 208. For example, the file explorer may to used to copy this file to the removable media coupled to the device I/F 206, or may be printed on the network printer 123 using a printing function of either the word processor or the spreadsheet.

Furthermore, a file may be attached to an e-mail text created using the mailer and sent to recipients inside and outside the organization, or the file may be uploaded to either the in-house or an external Web server.

Figure 21:
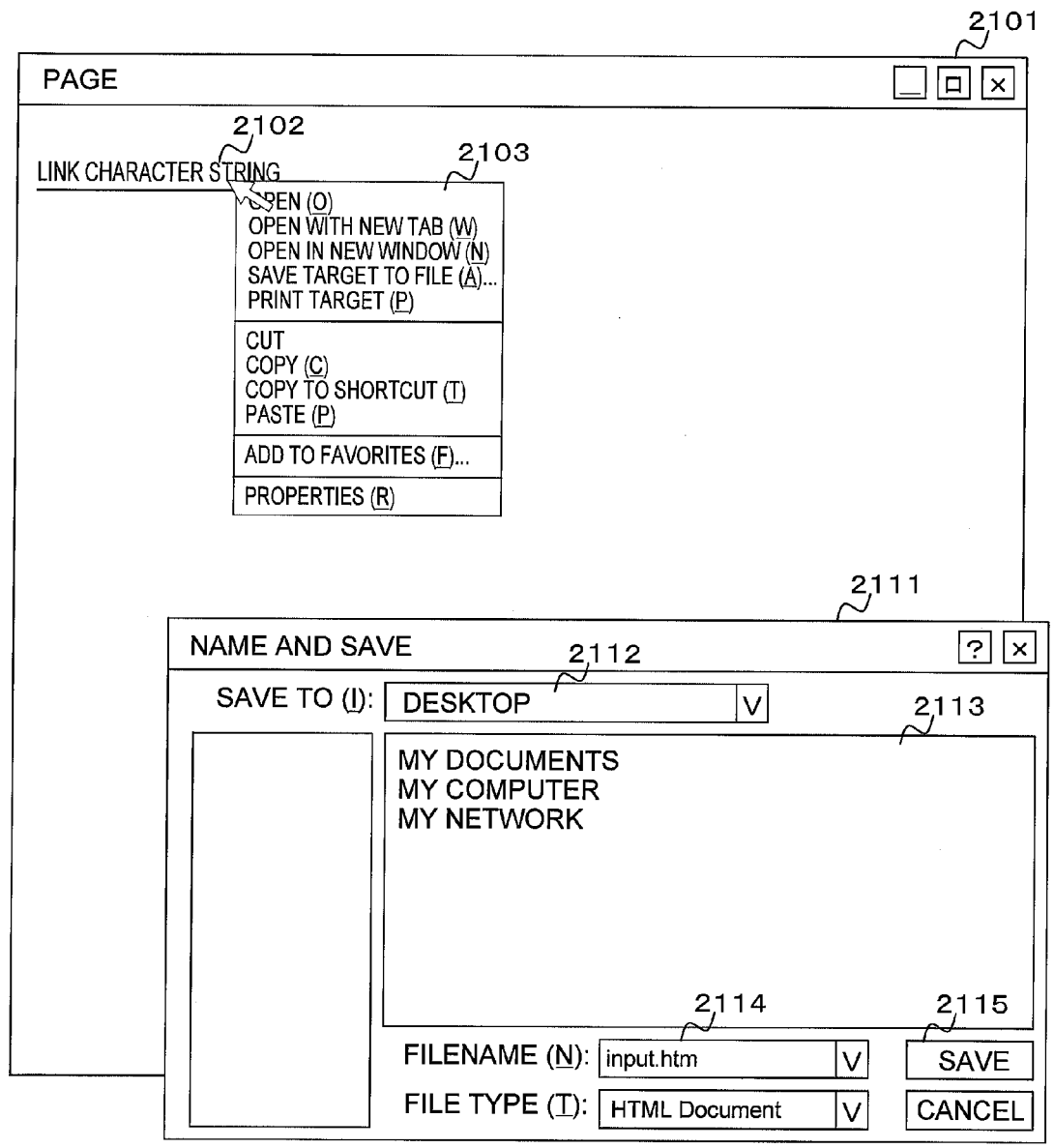
FIG. 21 is a diagram showing an example of a Web browser screen, which is related to the operation of the present invention.

FIG. 21 shows the Web browser screen used at this time. FIG. 21 is a diagram showing an example of the screen when the user runs an application on the client PC 121 and imports a file.

An area called a link exists on the Web browser screen (the screen of the output apparatus coupled to the client PC 121) 2101. When this link is clicked using a pointing device (an input apparatus, such as a mouse that is coupled to the client PC 121), a screen transition occurs. In a case where the mouse cursor is placed over the link character string 2102 and the left button is clicked, the display either transitions to the next screen (also referred to as a page) or a process for displaying a download dialog 2111 for downloading a target (a file) at the clicked link is executed.

Furthermore, in a case where the mouse cursor is placed over the link character string 2102 and the right button is clicked, a pop-up window called a context menu is displayed. There are items such as "Save target to file (A) . . . " in the context menu 2103 displayed here, and by left-clicking on this item, a process for displaying a download dialog 2111 for downloading the target is executed.

In the download dialog 2111, there is a field 2112 showing the location where the downloaded file is to be saved, a field 2113 that displays save-destination folder options, and 2114 showing the filename to be saved. The filename to be saved can be rewritten. The user is able to operate the fields 2112 and 2113, select the folder in which the file is to be saved, use the field 2114 as needed to change the save filename, use the Web browser to download the file by clicking on the save button 2115, and save the file to an arbitrary folder.

Figure 3:
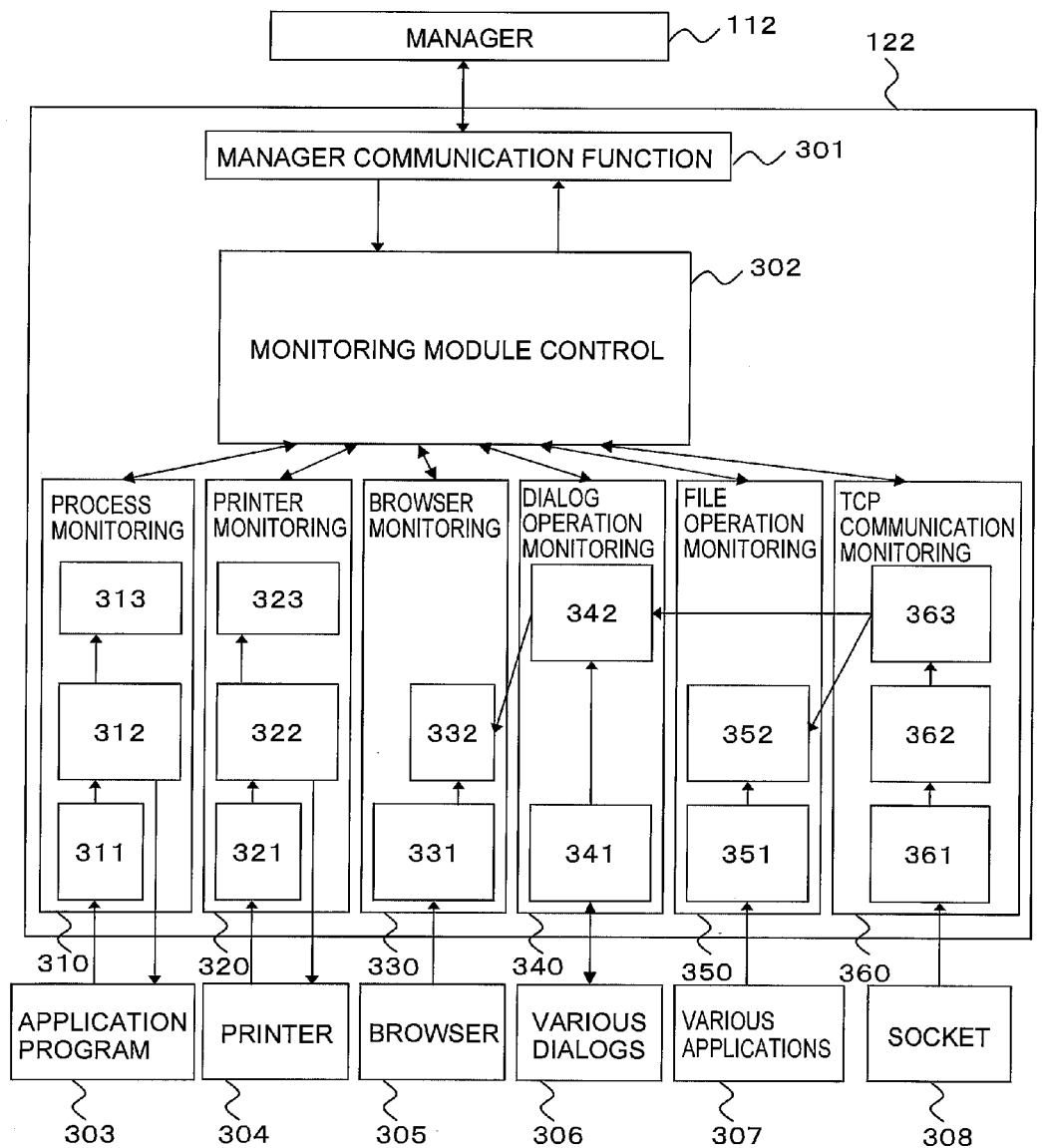
FIG. 3 is a diagram showing an example of the configuration of an agent program that runs on a client PC.

FIG. 3 is a diagram showing an example of a module configuration of the agent 122 running on the client PC 121. The agent 122 has a manager communication function module 301 that is in charge of communications with the manager 112, and a monitoring module control module 302 that oversees the respective monitoring modules for monitoring user operations on the client PC 121.

The agent 122 comprises a process monitoring module 310, a printer monitoring module 320, a browser monitoring module 330, a dialog operation monitoring module 340, a file operation monitoring module 350, and a TCP communication monitoring module 360.

The process monitoring module 310 monitors the operating status of an application program 303 running on the client PC 121. The printer monitoring module 320 monitors an output operation to a printer 304, to include the network printer 123. The browser monitoring module 330 monitors a user operation in accordance with a Web browser 305. The dialog operation monitoring module 340 monitors various dialogs 306, which are displayed on the screen of the client PC 121 and used by the user to select a file for uploading or downloading. The file operation monitoring module 350 monitors an operation (for example, a button click or the drag & drop of an object displayed inside an application window) in which a user uses a mouse or other such pointing device on the screen of the client PC 121 with respect to various types of applications 307 displayed on the above-mentioned screen. The TCP communication monitoring module 360, for example, monitors a state in which the mailer or other such application, which sends and receives data via a network, either sends or receives a data stream using the TCP/IP (Transmission Control Protocol/Internet Protocol) socket 308 in accordance with a user operation.

Furthermore, the agent 122 has a system policy 391, which is a setting file for controlling the operation of the module, and a security policy 392, which is a setting file for carrying out control related to security in particular, and, in addition, comprises an access-source DB 393 for storing information necessary for the monitoring module group described above to configure information related to a user operation. The content and role of the access-source DB 393 will be explained further below.

The process monitoring module 310 realizes a boot detection function 311 for detecting the fact that a process 303 boot has been requested on the client PC 121, a suppression function 312 for suppressing a boot in a case where the process 303 to be booted violates the security policy 392, and a user notification function 313 for notifying the user that a boot has been suppressed.

The printer monitoring module 320 realizes a print detection function 321 for detecting the fact that printing using the printer 304 has been requested on the client PC 121, a suppression function 322 for suppressing a print in a case where the data to be printed violates the security policy 392, and a user notification function 323 for notifying the user that a boot has been suppressed.

The browser monitoring module 330 realizes an access detection function 331 for detecting the fact that the browser 305 has been used on the client PC 121 to access a Web server, and a detection content holding function 332 for temporarily holding the URL (Uniform Resource Locator) of the accessed Web server and the received html (Hypertext Markup Language) data and so forth.

The dialog operation monitoring module 340 realizes a dialog detection function 341 for detecting the fact that either a file selection dialog or a print dialog has been displayed in accordance with the user operating an application program 208 on the client PC 121, and an access source information assignment/test function 342 for assigning information related to the access source of a file and executing a test of the information related to the assigned access source with respect to a file that has been put into operation using the above-mentioned dialog.

As used here, an operation for displaying a file section dialog, for example, is an operation for either downloading or uploading a file using a Web browser, an operation for saving a file attachment from an incoming e-mail via the mailer, or an operation for attaching a file to an outgoing e-mail. Furthermore, an operation for displaying a print dialog corresponds to an operation for selecting the print function using a word processor or a spreadsheet.

The file operation monitoring module 350 realizes an operation detection function 351 for detecting the fact that either a mouse button was clicked in a window of an application program 208 on the client PC 121, or an operation such as a drag & drop of an object displayed inside a window has been carried out, and an access source information assignment/test function 352 for assigning information related to the access source of a file and executing a test of the information related to the assigned access source with respect to a file that has been put into operation using a mouse.

As used here, a file operation in accordance with the click of a mouse button, for example, corresponds to either an operation for right-clicking on a link displayed on a Web browser screen and storing the object pointed to by the link in the displayed menu as a file, or an operation for dragging & dropping a file attached to the mailer incoming message screen and copying same to the desktop.

The TCP communication monitoring module 360 has a socket reception detection function 361 for detecting the fact that a file has been sent/received over a network as a result of the user performing an operation via a network application on the client PC 121, a protocol analysis function 362 for analyzing the data that has been sent/received via the above-mentioned socket, and, in a case where a file has been downloaded to the client PC 121 via the socket, a registration/communication function 363 for registering information related to the access source of this file in the access-source DB 393, and, in addition, communicating this file access source-related information to the access source information assignment/test modules 342 and 352.

Each of the monitoring modules described hereinabove, in accordance with the detected contents, can have a function for communicating with either another monitoring module or the access-source DB 393, a function for sending an alert to the manager 112 via the manager communication function 301 that and the monitoring module control 302, and a function for creating an alert and/or a detection content log.

Furthermore, in the following explanation, information related to the present invention will be explained using an expression such as file-related information, but this information may be also be expressed using something other than a table or other such data structure. For this reason, in order to show that the information does not rely on a data structure, "file-related information" and the like may simply be called "information". Similarly, since a portion described as a DB does not necessarily comprise a database data structure, a description of a DB may also simply refer to "information".

Furthermore, when explaining the nature of each piece of information, expressions such as "identification information", "identifier", "first name" "last name" and "ID" are used, but these expressions are interchangeable.

In addition, in the following explanation, "program" may be used as the subject in an explanation, but since a stipulated process is carried out by a processor executing a program while using a memory and a communication port (a communication control apparatus), the processor may also be used as the subject of an explanation. Furthermore, a process that is disclosed having a program as the subject may be a process that is performed by the management server 111 or other such computer or an information processing apparatus. Also, either all or part of a program may be realized using dedicated hardware. Furthermore, the present invention does not always have to be realized using a thread mechanism, but rather any mechanism, such as a micro-thread or process mechanism that is able to be executed by a mechanism that manages the execution of a program provided by the OS may be used.

Also, various types of programs may be installed in the respective computers in accordance with a program distribution server or a storage medium.

Furthermore, the management computer 111 comprises an input/output apparatus. As examples of this input/output apparatus, a display, a keyboard, and a pointer device can be cited, but an apparatus other than these may also be used. As an alternative to the input/output apparatus, either a serial interface or an Ethernet interface may be used as an input/output apparatus, and this interface may substitute for the inputting and displaying of the input/output device by being coupled to a computer for display use comprising a display, a keyboard, or a pointer device to display the display information on the display computer and receive input.

Next, a sequence of steps for realizing the first means, which detects the fact that the user has carried out an import operation to the client PC and assigns an identifier indicating that an import operation has been performed, will be explained in accordance with FIGS. 4 through 7.

Figure 4:
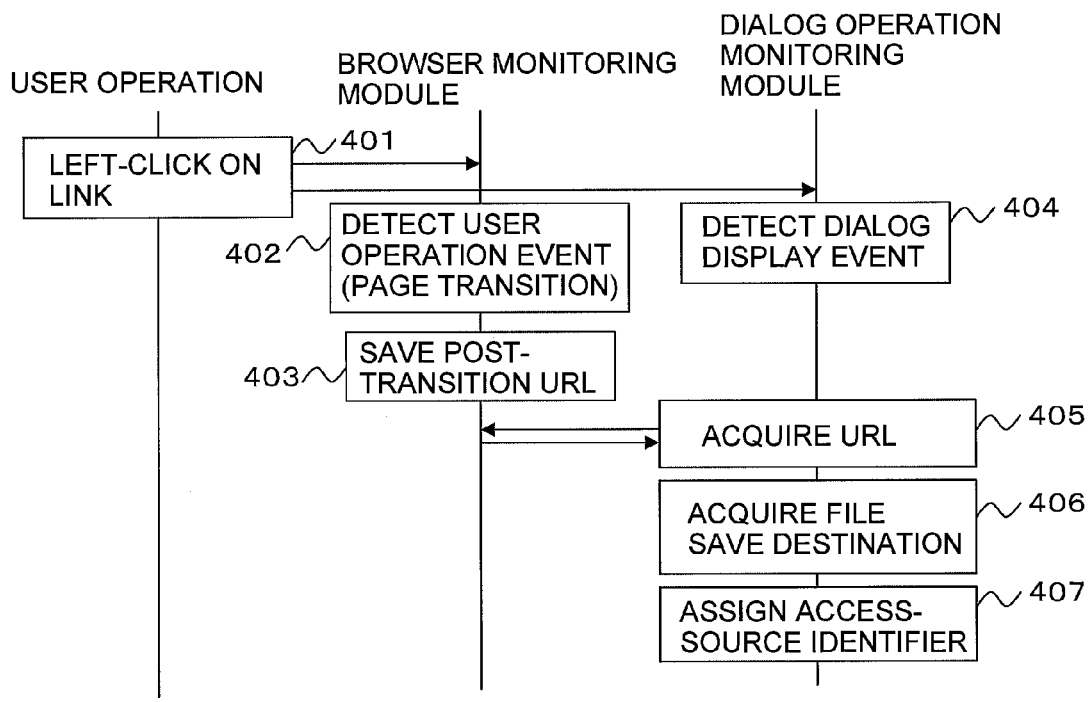
FIG. 4 is a diagram showing an example of a sequence of steps executed in accordance with a user operation, a dialog operation monitoring module, and a browser monitoring module when a file is imported via a Web browser.

FIG. 4 is an example of a sequence of steps showing the flow of processing executed by the browser monitoring module 330 and the dialog operation monitoring module 340 when the user downloads a file via a Web browser.

When the user left-clicks (401) on a link displayed on the Web browser, a page transition user operation event occurs in the Web browser, and the browser monitoring module 330 detects this page transition user operation event (402). The browser monitoring module 330 saves the post-transition URL (that is, the URL of the object of the link that was clicked), and waits for an information provision request from the dialog operation monitoring module 340 (403).

Meanwhile, in a case where the object specified by the link in accordance with the left-click operation (401) is a type that is not able to be displayed in-line by the Web browser, a file download dialog is displayed. In accordance with this, the dialog operation monitoring module 340 detects a dialog operation event (404) when the file download dialog is displayed, requests that the browser monitoring module 330 provide post-transition URL information, and, thereafter, inputs the post-transition URL information from the browser monitoring module 330 (405).

When the save button is clicked in the above-mentioned file download dialog, the dialog operation monitoring module 340 inputs a save-destination filename from the information (the information resulting from OS 207 processing) displayed in the dialog, and acquires a full path as the save-destination information of the above-mentioned file (406). In addition, in a case where the server included in the post-transition URL inputted in Step 405 is the in-house Web server 116, the dialog operation monitoring module assigns an access-source identifier to the above-mentioned file (407). In a case where Microsoft's (registered trademark) NTFS (NT File System) is used as the local file system 204 utilized by the client PC 121, this identifier may be realized using an "alternate stream".

Figure 5:
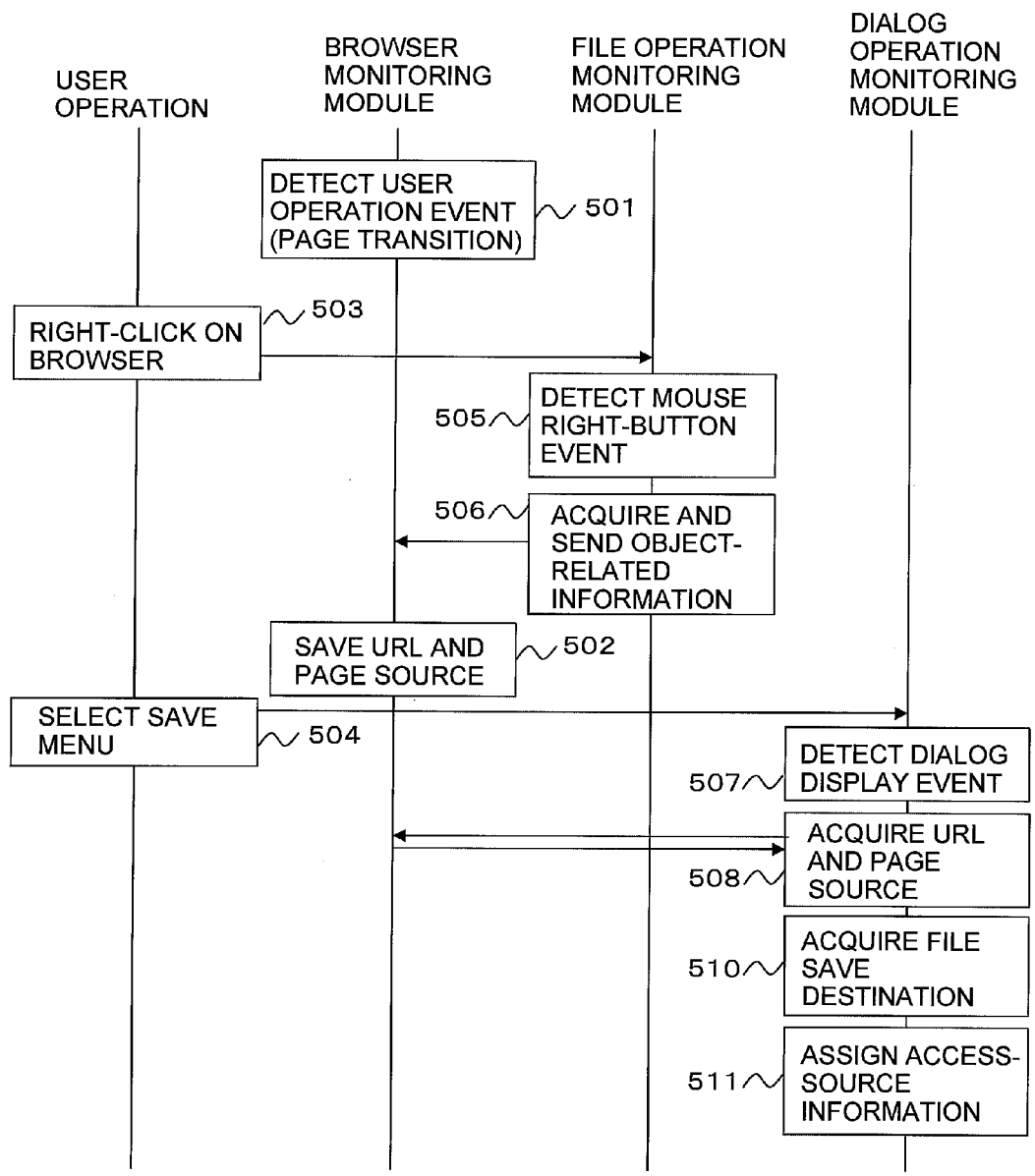
FIG. 5 is a diagram showing an example of a sequence of steps executed in accordance with a user operation, a dialog operation monitoring module, a browser monitoring module, and a file operation monitoring module when a file is imported via a Web browser.

FIG. 5 is an example of a sequence of steps showing the flow of processing executed by the browser monitoring module 330, the dialog operation monitoring module 340 and the file operation monitoring module 350 when the user downloads a file via a Web browser.

When the user displays a page on a Web browser, the browser monitoring module 330 detects a page transition user operation event (501). At this time, the Web browser holds the post-transition URL and the page source, and these can be delivered in accordance with a browser monitoring module 330 request. When the user performs a right-click operation (503) with respect to the link displayed on the Web browser in this state, a mouse operation event occurs, and the file operation monitoring module 350 detects the above-mentioned event (505).

The file operation monitoring module 350 that detected the occurrence of the mouse operation event saves the information related to the location where the mouse operation event occurred on the Web browser as object relation information, and sends same to the browser monitoring module 330 (506).

The browser monitoring module 330 saves the post-transition page URL and the page source each time a page is displayed on the Web browser (502).

When an item related to a "file save" is selected from the displayed context menu in accordance with a user right-click (504), a file save dialog is displayed.

The dialog operation monitoring module 340, upon detecting the above-mentioned dialog display event (507), acquires the displayed page URL and page source (page data) from the browser monitoring module 330 (508). In addition, the dialog operation monitoring module 340 acquires the file path via which the above-mentioned file was saved (510), and in a case where the server included in the URL of the above-mentioned file is the in-house Web server 116, treats the file access source as a monitoring target and assigns an access-source identifier to the file (511).

Figure 6:
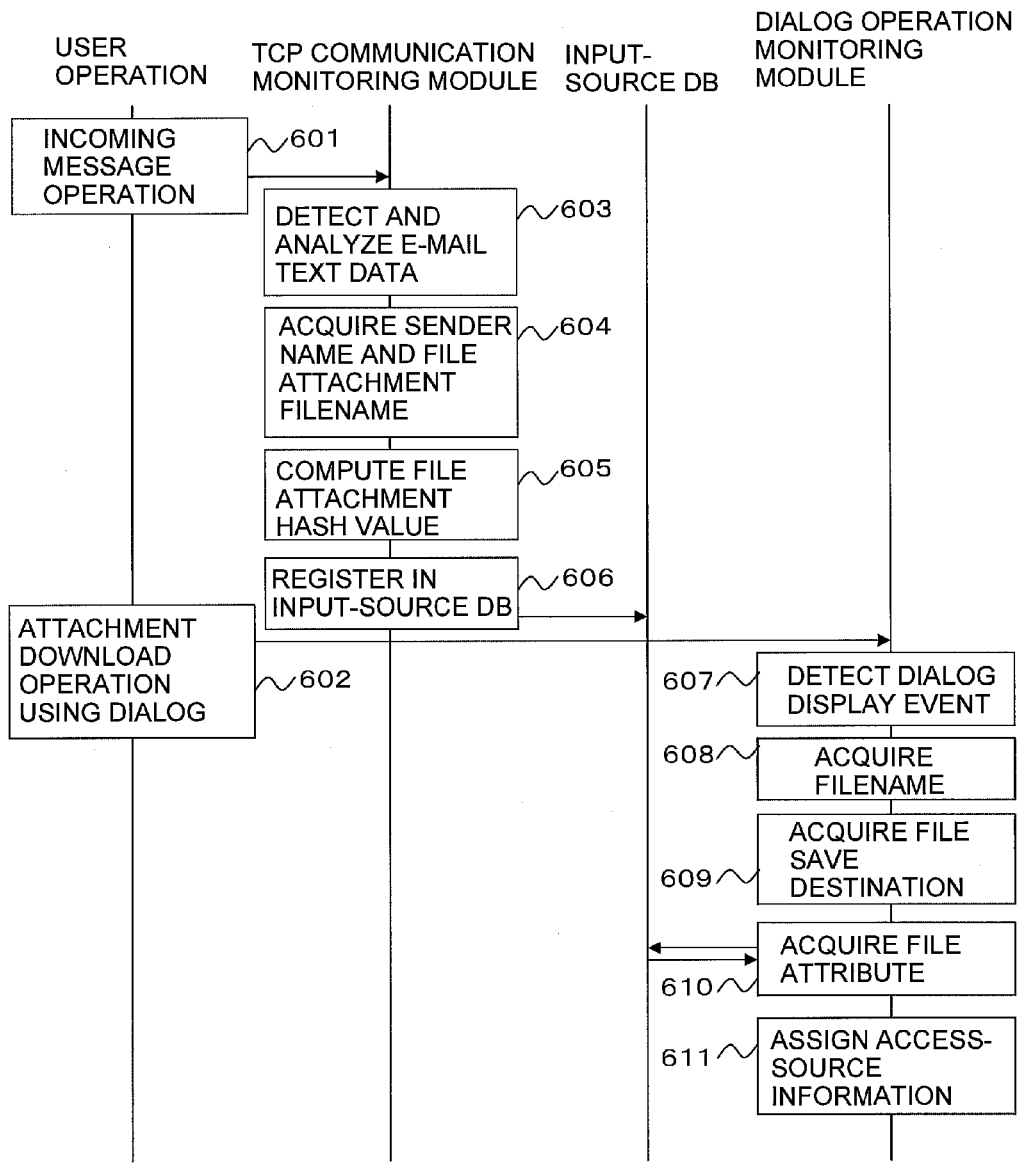
FIG. 6 is a diagram showing an example of a sequence of steps executed in accordance with a user operation, a dialog operation monitoring module, and a TCP communication monitoring module when a file is imported via a mailer.

FIG. 6 shows an example of a sequence of steps showing the flow of processing executed by the dialog operation monitoring module 340 and the TCP communication monitoring module 360 when the user saves a file that is attached to an e-mail to the local system 204 using the mailer.

When the user carries out a message receiving operation, such as booting the mailer or executing an e-mail display operation (601), a message is downloaded from the mail server 114 in accordance with a protocol, such as POP (Post Office Protocol) 3 or IMAP (Internet Message Access Protocol) 4. In so doing, the TCP communication monitoring module 360, which monitors a socket in either a network driver or a TCP/IP protocol stack, implements an e-mail text data analysis process (603), and acquires a sender name and a file attachment filename that are in the message (604).

In addition, the TCP communication monitoring module 360 decodes file attachment data that has been coded in Base 64 or the like, and computes a hash value (605). The file attachment filename, the hash value, and the file attachment sender name obtained in accordance with Steps 604 and 605 are registered in the access-source DB 393 (606).

The user may attempt to execute an operation for saving a file attachment to the local file system 204 while using the mailer to peruse the e-mail text (this operation is not executed immediately after the e-mail data has been downloaded, but rather is executed after a considerable period of time has passed). When the mailer carries out the operation for saving the file attachment using a file save dialog (602), the dialog operation monitoring module 340 detects a dialog display event (607), inputs a filename from the information displayed in the dialog (608), and inputs the full path of the file save destination (609). In addition, the dialog operation monitoring module 340 uses the filename displayed in the above-mentioned dialog as a key to search the access-source DB 393 and acquires an attribute, such as file sender name (610).

In a case where the file attachment filename here is a generic name, for example "specification.doc", it is conceivable that multiple records are registered in the source input DB 393. In a case like this, it is possible to acquire the file sender name by computing a hash value with respect to the file of the save-destination filename inputted in Step 608 and using the above-mentioned hash value as a key to search the access-source DB 393.

In a case where the file sender name is that of another user in the organization in Step 610, an access-source identifier is assigned to the above-mentioned file (611).

Figure 7:
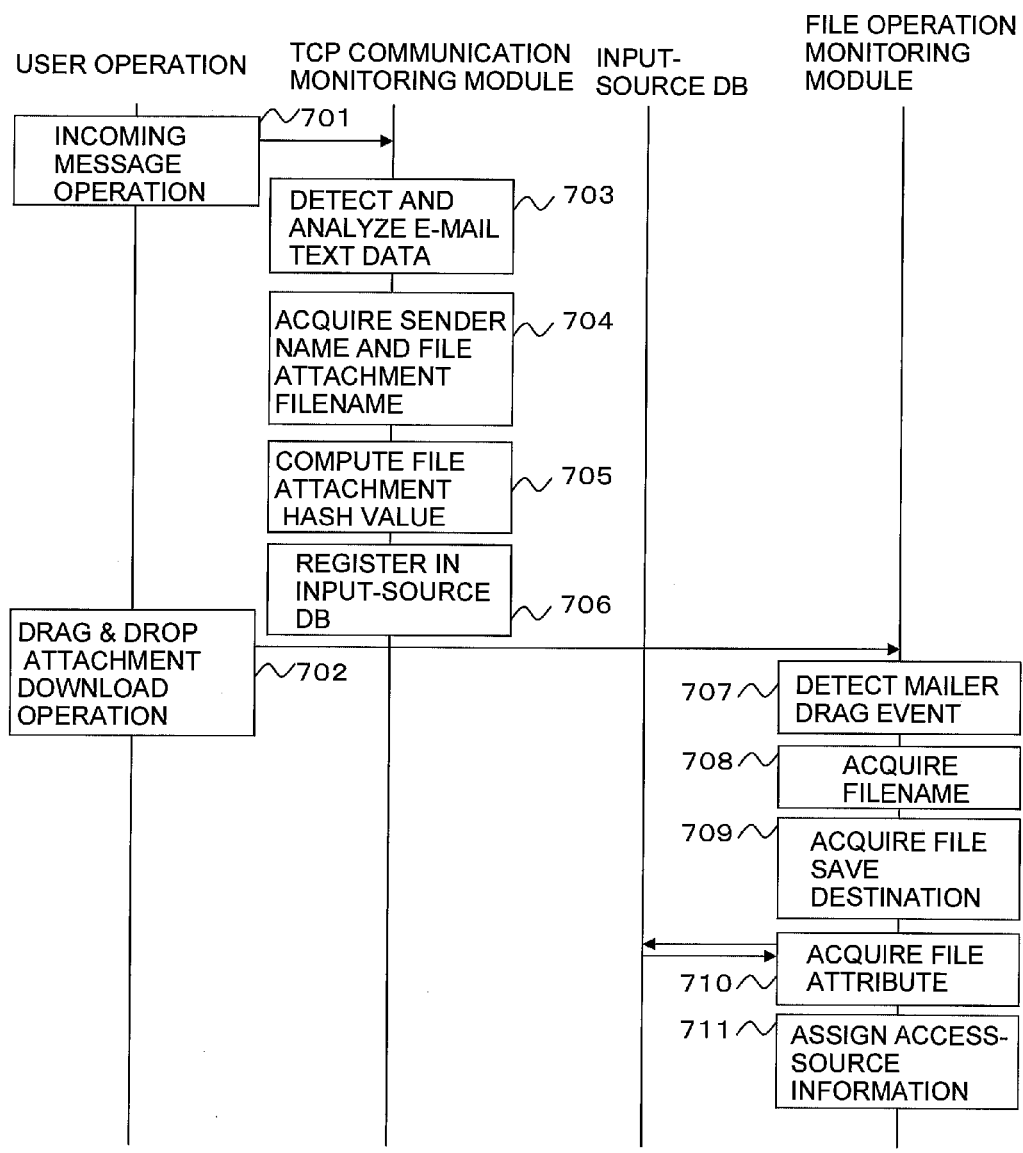
FIG. 7 is a diagram showing an example of a sequence of steps executed in accordance with a user operation, a file operation monitoring module, and a TCP communication monitoring module when a file is imported by a mailer using drag & drop.

FIG. 7 is an example of a sequence of steps showing the flow of processing executed by the TCP communication monitoring module 360 and the file operation monitoring module 350 when the user saves a file that has been attached to an e-mail to the local file system 204 using the mailer.

The processing from Step 701 through Step 706 is the same as the sequence of steps (Step 601 through Step 606) in FIG. 6. It is not only a method in which the user uses the file save dialog to carry out an operation for saving a file attachment to the local file system 204 while perusing an e-mail text with the mailer, but is also a method for dragging & dropping an icon denoting a file attachment displayed in the mailer screen to the desktop or the file explorer.

When an operation like this is carried out, the file operation monitoring module 350 detects a mouse-based drag & drop event from the mailer screen (707). In addition, the file operation monitoring module 350 monitors a file creation event with respect to the file system, and in response to the mouse-based drag & drop operation, acquires the name of the file created in the local file system 204 (708) and the full path (709), uses the filename and the file hash value as keys to search the access-source DB 393, and acquires an attribute, such as the file sender name (710). In a case where the file sender name in Step 710 is that of another user inside the organization, an access-source identifier is assigned to the above-mentioned file (711).

Next, the sequence of steps, which realizes the second means for detecting the fact that the user has carried out an export operation from the client PC, checking the identifier that denotes an import was performed, and sending an alert will be explained in accordance with FIGS. 8 through 11.

Figure 8:
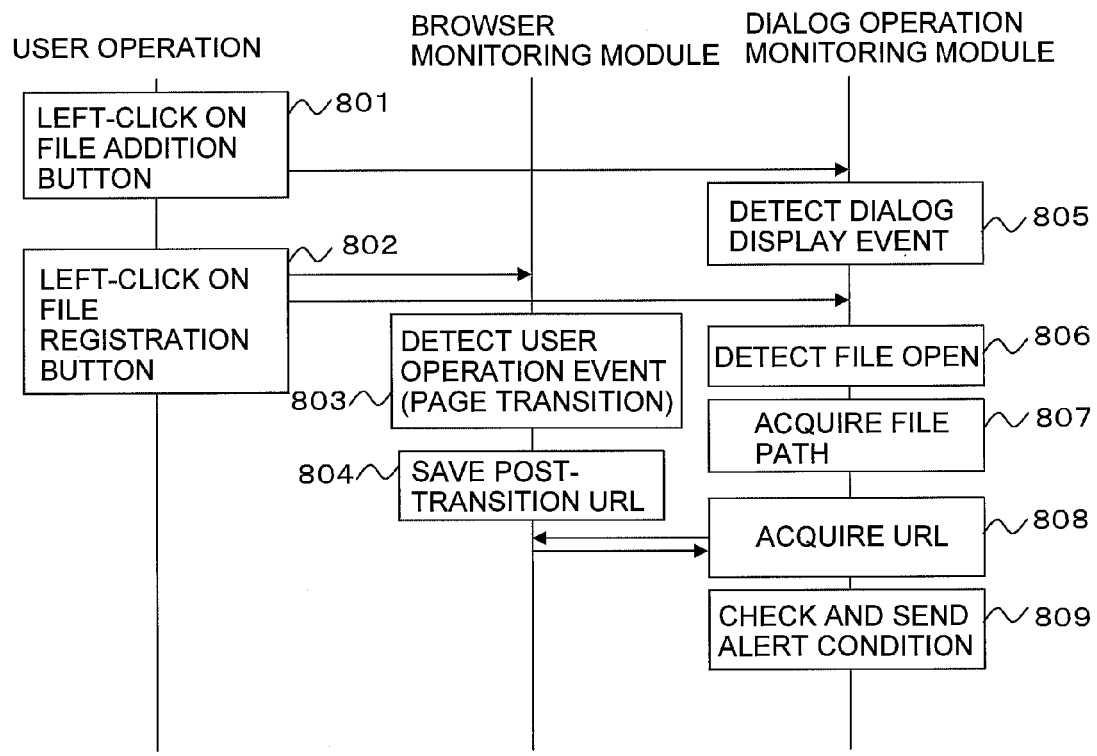
FIG. 8 is a diagram showing an example of a sequence of steps executed in accordance with a user operation, a dialog operation monitoring module, and a browser monitoring module when a file is exported via a Web browser.

FIG. 8 is an example of a sequence of steps showing the processing flows respectively executed by the browser monitoring module 330 and the dialog operation monitoring module 340 when the user uploads a file via a Web browser.

When the user clicks on a button for adding an upload-target file on a Web browser-displayed form screen used in a file upload (801), the Web browser displays a file selection dialog. The dialog operation monitoring module 340 detects the event in which the file selection dialog was displayed, acquires the name of the selected file, and starts monitoring the opening of the file (805).

When the user selects a file using the file selection dialog and clicks on a file registration button in the above-mentioned form screen (802), the form screen is submitted, and the screen displayed on the Web browser transitions.

The browser monitoring module 330 detects a page transition event that occurs as a result of this (803), and saves the post-transition URL (804).

In a case where the file upload is submitted at this time, the dialog operation monitoring module 340 detects a file opening with respect to this file (806) and acquires the file path of this file from the OS 207 (807).

The dialog operation monitoring module 340 determines whether or not an alert condition is satisfied, and in a case where the determination is that the alert condition has been satisfied, sends an alert to the manager 112 (809). The dialog operation monitoring module 340 acquires the page post-transition URL from the browser monitoring module 330, determines whether or not the file output destination is a test target, and in a case where the Web server that uploaded the file is an external server, treats the file output destination as a test target and checks the access-source identifier of the file. The dialog operation monitoring module 340 implements a process for outputting an alert (809) in a case where the file is one that was copied from the in-house file server 115, a file that was downloaded from the in-house Web server 116, or an acquired upload-target file that was attached by the mailer.

The process for outputting an alert is a process for sending an alert to the manager 112 of the management server 111 in a case where a predetermined alert condition has been satisfied. The predetermined alert condition is configured such that an alert is sent in a case where a file upload-destination server, such as an external Web server 131, is the monitoring target, and, in addition, the upload-target file is the management target.

In a case where the output destination of the output information outputted from the client PC 121, that is, the Web server to which the file was uploaded is the external Web server 131, this Web server 131 is a test target that differs from the management server 111 management target.

A file that is a management-target of the management server 111 is a client PC 121 processed file, for example, a file that corresponds to any of (1) a file copied from the in-house file server 115, (2) a file downloaded from the in-house Web server 116, or (3) an acquired file that was attached to the mailer. In a case like this where the file access source is a management server 111 management target, the output information (the file) outputted from the client PC 121 is determined to be information created in accordance with an illegal operation. As a result of this, an alert to the effect that the file conforms to an illegal operation condition (an alert condition) is created, and this alert is sent to the management server 111.

In accordance with this, the management server 111 determines that an illegal operation, which runs a high risk of resulting in an information leak, has been detected, and manages the information resulting from the illegal operation as information to be processed via an alert. In accordance with this, the administrator is able to execute a measure for suppressing information leaks based on the alerts collected in the management server 111.

Figure 9:
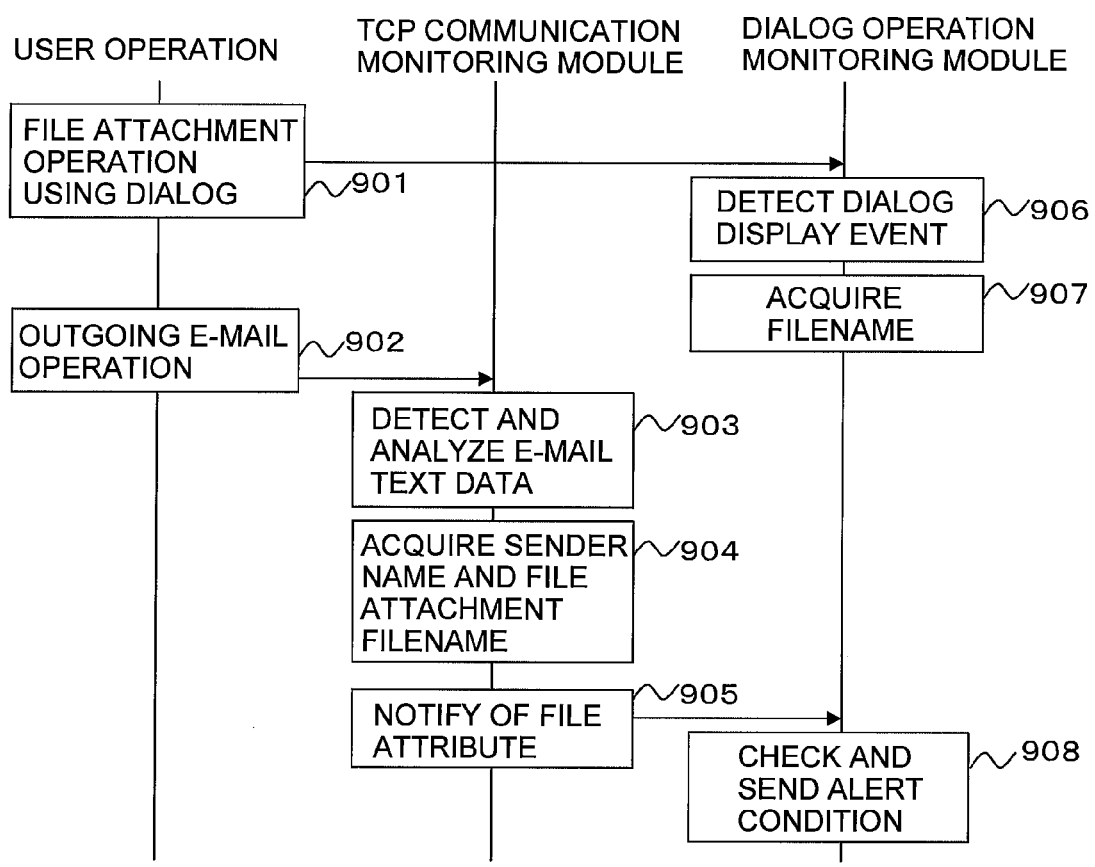
FIG. 9 is a diagram showing an example of a sequence of steps executed in accordance with a user operation, a dialog operation monitoring module, and a TCP communication monitoring module when a file is exported via the mailer.

FIG. 9 is an example of a sequence of steps showing the flow of processing executed by the TCP communication monitoring module 360 and the dialog operation monitoring module 340 when the user uses the mailer to send an e-mail with a file attachment.

When the user uses the file selection dialog to carry out a file attachment operation while creating an e-mail to be sent using the mailer (901), the dialog operation monitoring module 340 detects a display event of the file selection dialog (906), acquires the name of the selected file and the full path of the file (907), and stands by until the e-mail is sent.

Thereafter, when the user implements an outgoing e-mail operation using the mailer (902), the TCP communication monitoring module 360 analyzes the data to be sent using the SMTP (Simple Mail Transfer Protocol) protocol (903) and acquires the destination and the file attachment filename (904).

In a case where a file attachment was attached to the outgoing e-mail, and, in addition, the e-mail destination was outside of the organization, the TCP communication monitoring module 360 communicates the fact that the e-mail was sent to an external address to the dialog operation monitoring module 340 that is standing by (905).

The dialog operation monitoring module 340 checks the identifier denoting the access source of the sent file, and, in a case where the file is any of a file that was copied from an in-house file server, or a file that was downloaded from the in-house Web server, or a mailer-attached acquired file, implements a process for outputting an alert (908).

Figure 10:
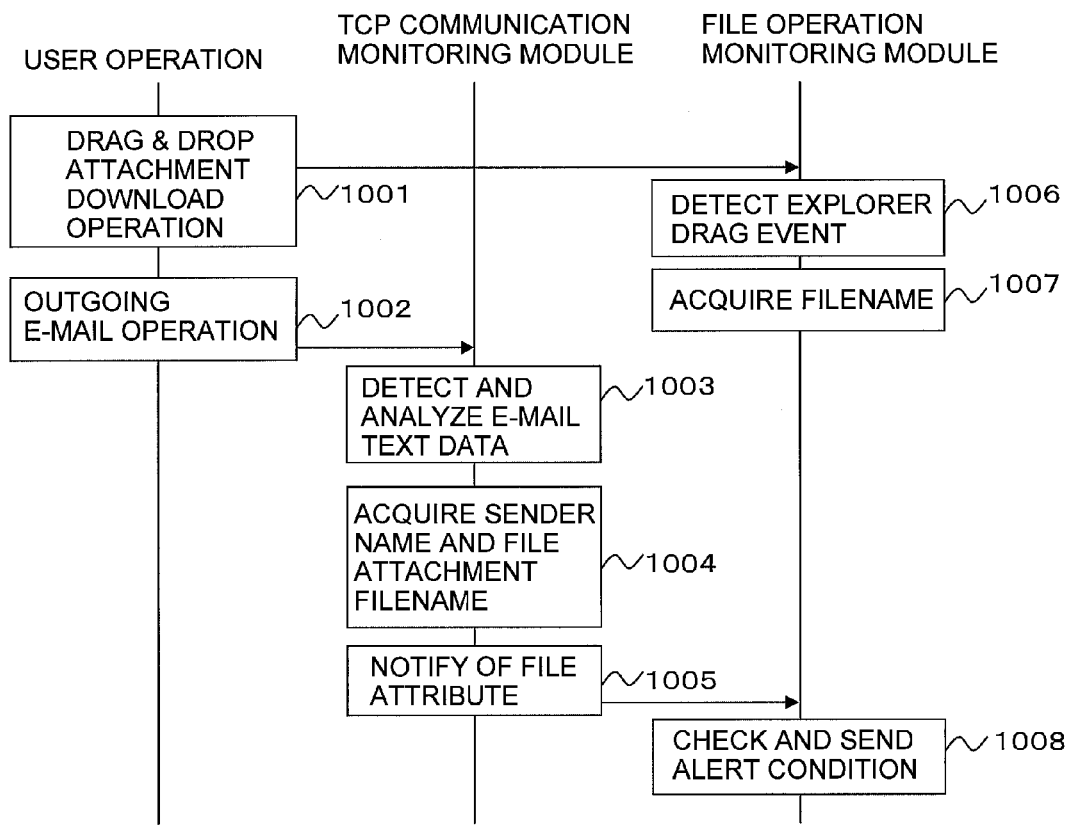
FIG. 10 is a diagram showing an example of a sequence of steps executed in accordance with a user operation, a file operation monitoring module, and a TCP communication monitoring module when a file is exported via a mailer using drag & drop.

FIG. 10 is an example of a sequence of steps showing the flow of processing executed by the TCP communication monitoring module 360 and the file operation monitoring module 350 when the user uses the mailer to send an e-mail with a file attachment.

When the user uses a drag & drop to carry out a file attachment operation while creating an e-mail to be sent using the mailer (1001), the file operation monitoring module 350 detects the fact that a file has been dragged & dropped from the file explorers or the like to a window of the mailer (1006), acquires the name of the selected file and the full path of the file (1007), and stands by until the e-mail is sent.

Thereafter, when the user implements an outgoing e-mail operation using the mailer (1002), the TCP communication monitoring module 360 analyzes the data to be sent using the SMTP protocol (1003) and acquires the destination and the file attachment filename (1004).

In a case where a file attachment was attached to the outgoing e-mail, and, in addition, the e-mail destination was outside of the organization, the TCP communication monitoring module 360 communicates the fact that the e-mail was sent to an external address to the dialog operation monitoring module 340 that is standing by (1005).

The file operation monitoring module 350 checks the identifier denoting the access source of the sent file, and, in a case where the file is any of a file that was copied from an in-house file server, or a file that was downloaded from the in-house Web server, or a mailer-attached acquired file, implements a process for outputting an alert (1008).

Figure 11:
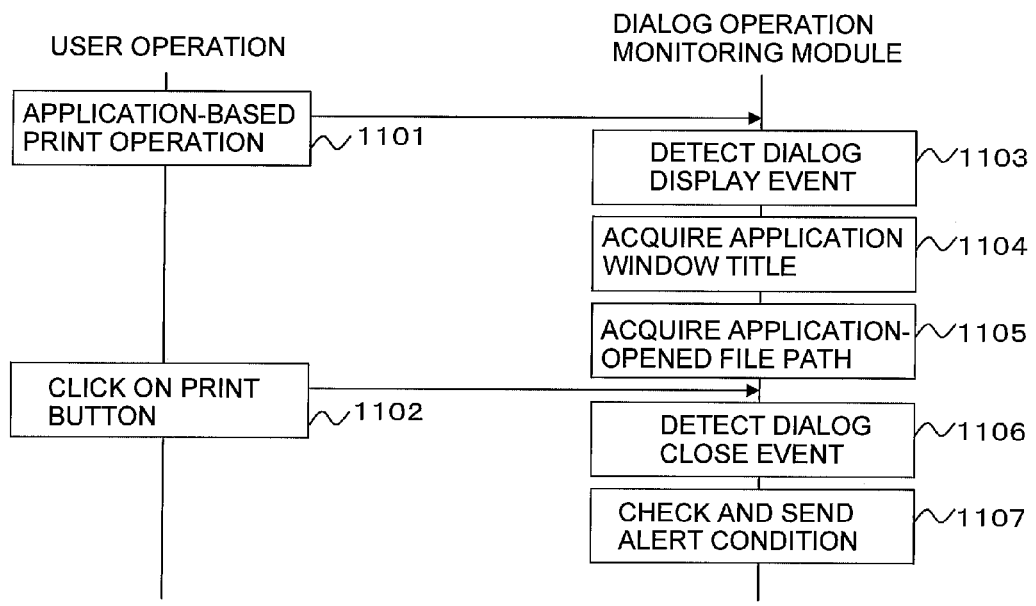
FIG. 11 is a diagram showing an example of a sequence of steps executed in accordance with a user operation and a dialog operation monitoring module when a file is printed.

FIG. 11 is an example of a sequence of steps showing the flow of processing executed by the dialog operation monitoring module 340 when the users uses an application to carry out a print operation.

When the user carries out a print operation using an application (1101), the dialog operation monitoring module 340 detects a print dialog display event (1103, and acquires the title of the window of the application implementing the printing (1104). In accordance with this, the dialog operation monitoring module 340 opens the application and acquires the full path of the file for which printing is attempting to be executed (1105).

Thereafter, when the user clicks on a print button in the print dialog (1102), the dialog operation monitoring module 340 detects the fact that the dialog has been closed (1206), checks the identifier denoting the access source of the file that was sent, and implements a process for outputting an alert in a case where the file was copied from an in-house file server, or the file was downloaded from an in-house Web server, or the file was a mailer-attached acquired file (1107).

Figure 12:
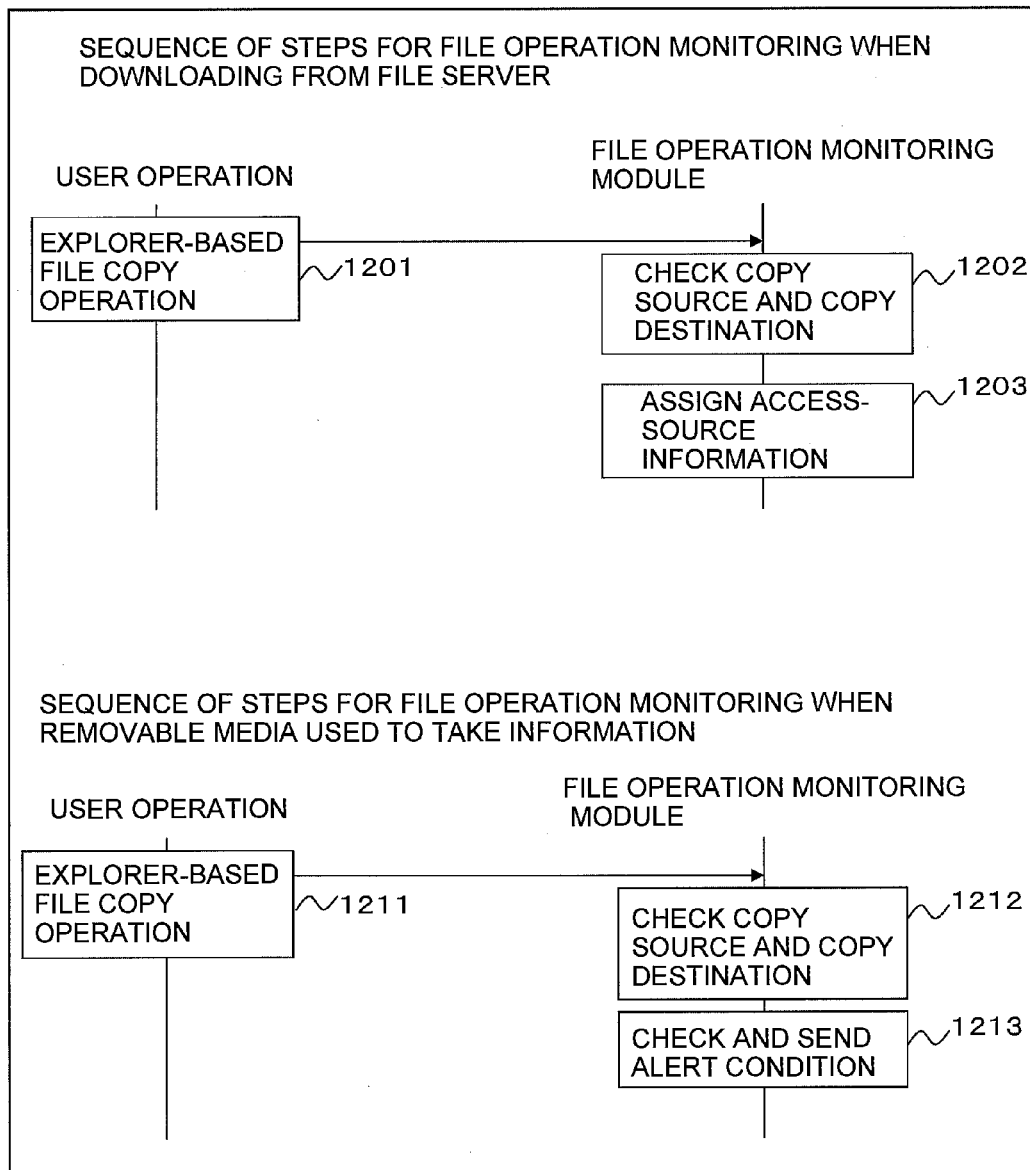
FIG. 12 is a diagram showing an example of a sequence of steps executed in accordance with a user operation and a file operation monitoring module when a file is imported from a file server and when a file is exported to a removable media.

Two sequences of steps are displayed in FIG. 12. The sequence of steps of first means which is realized in accordance with processing executed by the file operation monitoring module 350 when the user copies file server 115 information to the local file system 204 using the file explorer is shown at the top of FIG. 12. The sequence of steps of second means which is realized in accordance with processing executed by the file operation monitoring module 350 when the user copies a file to a removable media using the file explorer is shown at the bottom of FIG. 12.

The sequence of steps corresponding to first means will be explained first. When the user carries out either a file explorer-based file copy or move operation (1201), the file operation monitoring module 350 identifies the copy source and the copy destination of the file (1202). In a case where the copy source is the file server 115, and, in addition, the copy destination is the client PC 121, the file operation monitoring module 350 assigns an access-source identifier to the operation-target file (1203).

The sequence of steps corresponding to second means will be explained. When the user carries out either a file explorer-based file copy or move operation (1211), the file operation monitoring module 350 identifies the copy source and the copy destination of the file (1212). In a case where the copy source was the local file system 204 of the client PC 121, and, in addition, the copy destination was a removable media coupled to the client PC 121, the file operation monitoring module 350 checks the access-source identifier of the operation-target file. The file operation monitoring module 350 implements a process for outputting an alert in a case where the operation-target file is any of a file that was copied from an in-house file server, or a file that was downloaded from the in-house Web server, or a mailer-attached acquired file (1213).

Figure 13:
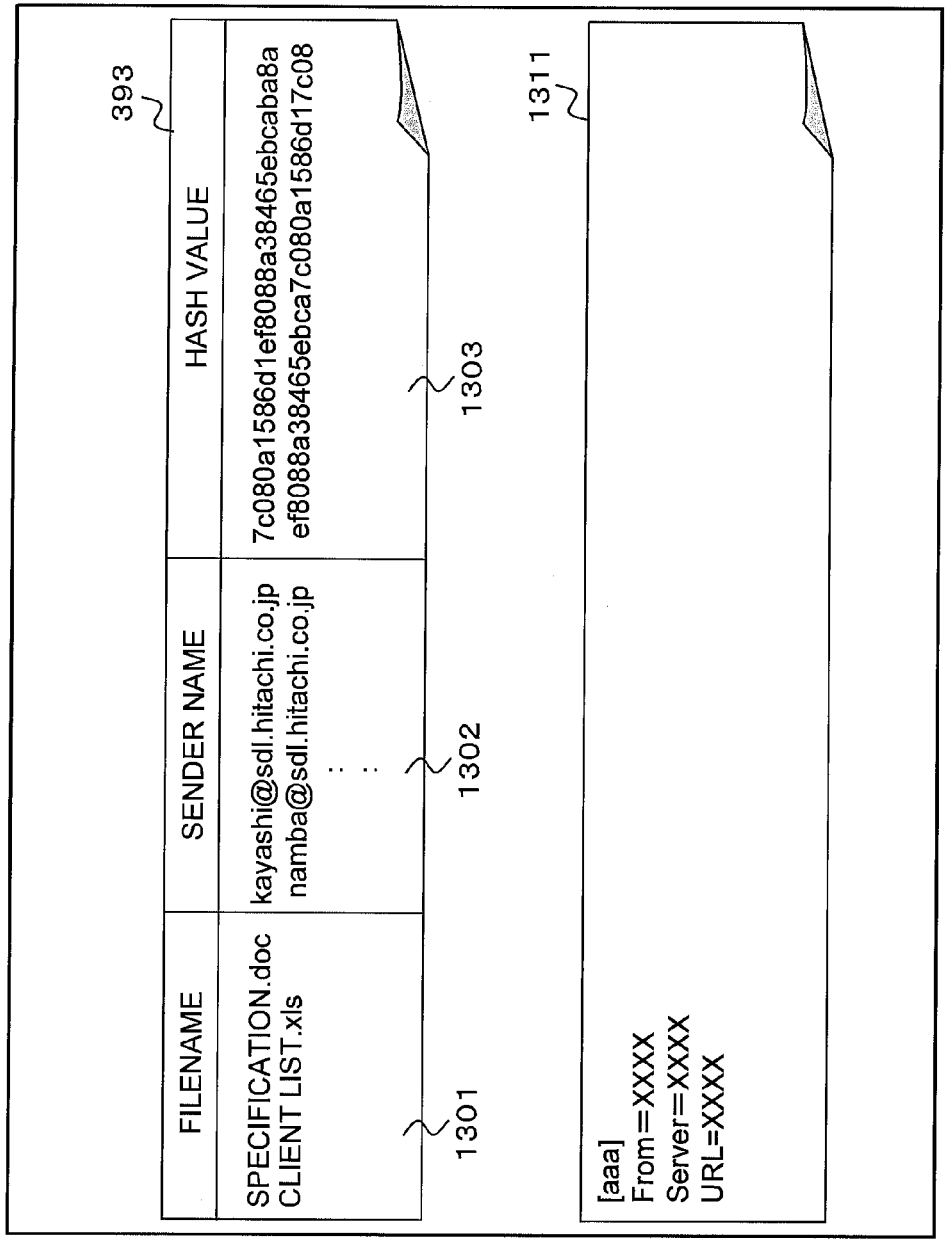
FIG. 13 is a diagram showing an example of an access-source DB used in an agent and a format for the access source information assigned to each file.

FIG. 13 is an example of the access-source DB 393 used for storing information related to an incoming e-mail, and the format of an access-source identifier 1311 assigned to a file that is stored in the local file system 204.

The access-source DB 393 comprises a field 1301 for storing a filename, a field 1302 for storing the name of the sender of an e-mail, and a field 1303 for storing the hash value of a file described in the field 1301.

The access-source identifier 1311 may be realized as ini file formatted data using the "alternate stream" in the case of Microsoft's NTFS as was described using FIG. 5 as well. In the case of a file accessed from the mail server 114, the sender's e-mail address is entered in the From line. In the case of a file accessed from the file server 115, either the server name or IP address of the file server is entered in the Server line. In the case of a file accessed from the in-house Web server, the URL denoting the accessed file is entered in the URL line. An unused line may be deleted, and equal or later may be left blank.

In the present invention, it is possible to send the contents included in the access-source identifier 1311 to the management server 111 as an alert using second means. In accordance with first means, in a case where the time at which the management-target information was imported to the client PC 121 is included in the access-source identifier 1311, besides the access source of the exported information, it is possible to include the access date/time in the content of the alert.

To realize the above, a time information field for storing the time at which an e-mail comprising a file attachment was received may be added as an access-source DB 393 field. The configuration may be such that the TCP communication module 360 registers the received time entered in the e-mail header in the time information field in Steps 606 and 706, and acquires the recording time of the time information field as well, and assigns the time information to the access-source identifier 1311 in Steps 610 and 710 for acquiring the file attribute.

Figure 14:
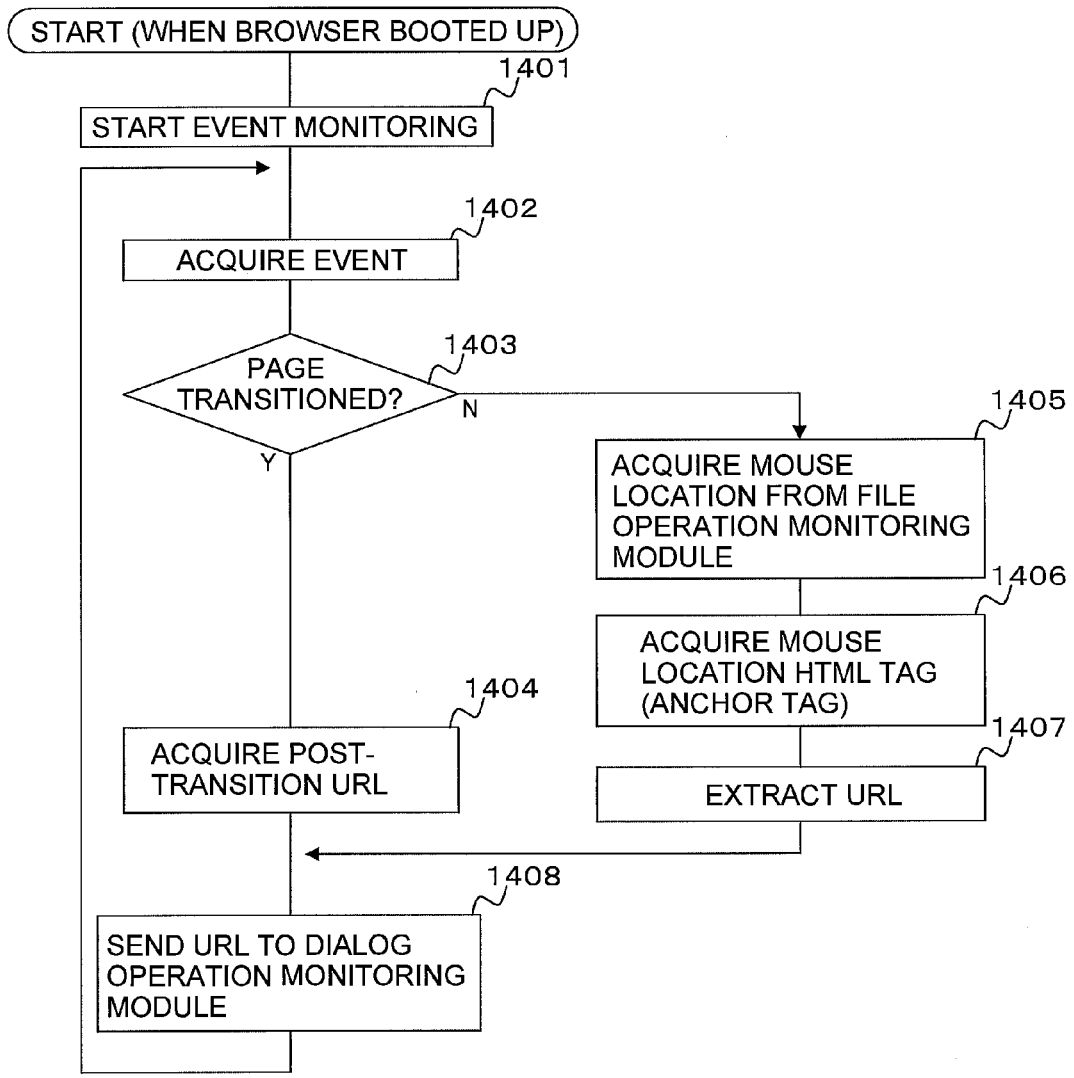
FIG. 14 is a diagram showing an example of a flowchart of a browser monitoring module, which is a module inside the agent.

FIG. 14 is an example of a flowchart showing an overview of the processing executed by the browser monitoring module 330.

The browser monitoring module 330 boots up at the same time as the Web browser, configures monitoring of user operation events with respect to the Web browser explained using FIGS. 4, 5 and 8 (1401), and enters a loop for determining whether an event has occurred (1402). In a case where the occurrence of an event has been detected, the browser monitoring module 330 executes a step for determining whether or not the page has transitioned in accordance with a left-click operation by the user (1403).

In a case where the page has transitioned in accordance with a left-click operation by the user, the browser monitoring module 330, subsequent to executing a step (1404) for acquiring the post-transition URL, executes a step (1408) for sending the URL to the dialog monitoring module 340.

Alternatively, in a case where the page did not transition, the browser monitoring module 330 executes a step (1405) for acquiring browser-based coordinate information of a mouse event from the file operation monitoring module 350. The browser monitoring module 330 executes a step (1406) for acquiring an HTML anchor tag that is located beneath the mouse cursor, and executes a step (1407) for extracting the URL selected using the mouse cursor. The buzzer monitoring module 330 executes a step (1404) for sending the URL to the dialog monitoring module 340.

Figure 15:
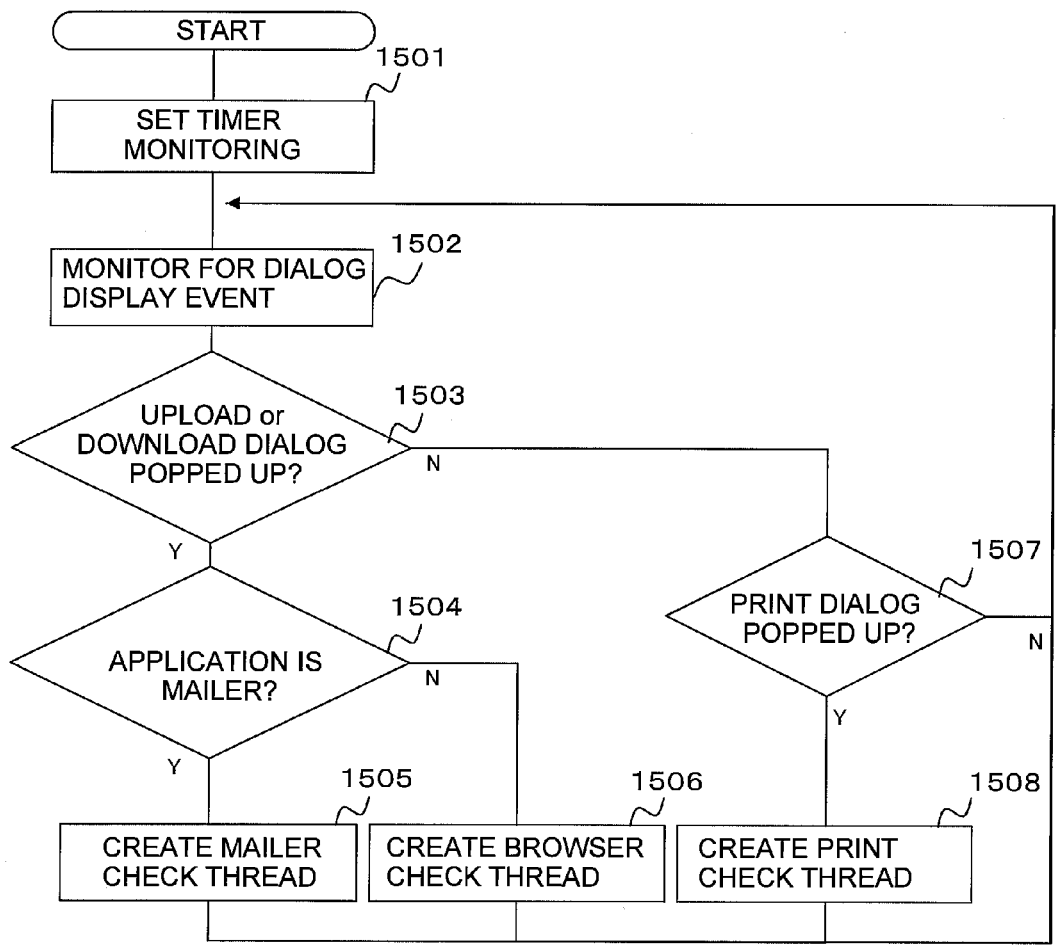
FIG. 15 is a diagram showing an example of an entire flowchart of a dialog operation monitoring module, which is a module inside the agent.

FIG. 15 is an example of a flowchart showing an overview of the processing executed by the dialog operation monitoring module 340.

The dialog operation monitoring module 340 boots up when the user logs in to the client PC 121. The dialog operation monitoring module 340 is for monitoring file operations using the dialogs described using FIGS. 4, 5, 6, 8, 9 and 11, and, for example, after performing timer monitoring and other such setups (1501), monitors for events in which a dialog is displayed (1502).

In a case where an event occurs, the dialog operation monitoring module 340 checks whether either an upload dialog or a download dialog is being displayed (1503), and in a case where one of these dialogs in displayed, determines the type of application that displayed this dialog (1504). In a case where the application is the mailer, the dialog operation monitoring module 340 implements a step (1505) for creating a mailer check thread, and in a case where the application is the Web browser, implements a step (1506) for creating a Web browser check thread.

In Step 1503, in a case where the dialog being displayed is neither the upload dialog nor the download dialog, the dialog operation monitoring module 340 determines whether or not this displayed dialog is the print dialog (1507). The dialog operation monitoring module 340 implements a step (1508) for creating a print check thread in the case of the print dialog.

After implementing the steps for creating the respective threads, the dialog operation monitoring module 340 returns to the step (1502) for monitoring for events in which a dialog is displayed.

Figure 16:
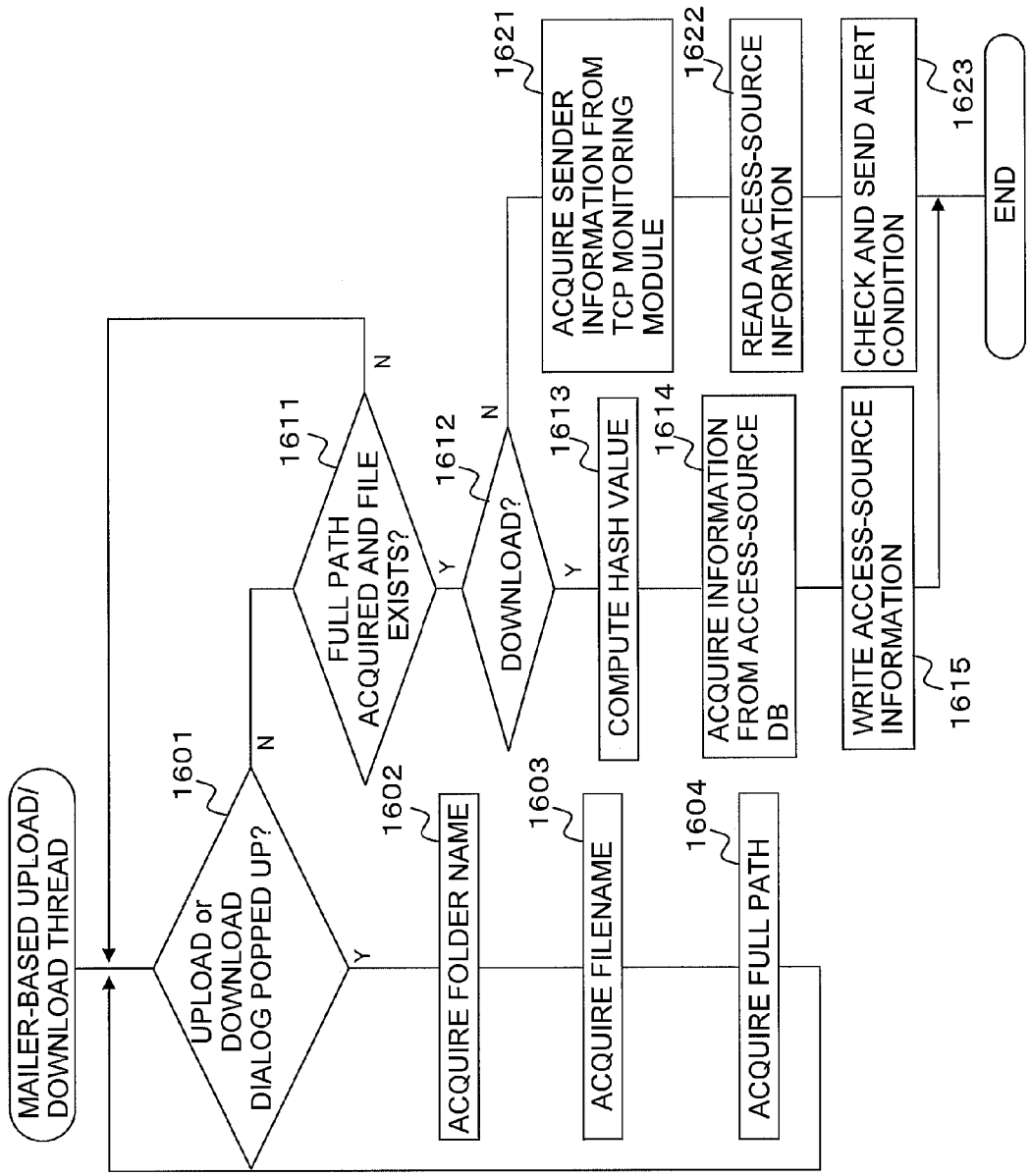
FIG. 16 is a diagram showing an example of a flowchart of a mailer-based download/upload thread part of the dialog operation monitoring module, which is a module inside the agent.

FIG. 16 is an example of a flowchart showing an overview of the Step 1505 for creating the mailer check thread from among the processes executed by the dialog operation monitoring module 340. In this thread, the dialog operation monitoring module 340 checks whether either the upload dialog or the download dialog is displayed (1601), and in a case where one of these dialogs is displayed, acquires the a folder name from a character string displayed in the dialog (1602) and acquires a filename (1603). The dialog operation monitoring module 340 returns to Step 1601 after configuring a full path for either the upload-target or the download-target file (1604).

Thereafter, when the user clicks on the dialog save button or the like and the dialog ceases to be displayed, the dialog operation monitoring module 340 executes the processing of Step 1611 and later.

First, the dialog operation monitoring module 340 determines whether a full path was acquired in accordance with Step 1604, and, in addition, whether the file indicated by this full path exists (1611). In a case where the file exists, the dialog operation monitoring module 340 executes the processing of Step 1612 and subsequent steps, and in a case where the file does not exist, returns to Step 1601.

In a case where the file exists, the dialog operation monitoring module 340 first determines whether or not the dialog is a download dialog (1612), and in a case where it is a download dialog, computes the hash value of the file identified in Step 1604 (1613). The dialog operation monitoring module 340, as shown in FIGS. 6 and 7, retrieves the information that the TCP communication monitoring module 360 registered in the access-source DB 393 (1614), and in a case where this information matches a predetermined condition, such as a case in which the access source is another user in the organization, write the access-source information to the file identified by the full path acquired in Step 1604 (1609).

In the case of an upload dialog, the dialog operation monitoring module 340 receives the destination information from the TCP communication module 360 as shown in FIGS. 9 and 10 (1621), and in a case where the file specified in the upload dialog was sent attached to an e-mail, reads the access-source information of the file identified in Step 1604 (1622). The dialog operation monitoring module 340 checks the alert condition, creates an alert, and sends the alert to the management server 111 as needed (1623).

Figure 17:
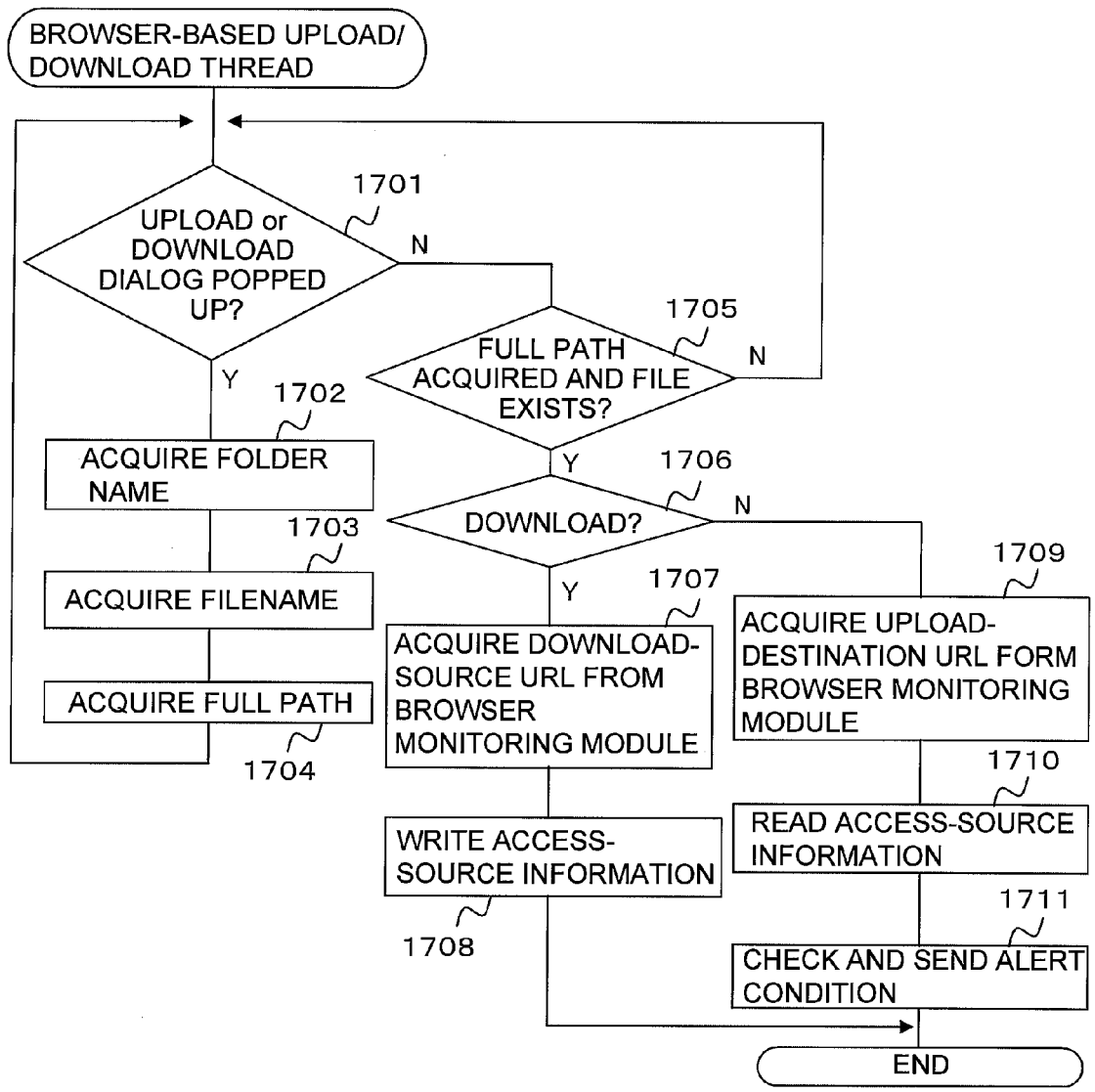
FIG. 17 is a diagram showing an example of a flowchart of a browser-based download/upload thread part of the dialog operation monitoring module, which is a module inside the agent.

FIG. 17 is an example of a flowchart showing an overview of Step 1506 for creating a Web browser check thread from among the processing executed by the dialog operation monitoring module 340.

In this thread, the dialog operation monitoring module 340 checks whether either the upload dialog or the download dialog is displayed (1701), and in a case where one of these dialogs is displayed, acquires the folder name from the character string displayed in the dialog (1702), acquires a filename (1703), configures a full path for either the upload-target or the download-target file (1704), and returns to Step 1701. Thereafter, when the user clicks on the dialog save button or the like and the dialog ceases to be displayed, the dialog operation monitoring module 340 executes the processing of Step 1705 and subsequent steps.

First, the dialog operation monitoring module 340 determines whether a full path was acquired in accordance with Step 1704, and, in addition, whether the file indicated by the full path exists (1705). In a case where the file exists, the dialog operation monitoring module 340 executes the processing of Step 1706 and subsequent steps, and in a case where the file does not exist, returns to Step 1701. In a case where the file exists, the dialog operation monitoring module 340 first determines whether or not the dialog is a download dialog (1706), and in a case where it is a download dialog, as shown in FIGS. 4 and 5, acquires the download-source information held by the browser monitoring module 330 (1707), and in a case where this information matches a predetermined condition, such as when the access source is another user in the organization, writes the access-source information to the file indicated by the full path acquired in Step 1704 (1708).

In the case of an upload dialog, the dialog operation monitoring module 340 acquires the upload destination information held by the browser monitoring module 330 from the browser monitoring module 330 as shown in FIG. 8 (1709). In a case where the file specified in the upload dialog has been sent, the dialog operation monitoring module 340 reads the access-source information of the file identified by the full path acquired in Step 1704 (1710), checks whether or not the alert condition is satisfied, creates an alert, and sends the alert to the management server 111 as needed (1711).

Figure 18:
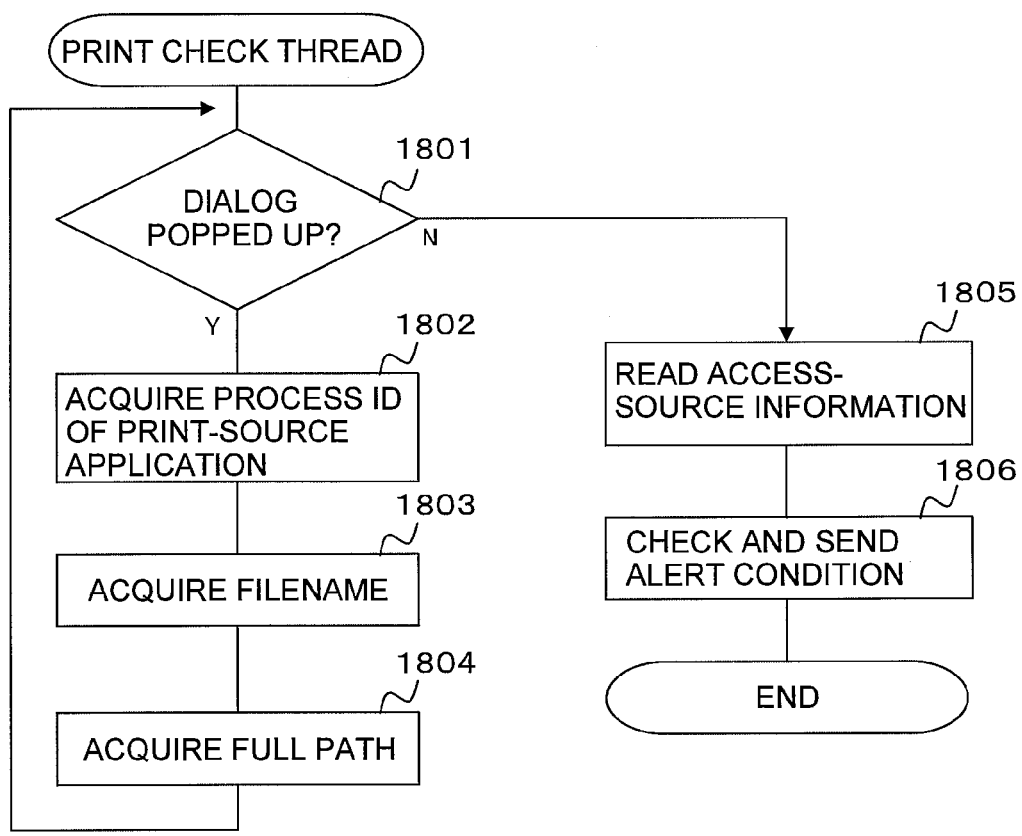
FIG. 18 is a diagram showing an example of a flowchart of a print check thread part of the dialog operation monitoring module, which is a module inside the agent.

FIG. 18 is an example of a flowchart showing an overview of the Step 1508 for creating an application-based print check thread from among the processing executed by the dialog operation monitoring module 340.

In this thread, the dialog operation monitoring module 340 checks whether a print dialog is being displayed (1801), and in a case where a print dialog is displayed, acquires the process ID of the print-source application program (1802), and also acquires a filename from a list of files that the application program identified by this process ID has opened (1803). The dialog operation monitoring module 340 configures the full path of the print-target file (1804), and returns to Step 1801.

Thereafter, when the user clicks on the print button or the like in the dialog, and the dialog ceases to be displayed, the dialog operation monitoring module 340 reads the access-source information of the print-target file (1805), checks the alert condition, creates an alert, and sends the alert to the management server 111 as needed (1806).

Figure 19:
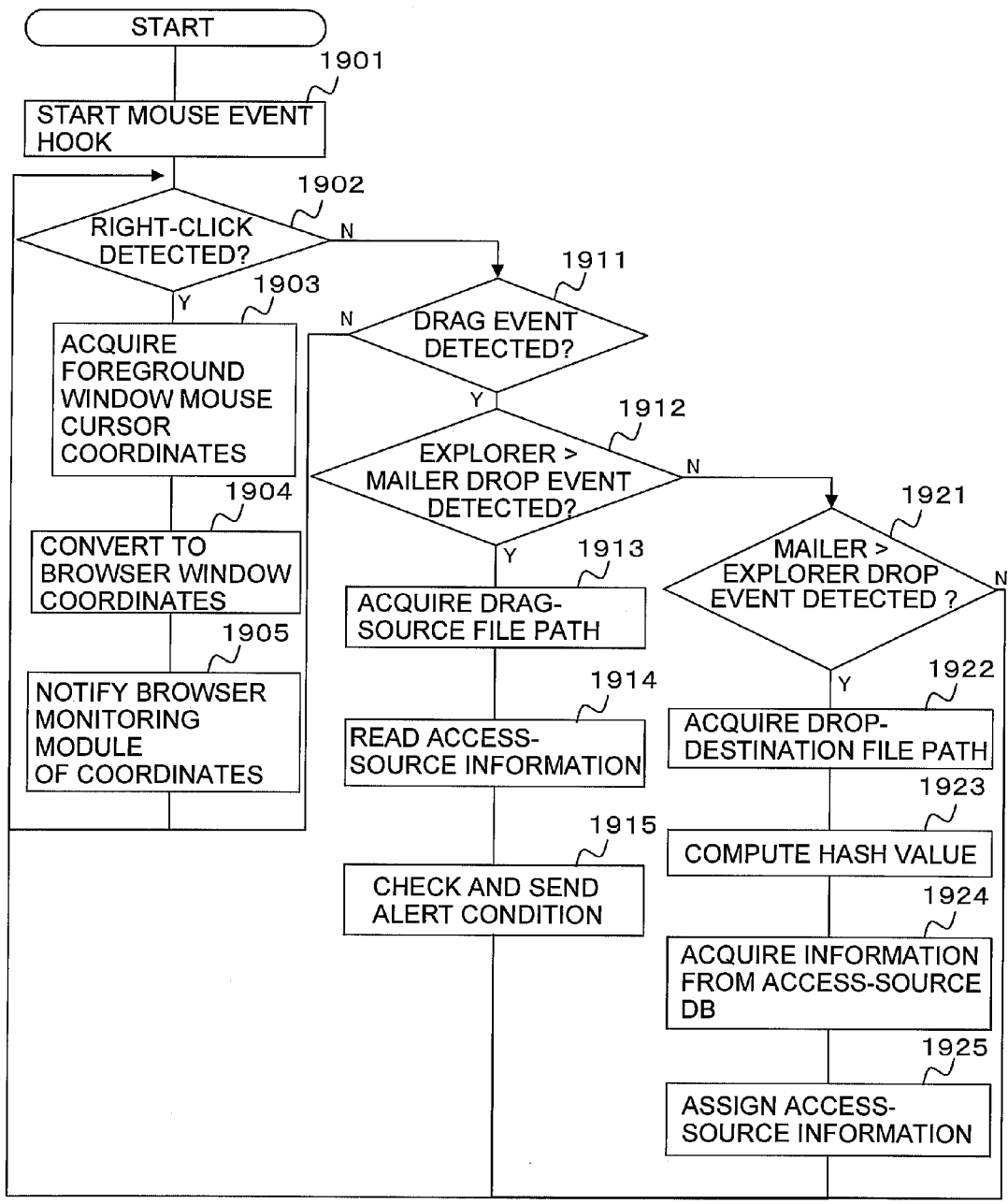
FIG. 19 is a diagram showing an example of a flowchart of the file operation monitoring module, which is a module inside the agent.

FIG. 19 is an example of a flowchart showing an overview of the processing executed by the file operation monitoring module 350.

The file operation monitoring module 350 boots up when the user log in to the client PC 121, and after starting a mouse event hook (1901), monitors for a file operation using the mouse as described using FIGS. 5, 7 and 10. The file operation monitoring module 350, upon detecting an event, determines whether or not the detected mouse operation event was a right-click (1902).

In the case of a right-click operation, the file operation monitoring module 350 acquires mouse cursor coordinates of the foreground window (1903), executes a process for converting to the browser window coordinates (1904), executes a process for notifying the browser monitoring module 330 of the coordinates acquired in Step 1904 (1905), and return to event monitoring.

Alternatively, in a case where the determination in Step 1902 was that the mouse operation event was not a right-click, the file operation monitoring module 350 executes a process for determining whether or not it was a drag event (1911), and in a case where the event was not a drag event, return to monitoring for events.

In a case where the event is a drag event, the file operation monitoring module 350 detects an event in which a dragged object was dropped, and determines whether the file dragged in the file explorer was dropped in the mailer (1912).

In a case where the determination in Step 1912 is No, the file operation monitoring module 350 proceeds to Step 1921, which will be explained further below. In a case where the determination in Step 1912 is Yes, the file operation monitoring module 350 acquires the drag-source file path (1913), reads the access-source information of the file identified by the full path acquired in Step 1913 (1914), and after checking the alert condition, sends an alert to the management server 111 as needed (1915).

In a case where the object drop destination was not the mailer in Step 1912, the file operation monitoring module 350 determines whether the drag & drop event was one in which the drag was on the mailer and the drop was in the file explorer (1921).

In a case where the determination in Step 1921 is No, the file operation monitoring module 350 returns to event monitoring, and in a case where the determination in Step 1921 is Yes, acquires the drop-destination file path of the file that was attached to the e-mail (1922). Next, the file operation monitoring module 350 computes the hash value of the file for which the full path was acquired in Step 1922 (1923), and retrieves the information registered in the access-source DB 393 (1924). In a case where the information matches a predetermined condition, such as when the access source is another user in the organization, the file operation monitoring module 350 writes the access-source information to the file indicated by the full path acquired in Step 1922 (1915).

Furthermore, as for the processing of the file operation monitoring module 350 with respect to the sequence of steps shown in FIG. 12, the file operation monitoring module 350 may also carry out processing in accordance with Steps 1922 and 1925 in a case where the drag source is the file server 115 and the drop destination is the local file system 204, and may also carry out processing in accordance with Steps 1913 and 1915 in a case where the drag source in the local file system 204 and the drop destination is a removable media.

The file operation monitoring module 350 may also carry out processing in accordance with Step 1915 in a case where the drag source is the file server 115 and the drop destination is a removable media 125.

Figure 20:
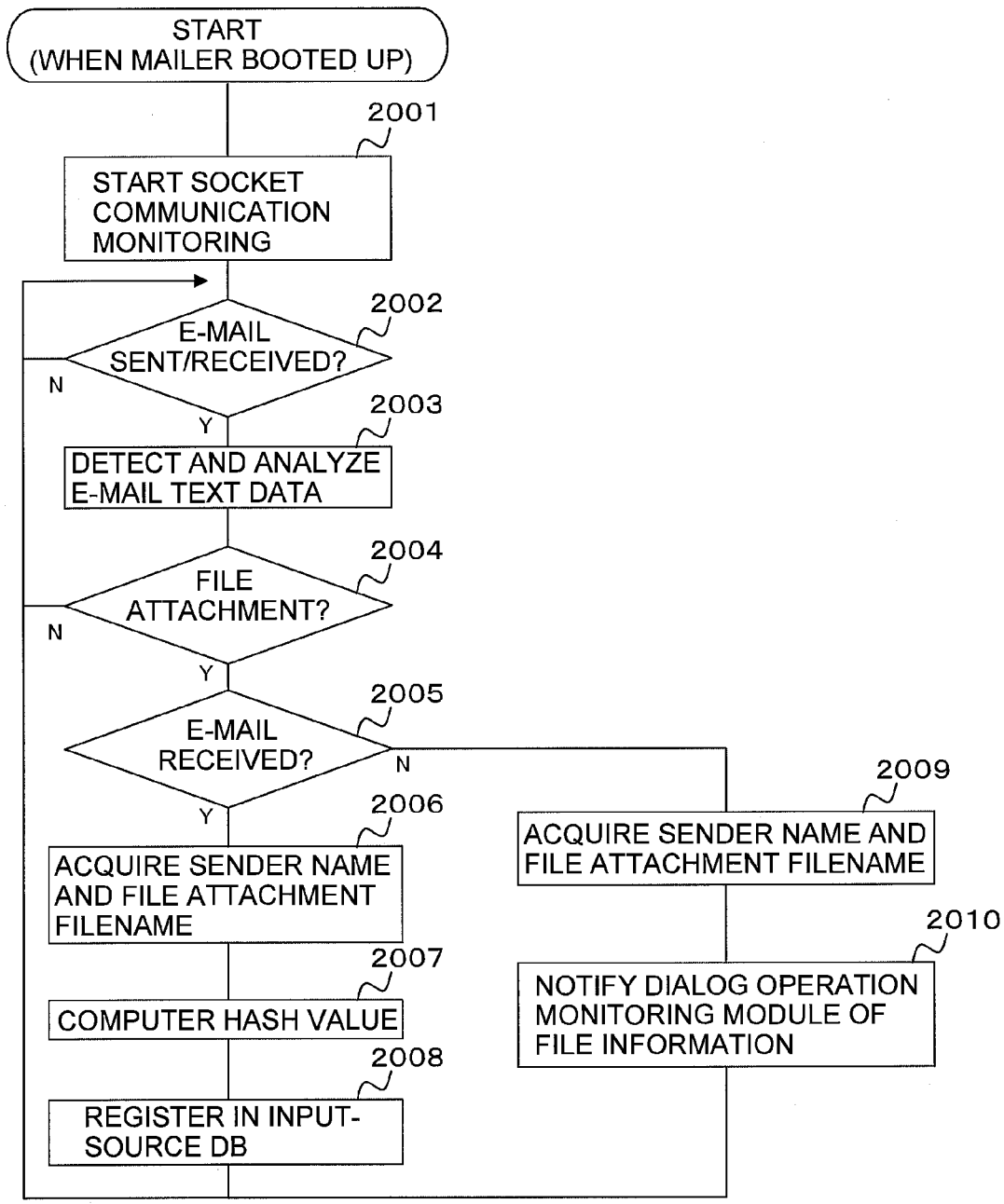
FIG. 20 is a diagram showing an example of a flowchart of the TCP communication monitoring module, which is a module inside the agent.

FIG. 20 is an example of a flowchart showing an overview of the processing executed by the TCP communication monitoring module 360.

The TCP communication monitoring module 360 boots up when the user logs in to the client PC 121, and monitors for communication data in accordance with the SMTP, POP3 and IMAP4 protocols. The TCP communication monitoring module 360 starts monitoring socket communications (2001), and determines whether or not data is being sent and received via any of the above-mentioned protocols (2002). In a case where Step 2002 is No, the TCP communication monitoring module 360 returns to monitoring socket communications, and in the case of a Yes, implements the processing of Step 2003 and subsequent steps.

In Step 2003, the TCP communication monitoring module 360 implements an e-mail data analysis. At this time, the TCP communication monitoring module 360 is able to analyze the information of the sender and the receiver from the header area of the e-mail data, and, in addition, is able to obtain information such as the presence or absence of a file attachment and a filename by analyzing the MIME (Multipurpose Internet Mail Extension) part.

Next, the TCP communication monitoring module 360 identifies whether or not the e-mail has a file attachment (2004), and in the case of an attachment, also determines whether the protocol type is either the POP3 or the IMAP4 for receiving an e-mail, or the SMTP for sending an e-mail (2005). In the case of an incoming e-mail, the TCP communication monitoring module 360 acquires the sender name and the filename of the attachment (2006), computes a hash value subsequent to decoding the file attachment data (2007), and after also carrying out a registration with respect to the access-source DB 393, returns to monitoring socket communications.

Alternatively, in a case where the determination in Step 2005 is an outgoing e-mail, the TCP communication monitoring module 360 acquires the sender name and the file attachment filename (2009), and sends the information acquired in Step 2009 to the dialog operation monitoring module 340 and the file monitoring module 360 (2010).

In accordance with the configurations and processes described hereinabove, this system makes it possible to identify the fact that information (input information) imported to the client PC 121 from a machine, which is different than a management target, was exported to a machine that is a test target. As methods for importing information to the client PC 121, there are:

(1) a download using the Web browser;
(2) a file that is attached to an e-mail; and
(3) either a copy or a move from the file server to the local file system 204 using the file explorer.

An access-source identifier 1311 comprising information related to the import source is assigned to the information imported in all of these operations.

In the case of a file system (for example, Microsoft's NTFS) comprising a function by which an access-source identifier 1311 is also assigned to post-process information (to include copied information) when a process such as a copy, a rename, or a move is carried out with respect to imported information inside the local file system of the client PC 121, an alert can be sent to the management server 111 as an information export operation envisioned by the illegal operation detection system of this example when
(1) a file upload via the Web browser,
(2) an outgoing e-mail with a file attachment,
(3) a print by an application program,
(4) either a copy or a move to a removable media is carried out.

The alert condition for sending an alert using this system may be decided based on the contents of the access-source identifier 1311. For example, the security policy 392 may be configured such that all in-house Web servers are targeted when information has been imported in accordance with a download using a Web browser, or only when a specific Web server URL included in the access-source identifier 1311 is targeted in a case where it is possible to identify the Web server in which important information is stored.

It is also possible to change the condition for outputting an alert in accordance with the time slot during which the export operation was carried out, the information type or size.

According to this example, it is possible to detect an export operation to another organization subsequent to a user having imported to the client PC 121 he is using confidential information created on another computer inside the organization as an illegal operation. Therefore, in this example, a user-executed operation that runs the risk of resulting in an information leak can be detected as an illegal operation.

Consequently, because a user operation that runs the risk of becoming an information leak is detected, it is possible to realize a function that raises an alert with respect to an illegal operation that risks the leakage of information without performing an initial setting for outputting an alert in a case where a specific information output operation is performed, or an initial setting that defines an illegal operation pattern.

It is also possible to suppress information leaks by detecting illegal operations that run the risk of resulting in an information leak incident, and managing the information accompanying the illegal operation as information to be processed using an alert.

Example 2

A second example will be explained by referring to FIGS. 23 through 40. In this example, in-file trace information for managing the history of file operations is stored in each file, and the same information as the in-file trace information is stored in the management server 111. In the explanations of the following examples, to include this example, the focus will be on those portions that differ from the example described hereinabove.

Figure 23:
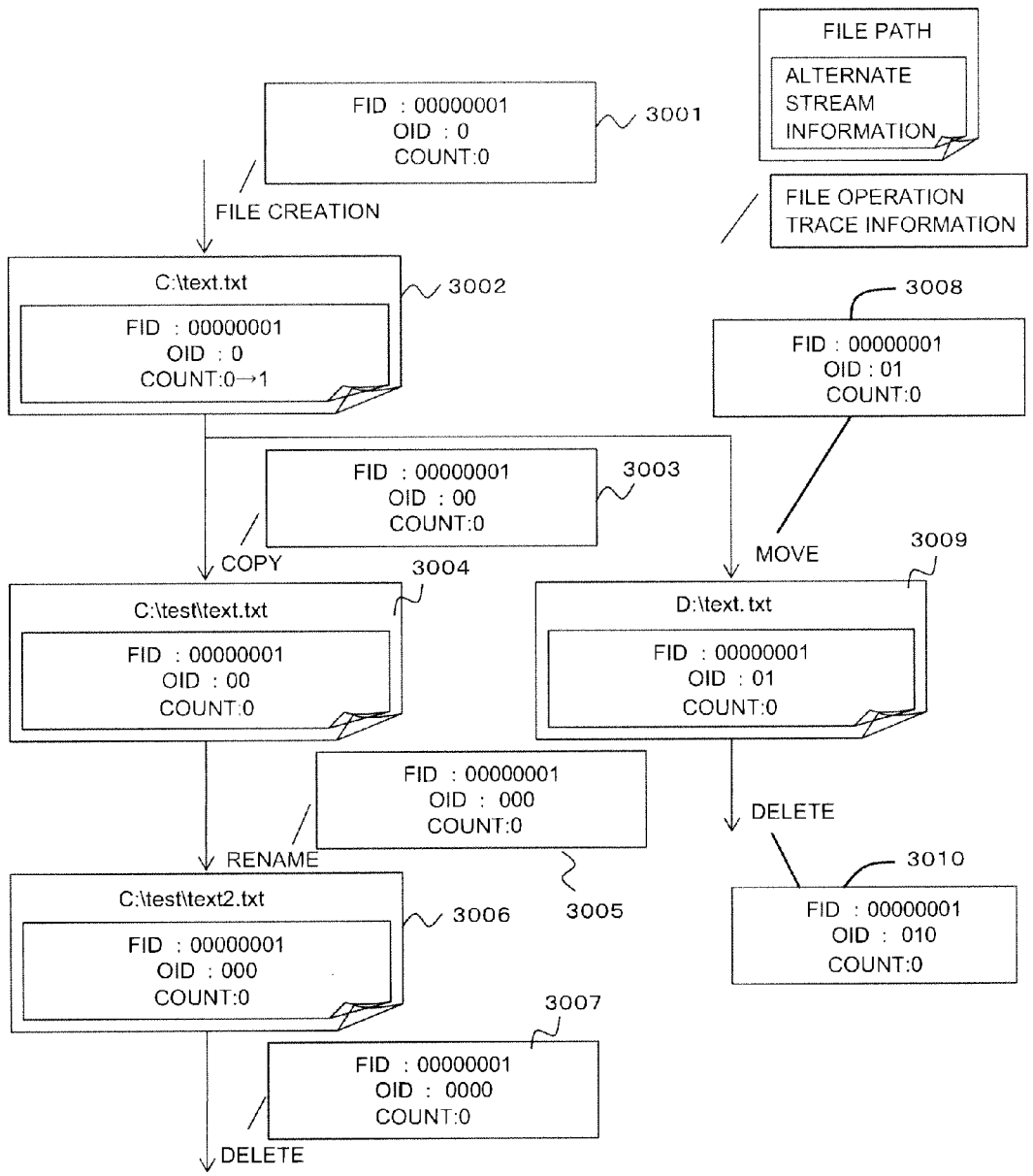
FIG. 23 shows how meta-information (in-file trace information) is created in accordance with a file operation related to a second example of the present invention.

FIG. 23 shows how in-file trace information is created. The in-file trace information, for example, is information denoting a file, its generation, and how many times it has been copied, and, for example, is stored in the NTFS alternate data stream (alternate stream hereinafter). As will be explained hereinbelow, referencing the in-file trace information makes it possible to learn the relationship between files relatively easily, and to display inter-file relationships as a tree structure.

When the user creates a new file, this file creation is detected by the file operation monitoring module 350. The file operation monitoring module 350 creates in-file trace information (3001). The created in-file trace information is stored in the alternate stream of the file 3002. In addition, the agent program 122 sends the created in-file trace information to the manager 112. In accordance with this, the same information as the in-file trace information is also stored in the PC management DB (3101 of FIG. 29).

The in-file trace information, for example, comprises a file storage identifier (FID), an operation identifier (OID), and a count. The file storage identifier is information that is configured in a case where the file is stored in the file system 204 of the client PC 121, and is for uniquely identifying this file. The operation identifier corresponds to the "operation generation information", and is information denoting the number of times the file has been put into operation (the generation). The count corresponds to the "copy frequency information", and denotes the number of times the file has been copied. In other words, the count denotes the number of lineages that branched from a file.

Furthermore, the "count" shown in the file 3002 is also used for creating the next operation identifier. That is, since the lineages increase by one every time the file is copied, the count value in the operation-source file is passed along to the operation identifier of the operation-destination file to denote how many times a file of a certain lineage has been put into operation.

Next, in a case where the file 3002 has been copied, the file operation monitoring module 350 acquires the in-file trace information from the alternate stream of the file 3002, and creates post-copy operation in-file trace information (3003). The created in-file trace information (3003) is stored in the alternate stream of the copy-destination file 3004. In addition, the same information as this in-file trace information is associated with the copy-destination file and stored in the PC management DB.

In line with the copy operation, the value of the count of the copy-source file 3002 is updated from "0" to "1". The copying of the file signifies that a new file of the same content is created while the copy source remains as-is. That is, multiple files having the same content exist together. Accordingly, the count value is updated in accordance with the copy frequency, and a distinction is made between the lineage of each copy.

The file operation is a copy, an operation-source file 3002 is a copy-source file, an operation-destination file 3004 is a copy-destination file. The copy-source file 3002 and the copy-destination file 3004 comprise the same file data. Therefore, the file storage identifier of the copy-source file 3002 is the same as the file storage identifier of the copy-destination file 3004.

The explanation will focus on the changing of the operation identifier. The operation identifier of the copy-source file 3002 is "0". Each time the number of operations increases by one, the number of digits of the operation identifier increases by one. The operation identifier of the operation-destination file is comprised from the operation identifier and the count of the operation-source file. The operation identifier of the operation-source file 3002 is "0", and the count is also "0". Therefore, the operation identifier of the operation-destination file 3004 is created as "00" by lining up the operation-source file 3002 operation identifier "0" next to the operation-source file 3002 count "0".

That is, the operation identifier denotes both the number of operations and the lineages (number of branches). The number of digits of the operation identifier denotes the number of operations. Two digits denote a second operation. In the above example, the first operation is the creation of the file. A numeral (or character) other than "0" included in the operation identifier denotes a descendent of nth copies. For example, a file 3006, which has an operation identifier of "000" is the direct descendant of the file 3002, which has an operation identifier of "0", and is the file that was created in accordance with a third operation.

A case in which the name of a file 3004 has been changed either manually or automatically will be explained. The file operation in this case is a rename. The operation-source file is the rename-source (pre-rename) file 3004. The operation-destination file is the rename-destination (post-rename) file 3006.

The file operation monitoring module 350 acquires the in-file trace information from the alternate stream of the file 3004, and creates post-rename in-file trace information (3005). The created in-file trace information (3005) is stored in the alternate stream of the rename-destination file 3006. Similar to the description given above, the same information as this in-file trace information is associated with the rename-destination file 3006, and is stored in the PC management DB.

Only the name of the rename-destination file 3006 changes, and it comprises the same file data as the file 3004. Therefore, the file storage identifier of the rename-source file 3004 and the file storage identifier of the rename-destination file 3006 are the same.

The operation identifier "000" of the rename-destination file 3006 is created by lining up the rename-source file 3004 operation identifier "00" and the count "0". Since the rename-source file 3006 operation identifier "000" has three digits, it is clear that this file 3006 is the file that was created by the third operation counting from the creation of the file 3002, which is the source. Furthermore, "0" is configured in the count of the rename-destination file 3006.

A case in which the file 3006 that underwent the rename has been deleted from the file system 204 either manually or automatically will be explained. The file operation here is a file deletion. The operation-source file is deletion-target file 3006. An operation-destination file does not exist. This is because the file will be deleted.

The operation-destination file does not exist, but in-file trace information 3007 for an operation-destination file is created. The file storage identifier is the same as the file storage identifier of the deletion-target file 3004. The operation identifier "0000" is created by lining up the deletion-target file 3004 operation identifier "000" and the count "0". The same information as the in-file trace information 3007 created for the operation-destination file is stored in the PC management DB.

A case in which the source file 3002 has been moved will be explained. In this case, the file operation is a file move, the operation-source file is the move-source file 3002, and the operation-destination file is the move-destination file 3009. The file operation monitoring module 350, upon detecting this file move, acquires the in-file trace information of the move-source file 3002, and creates in-file trace information 3008 for the move-destination file 3009 based on this in-file trace information.

Similar to a file copy, there is no change in the file data before or after the file operation for a file move. Therefore, in the in-file trace information 3008 of the move-destination file 3009, the file storage identifier is the same as the file storage identifier of the move-source file 3002. The operation identifier "01" in the in-file trace information 3008 of the move-destination file 3009 is created by lining up the move-source file 3002 operation identifier "0" and the count "1". Furthermore, as was described hereinabove, the initial value "0" is configured in the move-destination file 3009 count.

Furthermore, in the case of a file move, unlike a file copy, the move-source file 3002 ceases to exist and only the move-destination file 3009 remains in the file system 204. However, the in-file trace information 3001 related to the move-source file 3002 continues to be stored in the PC management DB.

A case in which the move-destination file 3009 has been deleted will be explained. The file operation in this case is a file deletion, and the operation-source file is the deletion-target file 3009. Since the file is to be deleted, the operation-destination file does not exist. However, as was explained hereinabove, in-file trace information 3010 for an operation-destination file is created and stored in the PC management DB. An operation identifier "010" is created in the in-file trace information 3010 by lining up the deletion-target file 3002 operation identifier "1" and the count "1". The initial value "0" is configured in the count value of the in-file trace information 3010.

The history of the file operations described using FIG. 23 will be explained once again by referring to FIGS. 24 through 28. In FIGS. 24 through 28, each file operation shown in FIG. 23 will be explained one at a time. However, the duplicate file operations (the file deletions) among the respective file operations shown in FIG. 23 are shown only once in the FIGS. 24 through 28.

Figure 24:
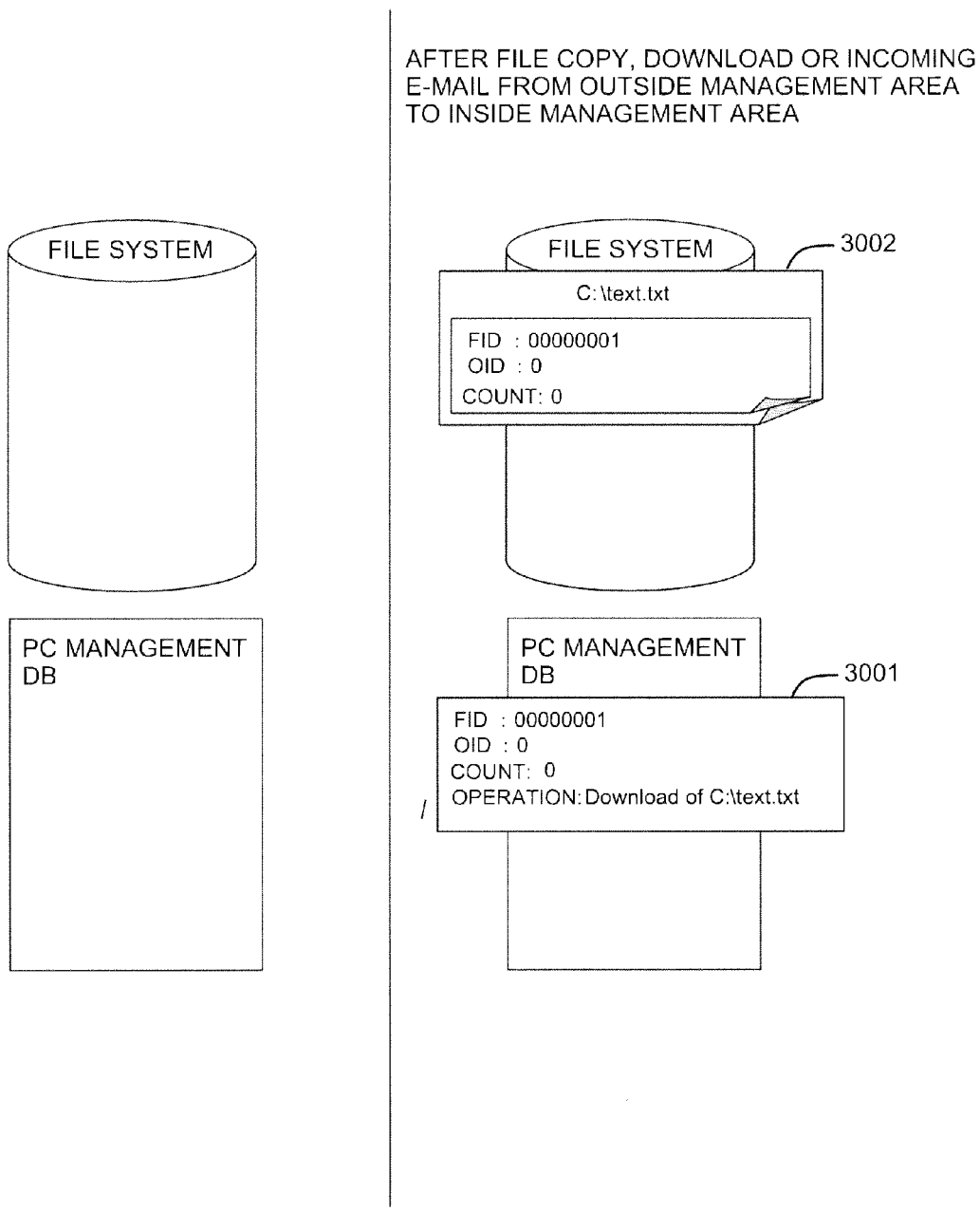
FIG. 24 shows an initial state, and a state in which in-file trace information is created in accordance with either a file copy or a file download.

The relationship between the in-file trace information and the storage contents of the PC management DB are shown in FIGS. 24 through 28. The left side of FIG. 24 shows the initial state. In the initial state, there are no files stored in the file system 204 of the client PC 121, and there are no records recorded in the PC management DB.

The right side of FIG. 24 shows a state in which one file 3002 has been stored in the file system. For example, a file, such as a file downloaded from the Web server 116 or 131, a file downloaded from the file server 115, a file copied from the removable media 125, or a file attached to an e-mail, is stored in the file system.

When the file 3002 is stored in the file system 204, in-file trace information 3001 for this file is created. In this in-file trace information 3001, "0" is configured in the operation identifier, and the initial value "0" is also configured in the count. The same information as the in-file trace information 3001 is stored in the PC management DB. In addition, the content of a file operation (information denoting where the file was acquired from) is also stored together in the PC management DB.

Figure 25:
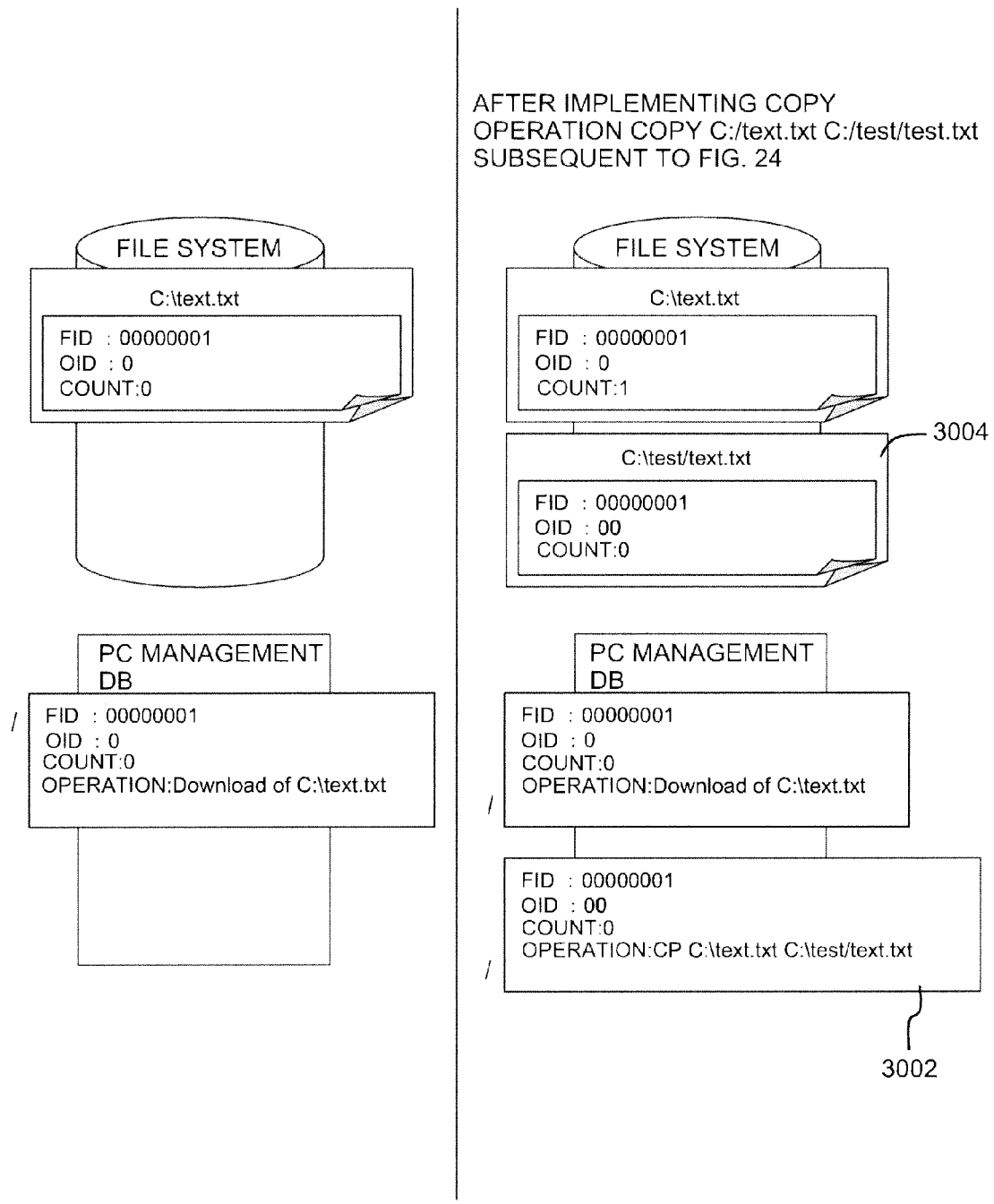
FIG. 25 shows a state in which a copy operation is performed based on the state shown on the right side of FIG. 24.

Refer to FIG. 25. The left side of FIG. 25 is the same as the right side of FIG. 24. Therefore, the state of the right side of FIG. 25 will be explained. The right side of FIG. 25 shows a state in which the initial file 3002 (C:\test.txt) stored in the file system in the right side of FIG. 24 has been copied to another directory. In the in-file trace information 3003 of the copy-destination file 3004 (C:\test\test.txt), "00" is configured in the operation identifier (OID), and "0" is configured in the count. The file storage identifier (FID) is the same as prior to the copy. The same information 3003 as the in-file trace information of the copy-destination file 3004 is associated with the operation content and stored in the PC management DB.

The creation of a single copy (C:\test\test.txt) from the initial file 3002 (C:\test.txt) changes the count value included in the in-file trace information of the initial file 3002 from "0" to "1". However, the record corresponding to the in-file trace information of the initial file 3002 stored in the PC management DB does not change before or after the copy operation. The in-file trace information of the initial file 3002 that is stored in the PC management DB does not change at all. That is, the same information as the post-file operation in-file trace information is stored in the PC management DB, and the content of the record corresponding to the in-file trace information of the file that has been put into operated does not change thereafter even in a case where the file corresponding to this in-file trace information is put into operation yet again.

Figure 26:
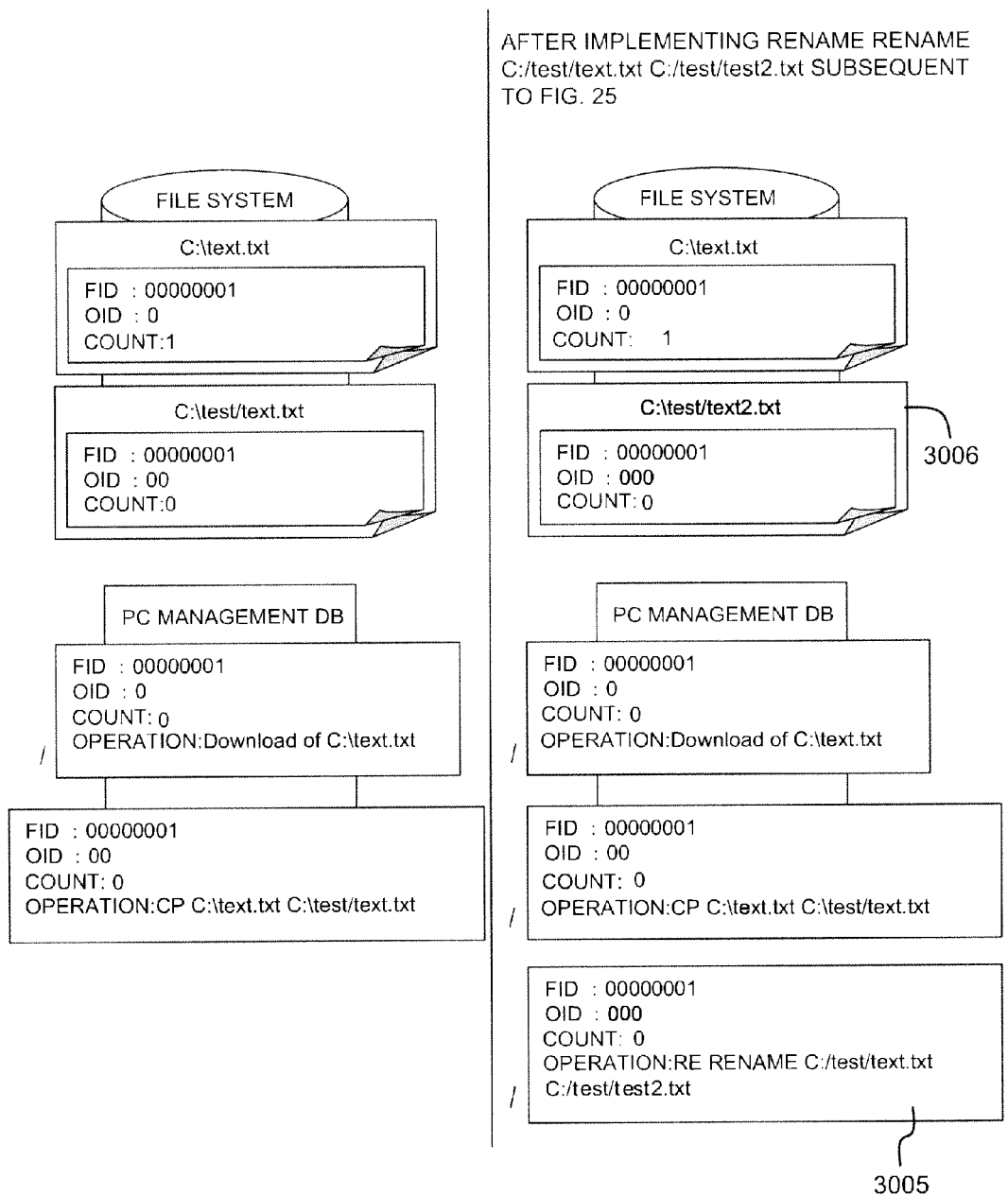
FIG. 26 shows a state in which a filename is changed based on the state shown on the right side of FIG. 25.

Refer to FIG. 26. The left side of FIG. 26 is the same as the right side of FIG. 25. Therefore, the state of the right side of FIG. 26 will be explained. The right side of FIG. 26 denotes a state in which the filename of the file 3004 that was copied in the right side of FIG. 25 has changed from "text.txt" to "text2.txt".

In-file trace information of the rename-destination file 3006 (C:\test\text2.txt) is created based on the in-file trace information of the rename-source file 3004 (C:\test\text.txt). This created in-file trace information is stored in the alternate stream of the rename-destination file 3006. In addition, the same information 3005 as the created in-file trace information is also stored in the PC management DB.

An operation identifier "000" is configured in the in-file trace information of the rename-destination file 3006. The operation identifier "000" related to the rename-destination file 3006 is created by lining up the operation identifier "00" and the count "0" of the rename-source file 3004 to make three digits. The initial value "0" is configured in the count related to the rename-destination file 3006.

Focusing on the PC management DB shown in the lower right of FIG. 26, a total of three pieces of in-file trace information, i.e., the in-file trace information related to the initial file 3002 (more accurately, the information which added the operation content to the same information as the in-file trace information. The same holds true hereinbelow), the in-file trace information related to the copied file 3004, and the in-file trace information related to the renamed file 3006, are stored in the PC management DB. As described hereinabove, the content of the respective pieces of in-file trace information stored in the PC management DB does not change regardless of a subsequent file operation. This is because the transition (history) of the file operations are detected and visualized based on the respective pieces of in-file trace information stored in the PC management DB.

Figure 27:
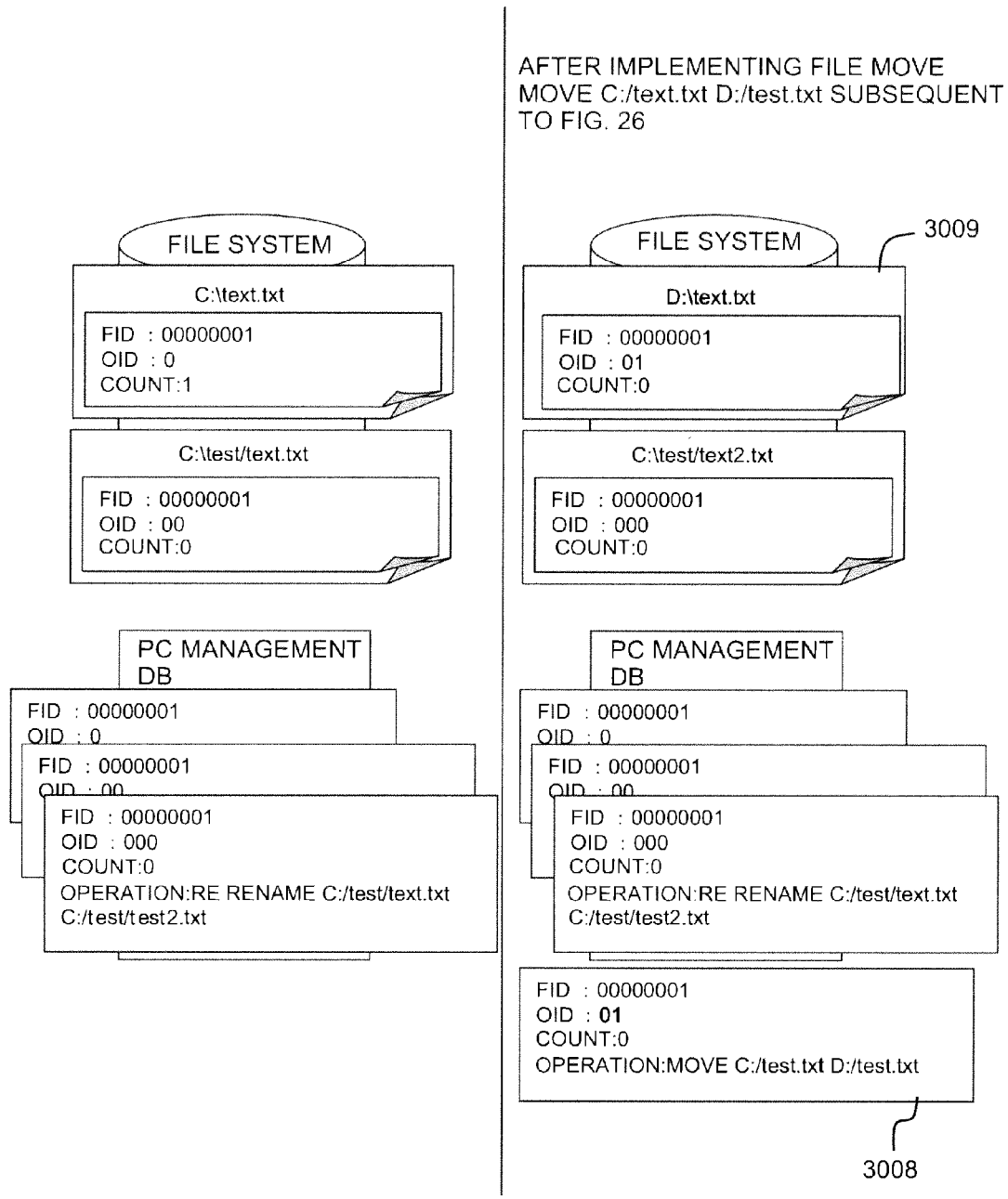
FIG. 27 shows a state in which a file is moved based on the state shown on the right side of FIG. 26.

Refer to FIG. 27. The left side of FIG. 27 is the same as the right side of FIG. 26. Therefore, the state of the right side of FIG. 27 will be explained. The right side of FIG. 27 shows a state in which the initial file 3002 (C:\text.txt) has been moved to another directory (D:\).

The in-file trace information related to the move-destination file 3009 (D:\text.txt) is created based on the in-file trace information of the move-source file 3002 (C:\text.txt) and stored in the alternate stream of the move-destination file 3009. The same as above, the same information as this in-file trace information is sent to and stored in the PC management DB.

The operation identifier "01" related to the move-destination file 3009 is created by lining up the operation identifier "0" and the count "1" of the move-source file 3002 to achieve two digits. The initial value "0" is configured in the count value. Furthermore, there is no change in the file storage identifier throughout FIGS. 24 through 28.

Figure 28:
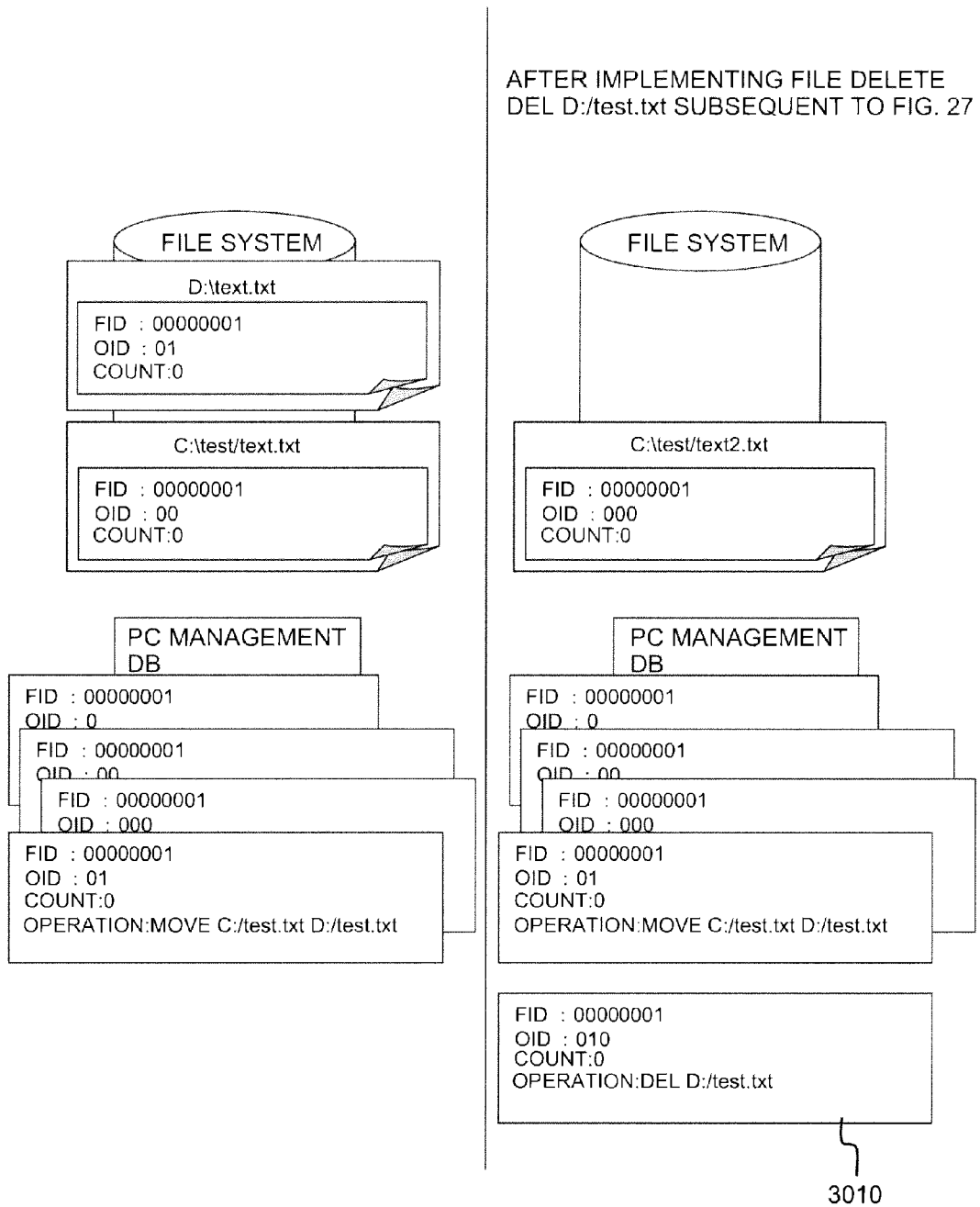
FIG. 28 shows a state in which a file is deleted based on the state shown on the right side of FIG. 27.

Refer to FIG. 28. Since the left side of FIG. 28 is the same as the right side of FIG. 27, the state of the right side of FIG. 28 will be explained. The right side of FIG. 28 shows a state in which the file 3009 that was moved in the right side of FIG. 27 is deleted from the file system.

The in-file trace information of the deleted file is created based on the in-file trace information of the deletion-target file 3009 (D:\text.txt). The same information 3010 as the created in-file trace information is sent to and stored in the PC management DB. The created in-file trace information is not stored in the alternate stream. This is because the file is deleted, and an alternate stream for storage does not exist.

The operation identifier "010" related to the deleted file is created by lining up the operation identifier "01" and the count "0" of the deletion-target file 3009 to achieve three digits. The initial value "0" is configured in the count related to the deleted file. Since the file has already been deleted, this count value does not increase.

FIG. 29 shows an example of PC management DB storage. Management data like that shown in FIG. 29 is stored in the PC management DB in accordance with the execution of multiple file operations like those shown in FIG. 23. The PC management DB comprises records 3101 through 3106 corresponding to the respective file operations. Each record in the PC management DB, for example, comprises a file storage identifier field 3110, an operation identifier field 3111, an operation type field 3112, an operation-source path field 3113, and an operation-destination path field 3114. In addition, for example, it is also possible to manage information, such as a file operation date/time and information on a user that operates on a file, in the PC management DB. Of the respective fields mentioned above, the file storage identifier field 3110 and the operation identifier field 3111 are indispensable information for tracing and visualizing a file operation. The other fields are information showing the content of a file operation.

In a case where a user (administrator) wishes to output a file operation history, the following processing is executed. First, the user selects the in-file trace information that constitutes the source. The manager 112 inside the management server 111 retrieves the PC management DB using the file storage identifier included in the in-file trace information selected by the user. In accordance with this, only the records comprising the file storage identifier selected by the user are extracted. In addition, the manager 112 sorts the respective records comprising the user-selected file storage identifier based on the operation identifiers.

The information obtained in this way shows the history of all the file operations originating from the same file. In-file trace information, in which the first through the last but one digits of the operation identifier are the same, belongs to operations of the same lineage. In-file trace information having one more operation identifier digit (one more operation identifier character) than the other in-file trace information that belongs to the same lineage of file operations denotes a subsequent operation.

Figure 30:
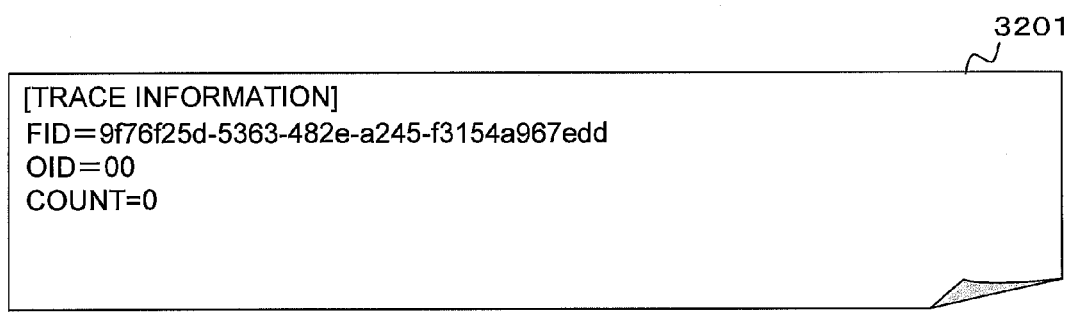
FIG. 30 shows an example of the in-file trace information.

FIG. 30 shows an example of in-file trace information stored in an alternate stream. In this example, the file identifier, the operation identifier, and the count are stored using the ini file format. In this example, it is supposed that an UUID (Universally Unique Identifier) is configured in the file identifier, the operation identifier is 32 characters, the ranges of usable characters of the operation identifier are 0 through 9, A through Z, and a through z, and the count range is from 0 to 60.

Figure 31:
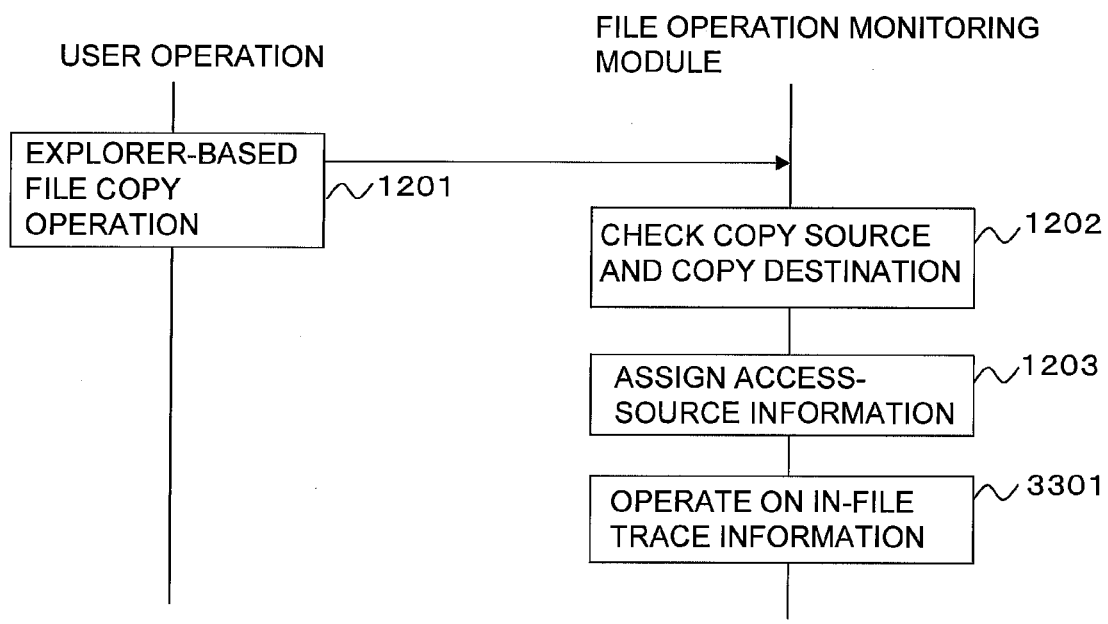
FIG. 31 shows a sequence of steps by which a user monitors a file operation.

FIG. 31 shows a sequence of steps for monitoring a file operation. When the user uses an application program such as explorer to perform a file operation (for example, any of a file create, move, copy, rename, or delete) (1201), the file operation monitoring module 350 detects this file operation. The focus of the following explanation will be a file copy.

The file operation monitoring module 350 checks the copy source and the copy destination (1202), and writes access-source information as needed to the alternate stream of the file being put into operation (1203). Then, the file operation monitoring module 350 writes in-file trace information to the alternate stream of the file that was put into operation (3301).

In a case where explorer or another such application program is used to either move or copy a file as explained hereinabove, the content of the file alternate stream is also either moved or copied (the value of the operation identifier changes). When a file is deleted, the content of the alternate stream is also deleted.

The file operation monitoring module 350 creates operation-destination in-file trace information, sends the operation-destination in-file trace information to the manager 112 and stores same in the PC management DB, and, in addition, updates the operation-source in-file trace information as needed. An in-file trace information operation will be explained in detail further below.

Figure 34:
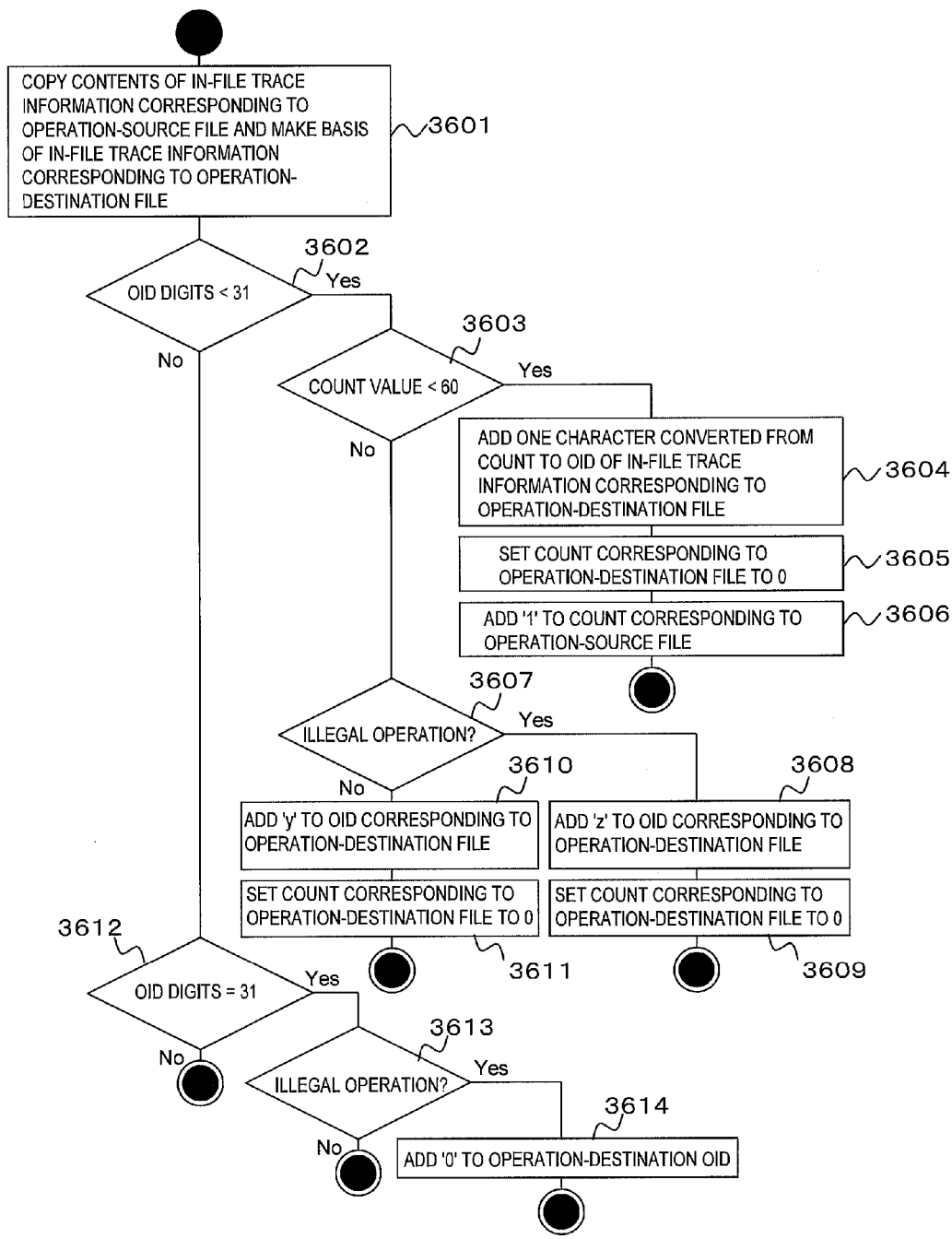
FIG. 34 is a flowchart showing a process for creating the in-file trace information in a destination file, and a process for updating the in-file trace information of a source file.

FIG. 34 is a flowchart showing the details of process 3301 for operating on the in-file trace information shown in FIG. 31. Firstly, the file operation monitoring module 350 (may be abbreviated as monitoring module 350 hereinafter) determines whether or not the operation is a file operation source (3401). An operation that is a file operation source signifies the creation of a file. For example, an operation that downloads a file from a Web server or the like to the client PC 121 corresponds to an operation that is the source of a file.

When the determination is that the operation is a file operation source, the monitoring module 350 creates new in-file trace information (3402), and writes the newly created in-file trace information to the alternate stream of the newly created file (3403). In addition, the monitoring module 350 sends the newly created in-file trace information to the manager 112 and stores same in the PC management DB (3404).

When the determination is that the file operation does not constitute a source, the monitoring module 350 attempts to acquire in-file trace information from the alternate stream of the file that is the operation source (3410). The monitoring module 350 determines whether or not it is possible to acquire the in-file trace information from the alternate stream of the operation-source file (3411). In a case where it is not possible to acquire the in-file trace information from the alternate stream of the operation-source file, the monitoring module 350 creates new in-file trace information for the operation-source file (3412).

For example, the in-file trace information will not be written in the alternate stream of a file that existed prior to the file operation history management system related to this example being installed in the computer system. Therefore, for a file like this, new in-file trace information is created and written to the alternate stream (3412 and 3418).

The monitoring module 350 creates the in-file trace information related to the operation-destination file, and, in addition, in a case where updating is required, updates the in-file trace information related to the operation-source file (3413). In a case where it was possible to acquire the in-file trace information from the alternate stream of the operation-source file in Step 3411, processing moves to Step 3413.

The monitoring module 350 executes a user-desired file operation (3414), and determines whether or not the operation-destination file exists (3415). In a case where the operation-destination file exists, the monitoring module 350 writes the in-file trace information related to the operation-destination file created in Step 3413 to the alternate stream of the operation-destination file (3416).

In a case where the operation-destination file does not exist, the monitoring module 350 determines whether or not the operation-source file exists (3417). In a case where the operation-source file exists, the monitoring module 350 writes the in-file trace information created in Step 3413 to the alternate stream of the operation-source file when updating is required (3418). For example, in the case of a file copy, it is necessary to increase the count value inside the in-file trace information related to the operation-source file (the copy-source file).

In a case where either the operation-source file does not exist, or the in-file trace information stored in the alternate stream of the operation-source file has been updated, the monitoring module 350 sends the in-file trace information related to the operation-destination file to the manager 112, and stores same in the PC management DB (3419).

As explained hereinabove, in the case of a file create, copy, move, and rename, the operation-destination file exists. In the case of a file deletion, the operation-destination file does not exist. In a case where the operation-destination file does not exist, the in-file trace information for the operation-destination file created in Step 3413 is managed solely by the PC management DB.

In the case of a file move, rename, and delete, the operation-source file ceases to exist. The operation-source file exists only in the case of a file create or copy.

Figure 32:
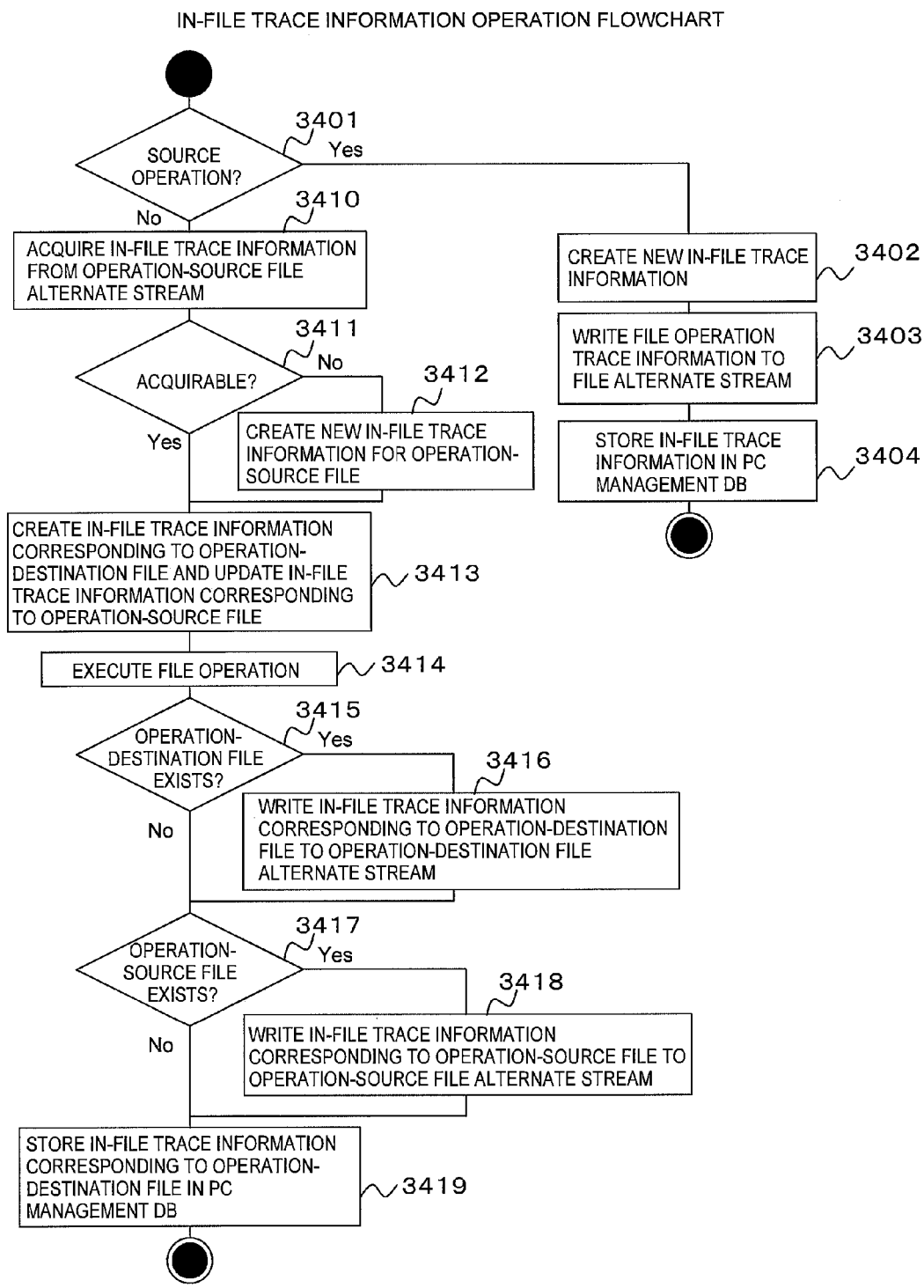
FIG. 32 is a flowchart showing a process for either creating or updating the in-file trace information.
Figure 33:
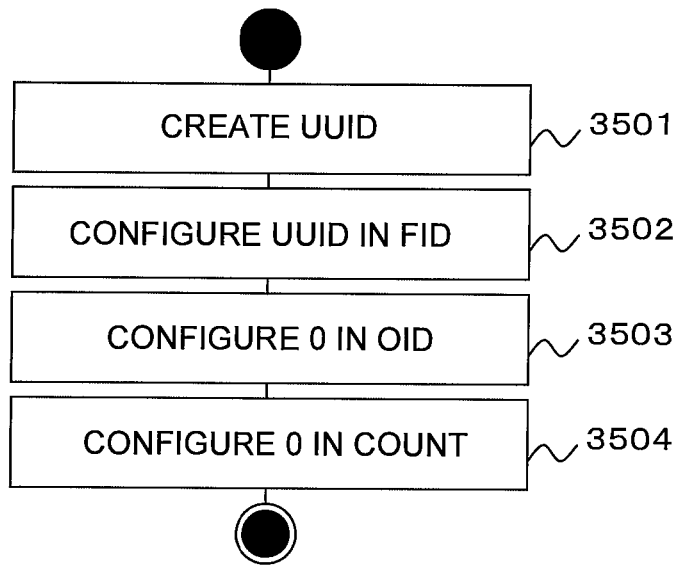
FIG. 33 is a flowchart showing a process for creating the in-file trace information.

FIG. 33 shows the details of Step 3402 in FIG. 32. The monitoring module 350 creates the UUID (3501), and configures the UUID in the file storage identifier in the in-file trace information (3502). The monitoring module 350 configures the initial value "0" in the operation identifier (3503), and also configures the initial value "0" in the count (3504).

FIG. 34 is a flowchart showing the details of Step 3413 in FIG. 32. The monitoring module 350 creates a copy of the in-file trace information related to the operation-source file, and makes this copy the basis for the operation-destination in-file trace information (3601).

The monitoring module 350 determines whether or not the operation identifier of the in-file trace information related to the operation-destination file is less than 31 digits (3602). As described above, the operation identifier is increased by one each time an operation is performed, and the upper limit of the number of digits is 32.

In a case where the operation identifier is less than 31 digits, the monitoring module 350 determines whether or not the count value in the in-file trace information related to the operation-destination file is less than 60 (3603). As described above, the count increases by one each time a copy is performed, and the upper limit for this count is 60. In a case where the count value is less than 60, the monitoring module 350 adds one character that has been converted from the count related to the operation-source file to the end of the operation identifier related to the operation-destination file (3604). In accordance with this, the operation identifier related to the operation-destination file becomes a value obtained by lining up the operation identifier related to the operation-source file and the count related to the operation-source file.

FIG. 35 shows a table for converting a count value to a character. As shown in FIG. 35, for a count value that is between "0" and "9", a numeral from 0 through 9 is assigned. For a count value that is between "10" and "35", an upper case alphabet from A through Z is assigned. For a count value that is between "36" and "59", a lower case alphabet from a through x is assigned. For example, in a case where the operation-source file-related operation identifier is "000" and the count value is "29", the operation identifier of the operation-destination file becomes "000T", which is obtained by lining up the "000" with "T (=29)".

Return to FIG. 34. Subsequent to Step 3604, the monitoring module 350 configures the initial value "0" in the count related to the operation-destination file (3605), and in a case where a count update is required, also increases the count value related to the operation-source file by one (3606). That is, in a case where a file has been copied, the monitoring module 350 increases the count value of the operation-source file by one. In the case of a file operation other than copy, the count value of the operation-source file does not change.

In a case where the count value related to the operation-destination file is not less than 60, the monitoring module 350 determines whether or not it is an illegal operation (3607). As described in the first example, in a case where a file, for which the access-source identifier has been configured, is outputted to either an external server or a removable media, for example, this can be determined to be an illegal operation.

In the case of an illegal file operation determination, the monitoring module 350 configures a "z" in the last ($60^{th}$) digit of the operation identifier related to the operation-destination file (3608). A "0" is configured in the count related to the operation-destination file (3609).

In a case where the determination is that the file operation is not illegal, the monitoring module 350 configures a "y" in the last ($60^{th}$) digit of the operation identifier related to operation-destination file (3610). A "0" is configured in the count related to the operation-destination file (3611).

In a case where it has been determined that the operation identifier is not less than 31 digits, a determination is made as to whether or not the operation identifier is 31 digits (3612). In a case where the operation identifier is not 31 digits, this processing ends. In a case where the operation identifier is 31 digits, the monitoring module 350 determines whether or not an illegal file operation has occurred (3613). In a case where an illegal file operation has not occurred, this processing ends. In a case where an illegal file operation has occurred, the monitoring module 350 adds a "0" to the last digit of the operation identifier related to the operation-destination file to create a 32-digit operation identifier (3614).

The reason for determining that the file operations were illegal in Steps 3607 and 3613 will be explained. For example, in a case were a file is either written to the removable media 125 or uploaded to the external Web server 131, it is not possible to write the in-file trace information to the alternate stream of the operation-destination file. This is because the operation-destination file exists outside of the client PC 121 file system 204. Therefore, the operation-destination file in the case on an illegal operation is equivalent to a leaf at the end of the tree structure.

However, due to limited data storable areas, in this example, the operation identifier is restricted to 32 digits (32 characters), and the ranges of usable characters for use as the operation identifier are restricted to 0 through 9, A through Z, and a through z.

In a case where the file operation history is traced regardless of whether or not it is an illegal operation, two groups can be formed, i.e. a group of files for which the operation identifier ends in "z", and a group of files in which the operation identifier has reached the upper limit value of 32 characters. These file groups become the leaf portions in the tree structure of the file operation history, but are not necessarily files that have been put into operation illegally.

Therefore, in this example, in a case where the operation identifier is 32 characters (3614), and a case where the operation identifier ends in "z" (3608), it is supposed that the value (state) is that of an illegal operation. In the case of an operation other than an illegal operation, these values respectively transition to the immediate previous state, i.e., to a state in which the number of digits of the operation identifier is 31 characters, and a state in which the character "y" is added to the operation identifier.

Figure 36:
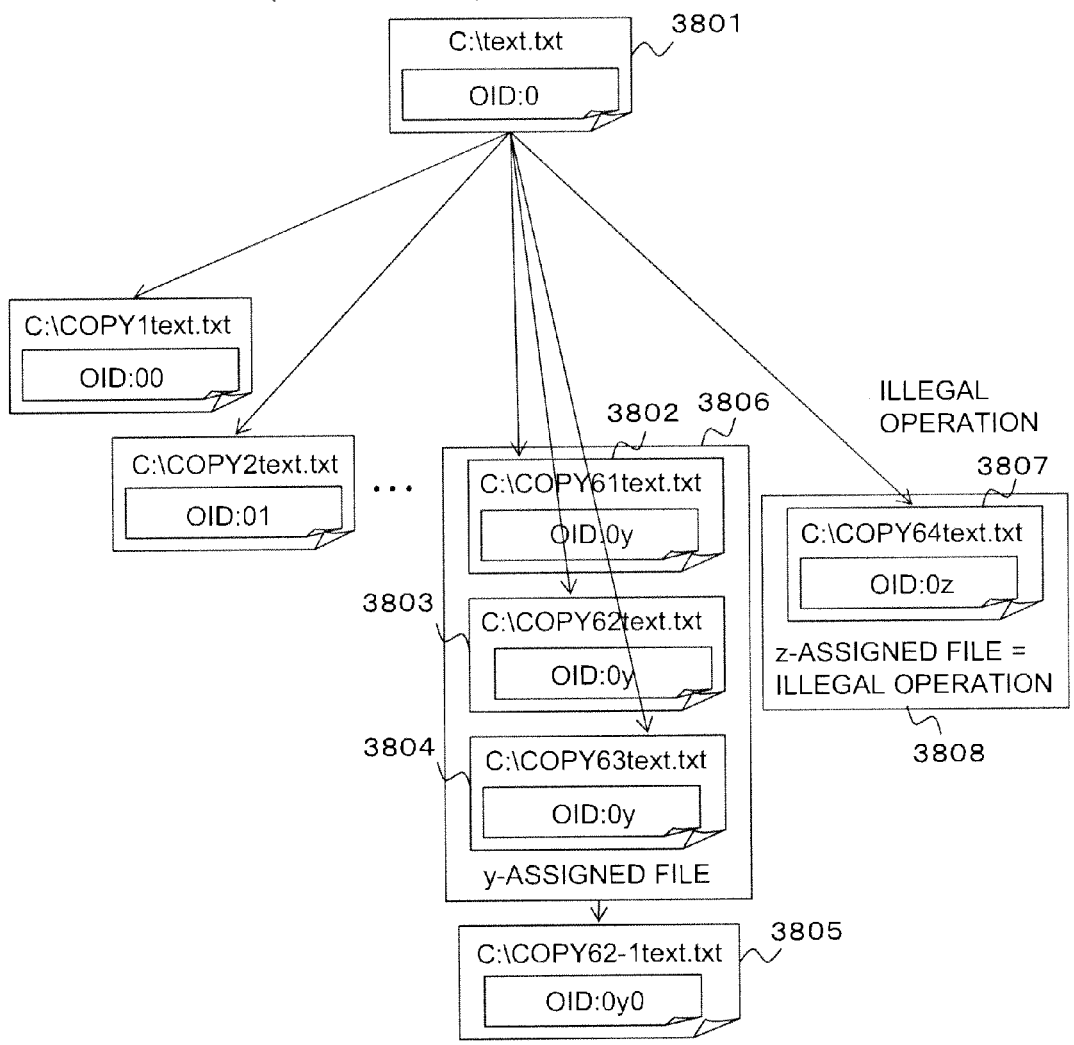
FIG. 36 shows how a character code is appended to the last digit of an operation identified in a case where the copy frequency has reached a predetermined copy frequency.

FIG. 36 shows a tree structure of a file operation history in a case where the same file has been copied numerous times. Each time the source file 3801 is copied, the character assigned to the operation identifier related to the copy-destination file increases from 0, 1, 2, . . . until at last it reaches the upper limit of "y" (3802).

A "y" is assigned to all operation identifiers of files that are created by subsequent copy operations that are not illegal operations (3803, 3804). Thereafter, when an illegal operation is carried out with respect to the file 3801, "z" is assigned to the operation identifier (3807). An operation for which "z" has been assigned to the operation identifier cannot have a child node. Therefore, it is clear at a glance that an operation for which "z" has been configured at the end of the operation identifier is an illegal operation.

Figure 37:
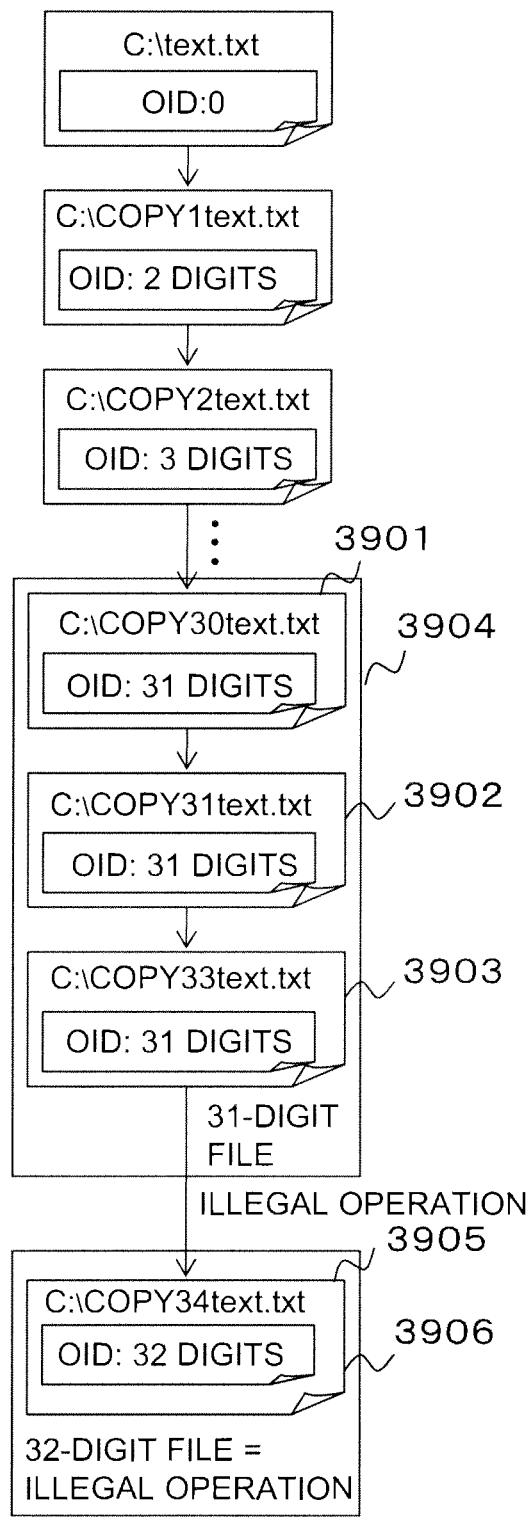
FIG. 37 shows how to set the number of digits of an operation identifier to an upper limit in a case where a file has been illegally put into operation subsequent to the number of operations (operation generation number) having reached a predetermined number of operations.

FIG. 37 shows a case in which the operation-destination file is put into operation yet again. When a copy operation is repeated, the digits of the operation identifier increase, and the operation identifier finally reaches the upper limit of 31 digits (3901). In a case where a file for which the operation identifier has reached 31 digits is put into operation once again, the operation identifier is not updated (3902, 3903). In a case where any file that belongs to a file group (3904) in which the operation identifier has reached 31 digits is taken outside the organization, a "0" is configured in the operation identifier related to this taken file. Consequently, the operation identifier thereof becomes 32 digits, and this file becomes a leaf on the tree structure the same as when "z" is assigned to the operation identifier. Therefore, it is immediately clear from looking at the tree structure that this was an illegal operation.

Figure 38:
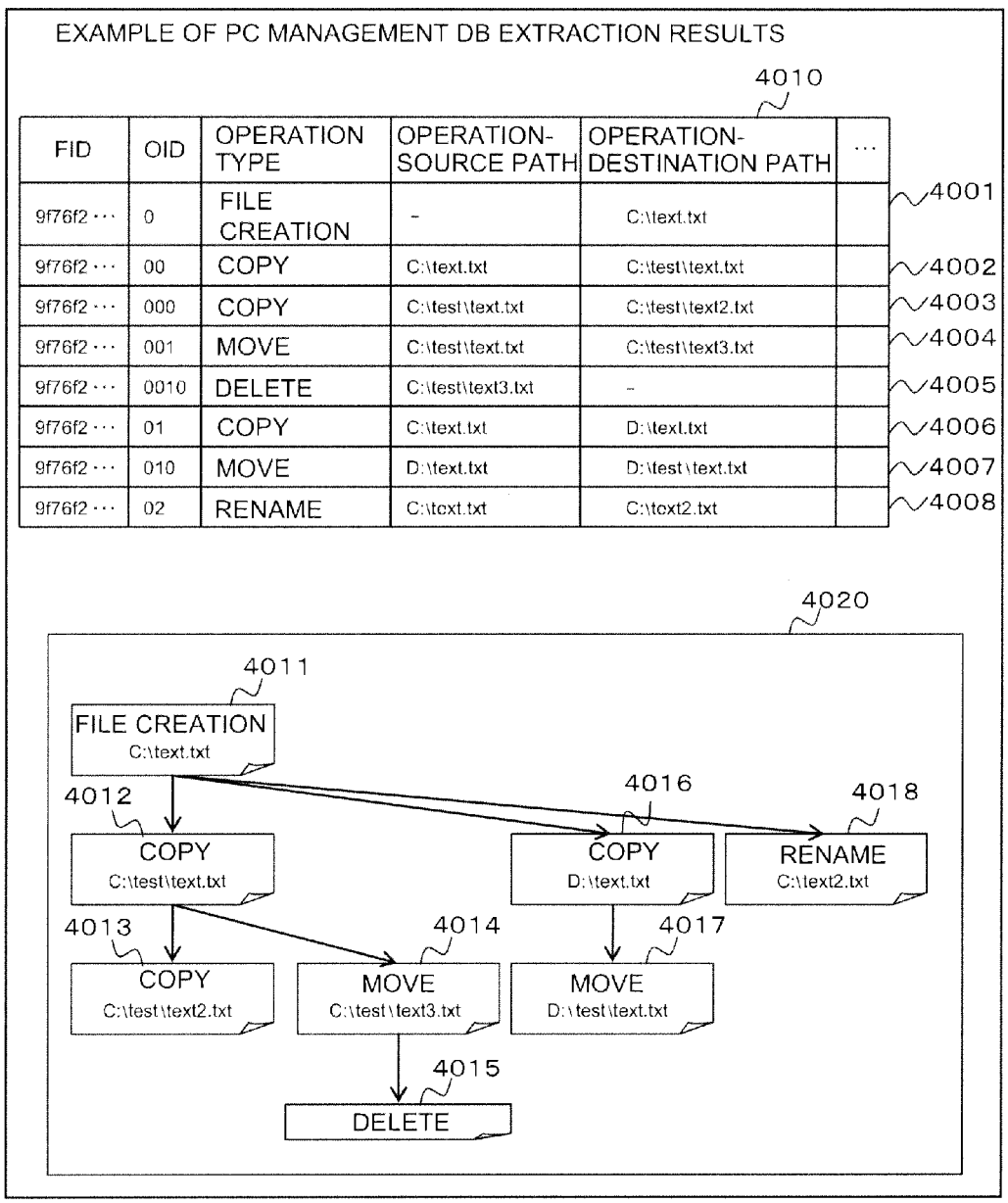
FIG. 38 shows how to display a file operation history as a tree structure based on information (information that is the same as the in-file trace information) stored in the management server.

FIG. 38 shows how to visualize a file operation history as a tree structure using management information 4001 through 4008 stored in the PC management DB. First of all, the user selects a file to be traced from among the respective operations stored in the PC management DB.

The manager 112 of the management server 111 searches the PC management DB using the file storage identifier of the file selected by the user as the search key, and extracts the record(s) comprising the selected file storage identifier. In addition, the manager 112 sorts the extracted records based on the operation identifiers. Table 4010 at the top of FIG. 38 shows the result of this sorting.

Since the results in table 4010 show the order of a Depth First Search of a tree structure, a tree structure 4020 can easily be plotted on the basis of the table 4010 results. The trace information minus the final character of the operation identifier becomes the parent trace information. For example, the parent operation (the parent operation is the operation previous to the one in question) of an operation for which the operation identifier is "0010" is the operation comprising the operation identifier "001". In the tree display screen 4020 and the table 4010, 4001 corresponds to 4011, 4002 corresponds to 4012, 4003 corresponds to 4013, 4004 corresponds to 4014, 4005 corresponds to 4015, 4006 corresponds to 4016, 4007 corresponds to 4017, and 4008 corresponds to 4018, respectively.

The monitoring of a file operation history (a file operation trace) has been explained hereinabove by focusing on the file operations in the file system 204. However, this example is not limited to file system-based file operations, but rather is also applicable to cases such as a file upload or download using a Web browser, the sending and receiving of a file using e-mail, and printing from an application program.

File operations are not limited to the file create, move, copy, rename and delete described hereinabove. For example, the following can also be managed as file operations:

(1) a file download using a web browser;
(2) a file upload using a web browser;
(3) the receiving of an e-mail with a file attachment;
(4) the saving of a file attachment;
(5) the sending of an e-mail with a file attachment; and
(6) printing.

The relationship between the operation-source file and the operation-destination file in either a file upload or download using a Web browser is as follows. Operation-source file will be abbreviated to operation source and operation-destination file will be abbreviated to operation destination here.
(1) Web browser-based file download
    (1A) operation source→download source URL (Acquired in Steps 403 and 502)
    (1B) operation destination→save-destination file path (Acquired in Steps 406 and 510)
(2) Web browser-based file upload
    (2A) operation source→upload file path (Acquired in Step 807)
    (2B) operation destination→upload destination URL Acquired in Step 808)
(3) Receiving e-mail with file attachment
    (3A) operation source→source e-mail address (Sender name in Steps 604 and 704)
    (3B) operation destination→input-source DB 393
(4) saving of file attachment
    (4A) operation source→input-source DB 393
    (4B) operation destination→save-destination file path (Acquired in Steps 609 and 709)
(5) sending of e-mail with file attachment
    (5A) operation source→send file path (Acquired in Steps 907 and 1007)
    (5B) operation destination→destination e-mail address (Sender name in Steps 904 and 1004)
(6) printing
    (6A) operation source→print-source file path (Acquired in Step 1105)

FIG. 39 shows an example of the configuration of the input-source DB 393. In FIG. 39, in a case where the client PC 121 receives an e-mail with a file attachment, the configuration is such that the input-source DB 393 is the operation source thereof, and the file storage identifier, the operation identifier, and the count can be managed by the input-source DB 393. For this reason, a file storage identifier field 4101, an operation identifier field 4102, and a count field 4103 are added to the input-source DB 393.

To trace each of the above-mentioned operations (1) through (6), the processing described using FIG. 32 is respectively executed in the step (407, 511, 611, 711) for assigning the inputidentifier, the step (809, 908, 1008, 1107) for checking and so forth whether or not the operation corresponds to the alert condition, and the step (606, 706) for registering the operation in the input-source DB 393.

Upon executing the processing of FIG. 32, the following points will differ for each of the above-mentioned operations (1) through (6).
(1) Web browser-based file download
    Since this operation is the file source operation, the determination in Step 3401 will always be "Yes".
(2) Web Browser-Based File Upload
    Since this is the source operation, the determination in Step 3401 is always "No".
    "No" is determined because the operation destination becomes a URL (external) in the check of Step 3415.
(3) Receiving of E-Mail with File Attachment
    This operation constitutes the file source operation, and as such the determination in Step 3401 will always be "Yes".

Since the operation destination is the input-source DB 393 in the processing of Step 3403, the trace information is not written to the file alternate stream, but rather the in-file trace information is stored in the input-source DB 393. Making the input-source DB 393 the operation destination is done so that the source operation (the receiving of the e-mail with a file attachment) can be identified no matter how often the file attached to the e-mail is copied in the file system 204.
(4) Saving a File Attachment
    The determination in Step 3401 is "No".
    In Step 3410, the in-file trace information is not acquired from the operation source alternate stream, but rather the in-file trace information is acquired from the input-source DB 393.
    The same is true in Step 3418, and the in-file trace information is stored in the input-source DB 393.
(5) Sending of E-Mail with File Attachment
    In Step 3401, "No" is determined.
    In Step 3415, "No" is determined because the operation destination is an e-mail address (external).
(6) Printing
    In Step 3401, "No" is determined.
    In Step 3415, "No" is determined because the operation destination is a paper medium (external).

As described above, this example is also able to manage the operations of the above-mentioned (1) through (6). FIG. 40 shows a table 4210, which has been extracted from the PC management DB in accordance with a user-selected condition, and a file operation history tree structure 4220 that was plotted on the basis of the table 4210.

Being configured like this, this example is able to efficiently manage a history of file operations. In addition, utilizing the file storage identifier and the operation identifier makes it possible to easily display the history of file operations in a tree structure.

In the case of a DB that does not comprise the file storage identifier and the operation identifier, after reading the operation-source file from the DB, the tasks of using this operation-source file to search the operation-destination file field, and using the retrieved filename to once again search the operation-source file field must be repeated many times. Therefore, the number of accesses to the DB increases significantly, and it takes time to create a table for extracting an operation history and to display a tree structure.

By contrast, in this example, the operation history of a user-selected file can be easily extracted and displayed via a tree structure by simply reading the file storage identifier and operation identifier from the PC management DB. Usability is therefore enhanced.

In addition, in this example, the file storage identifier, the operation identifier, and the count are written to the alternate stream of the file (Furthermore, as described in the first example, an access-source identifier may also be written to the alternate stream). Therefore, even in a case where the PC management DB shuts down temporarily, or a record is partially destroyed, it is possible to manage the history of file operations by reading the in-file trace information stored in the file alternate stream.

Furthermore, the configuration may also be such that the information for managing the file operation history is not stored in the file alternate stream, but rather is stored and managed in a DB inside the client PC. For example, it is also possible to monitor the operation history of a file that is inputted and outputted to the client PC using a DB of a configuration like that shown in FIG. 52.

Also, this example is not limited to the NTFS alternate stream, and, for example, an auxiliary data area like a resource fork may also be used. The auxiliary data area as a data area that attaches to a file, and is an area that becomes an operation target together with the file data when the file is put into operation. Data can be read from and written to the auxiliary data area either by using a different function than either a read function or a write function with respect to the file data, or by specifying an argument that differs from an ordinary argument with respect to either the read function or the write function.

Example 3

A third example will be explained by referring to FIGS. 41 through 51. In the first example, either a URL or an e-mail address and the full path on the file system 204 are acquired by acquiring either a Web browser user operation or a character string input to a dialog. In this example, another method is used to detect the corresponding relationship between the file path information (the full path) and either the URL or the e-mail address.

Figure 41:
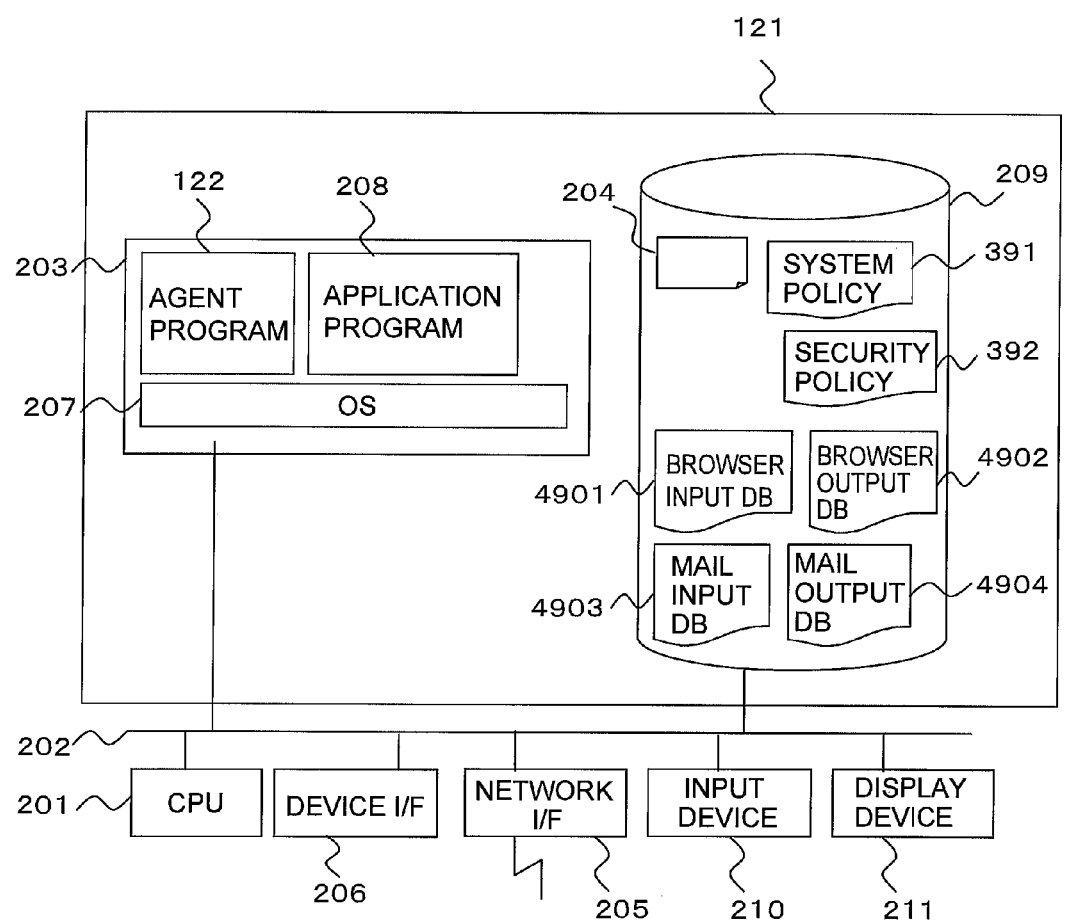
FIG. 41 shows an example of the configuration of a client computer related to a third example.

FIG. 41 shows the configuration of the client PC 121. The file system 204, the system policy 391, the security policy 392, a browser input DB 4901, a browser output DB 4902, a mail input DB 4903, and a mail output DB 4904 are stored in the disk 209.

Figure 42:
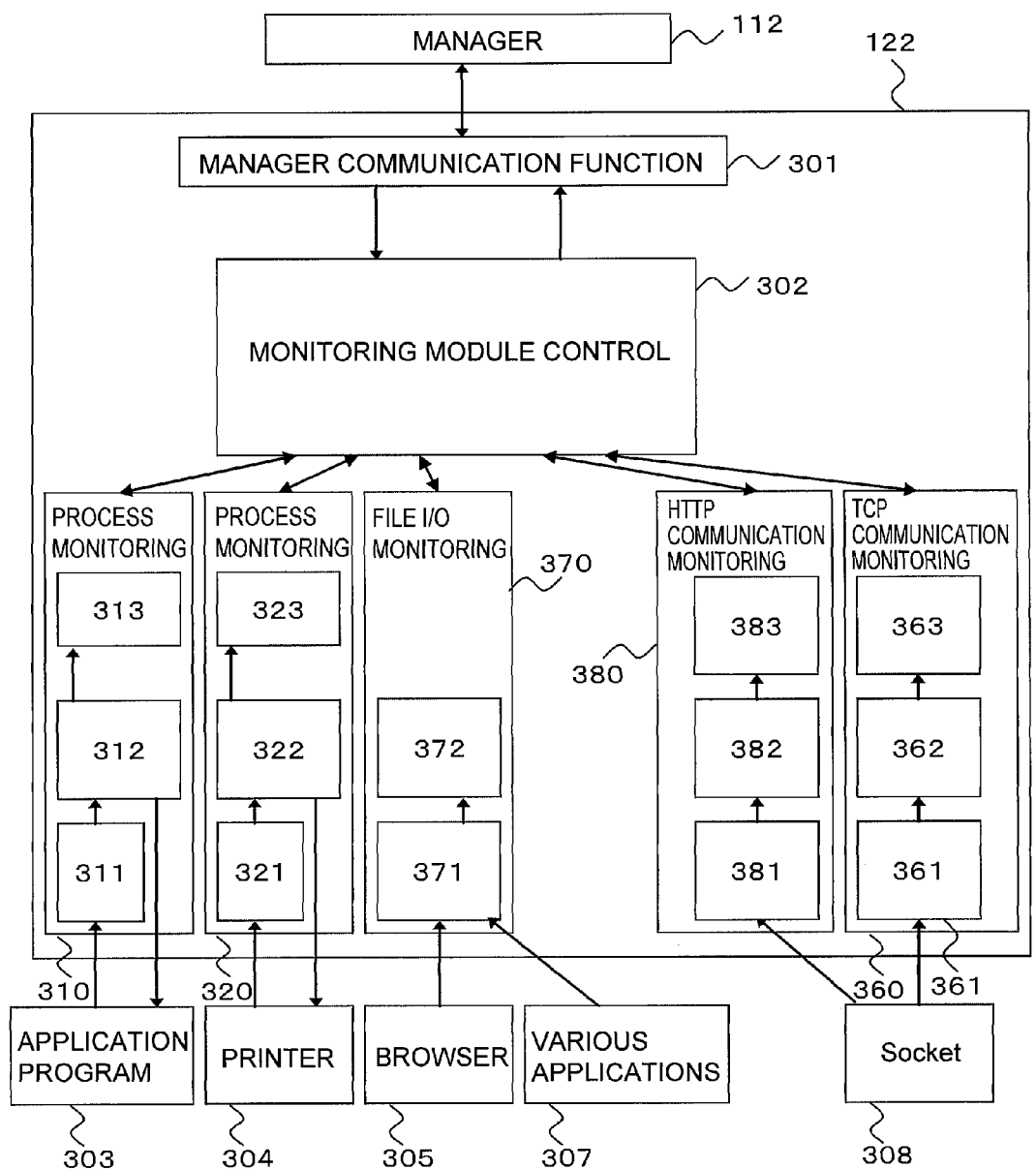
FIG. 42 shows the configuration of the agent program.

FIG. 42 shows the configuration of the agent program 122. This example comprises the process monitoring module 310, the printer monitoring module 320, a file I/O monitoring module 370, a HTTP communication monitoring module 380, and the TCP communication monitoring module 360.

The file I/O monitoring module 370 comprises a file I/O detection function 371 for detecting a file input/output that occurs in either the Web browser 305 or the various application programs, and an access-source information assigning function 372 for writing access-source information (the access-source identifier) to the file alternate stream.

The HTTP communication monitoring module 380 comprises a socket reception detection function 381 for detecting the sending and receiving of a file, a protocol analysis function 382 for analyzing the data that has been sent/received via the socket 308, and a function 383 for carrying out a registration and the assigning and checking of the access-source information. In a case where a file has been downloaded to the client PC 121 via the socket 308, the function 383, which performs registration and a notification among other things, assigns the access-source information to this file and registers same in the browser input DB 4901.

The TCP communication monitoring module 360 and the HTTP communication monitoring module 380 monitor communications on a communication network. The TCP communication monitoring module 360 monitors the outgoing and incoming e-mails (POP3/IMAP/SMTP). The HTTP communication monitoring module 380 monitors HTTP communications. The file I/O monitoring module 370 monitors a file read/write that uses a Web browser or a mailer.

In order to combine the file data that has been sent and received via a communication network with the file data that has been input/output to/from the file system 204, this example provides DBs 4901 through 4904, which use the hash values of this file data as keys.

A case in which a file is downloaded to the client PC 121 will be explained. When the user downloads a file, the download-source information (either the URL or the e-mail address) and the download data can be acquired by either the TCP communication monitoring module 360 or the HTTP communication monitoring module 380. This download-source information and the hash value of the downloaded data area are stored in the input DB (refer to FIGS. 48 and 50).

Figure 48:
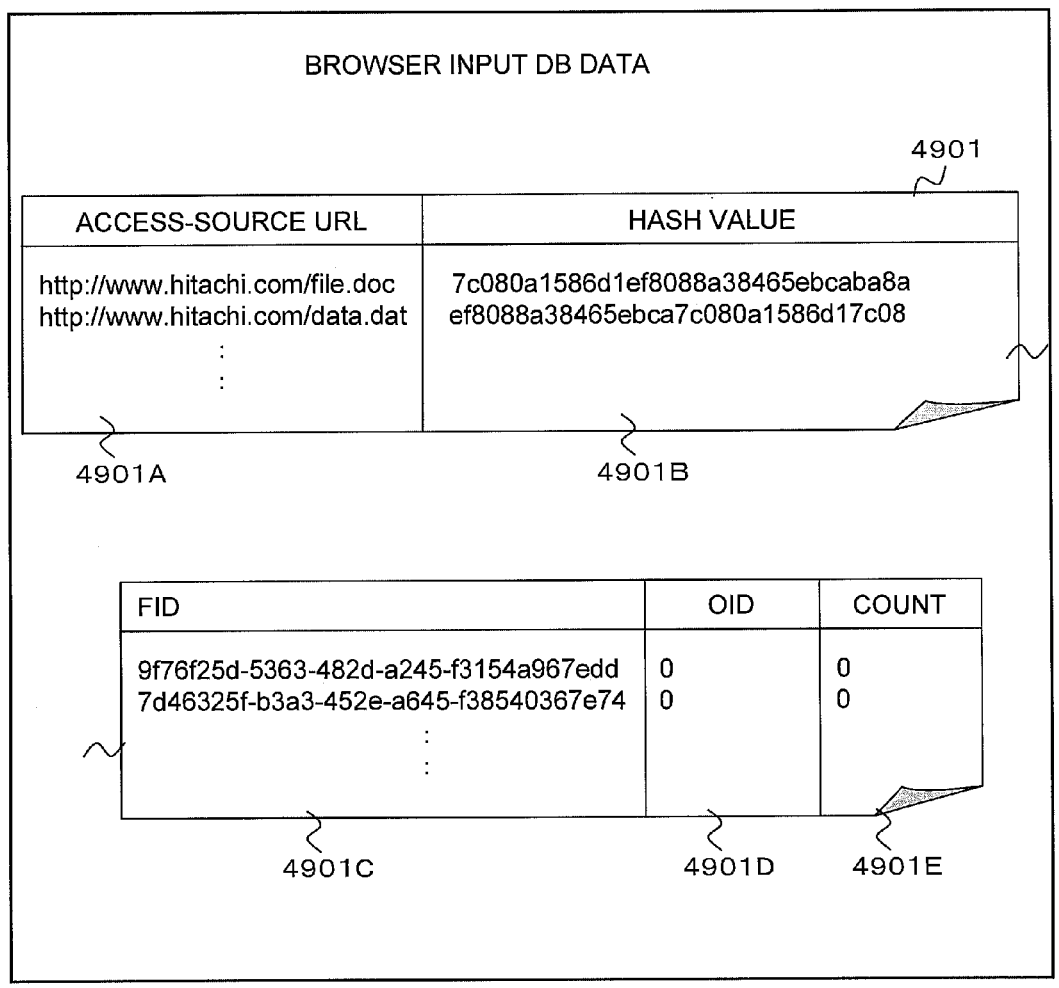
FIG. 48 shows a portion of a database that is used for monitoring the operation history of a file downloaded via a Web browser.

Refer to FIG. 48 here. FIG. 48 shows an example of the configuration of the browser input DB 4901. The browser input DB 4901 manages a file that has been downloaded via a Web browser. The browser input DB 4901, for example, comprises an access-source URL field 4901A, a hash value field 4901B, a file storage identifier field 4901C, an operation identifier field 4901D, and a count field 4901E.

A file's download-source URL is stored in the access-source URL field 4901A. A hash value computed on the basis of the data of the downloaded file is stored in the hash value field 4901B. The file storage identifier assigned to the downloaded file is stored in the file storage identifier field 4901C. The operation identifier configured in the downloaded file is stored in the operation identifier field 4901D. A count related to the downloaded file is stored in the count field 4901E. The hash value, the file storage identifier, the operation identifier, and the count are the same for another DB, which will be explained further below.

Refer to FIG. 50. FIG. 50 shows an example of the DB 4903 for managing a file (a file attached to an e-mail) that is acquired via the mailer. The mail input DB 4903, for example, comprises a filename field 4903A, a sender name field 4903B, a hash value field 4903C, a file storage identifier field 4903D, an operation identifier field 4903E, and a count field 4903F.

The name of a file attached to an e-mail is stored in the filename field 4903A. The name of the sender of the e-mail to which the file is attached is stored in the sender name field 4903B. The hash value, the file storage identifier, the operation identifier, and the count are the same as those in FIG. 48, and as such, explanations thereof will be omitted.

When either a browser or a mailer downloads a file, the downloaded file data is written to the file system of the client PC. The file I/O monitoring module 370 detects the file data write to the file system 204.

The file I/O monitoring module 370 finds the hash value of the file data stored in either the browser or the mailer, and searches to determine whether a record of the same hash value is in the input DBs 4901 or 4903 (FIGS. 48 and 50). In a case where the same hash value record exists, this record denotes the downloaded file. Therefore, the corresponding access-source information and in-file trace information are assigned to the file identified in accordance with the hash value.

Figure 51:
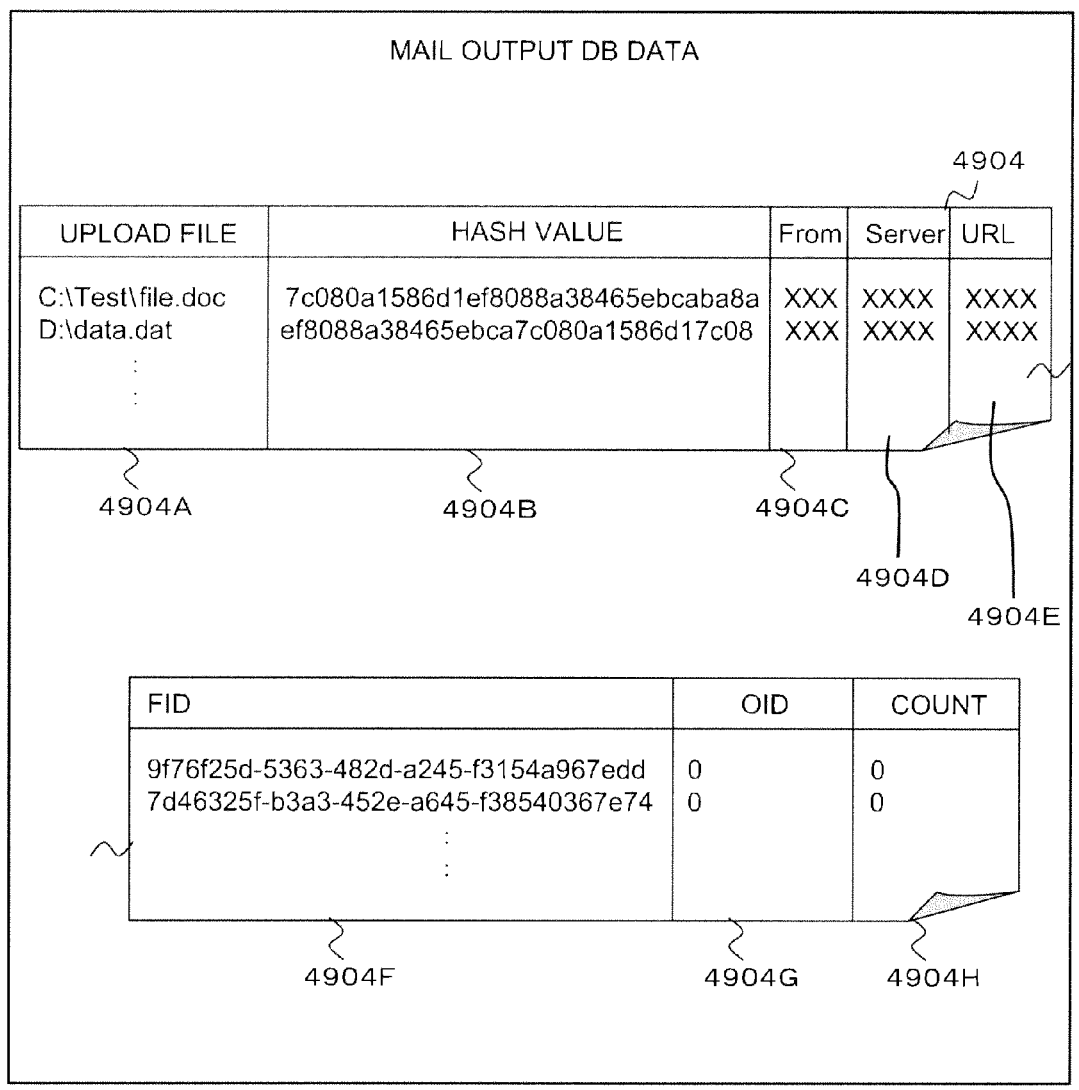
FIG. 51 shows a portion of a database that is used for monitoring the operation history of a file that is attached to an outgoing e-mail.

A case in which a file is uploaded will be explained. The user is able to use either a Web browser or an e-mail to send a file outside the client PC. Either the browser or the mailer reads the upload-target file data when the user uploads a file. The file I/O monitoring module 370 detects this file data reading. The file I/O monitoring module 370 finds the path and hash value of the file that was read by either the browser or the mailer, and stores same in the output DBs 4902 and 4904 (FIGS. 49 and 51).

Refer to FIG. 49. FIG. 49 is the DB 4902 for managing a file that has been outputted outside the client PC 121 using a browser. The browser output DB 4902, for example, comprises an upload file field 4902A, a hash value 4902B, a source field 4902C, a server field 4902D, a URL field 4902E, a file storage identifier field 4902F, an operation identifier field 4902G, and a count field 4902H.

Path information, in which the path information of the uploaded file denotes the storage destination of the uploaded file, is stored in the upload file field 4902A. The name of the user, who uploaded the file, is stored in the source field 4902C. The name of the upload-destination server is stored in the server field 4902D. The upload-destination URL is stored in the URL field 4902E.

When either the browser or the mailer reads the file data, this file data is uploaded. Either the TCP communication monitoring module 360 or the HTTP communication monitoring module 380 detects the file upload.

Either the TCP communication monitoring module 360 or the HTTP communication monitoring module 380 acquires the data of the file to be uploaded, and finds the hash value thereof. Either the TCP communication monitoring module 360 or the HTTP communication monitoring module 380 searches to determine whether a record comprising the same hash value as the hash value that was found is in the output DBs 4902 and 4904. In a case where a record having the same hash value exists, it is possible to determine that the user uploaded the file. In a case where the determination is that the file was uploaded, as described using the first example, a check of whether or not an alert condition is satisfied, the sending of an alert, and an in-file trace information operation are performed.

Figure 43:
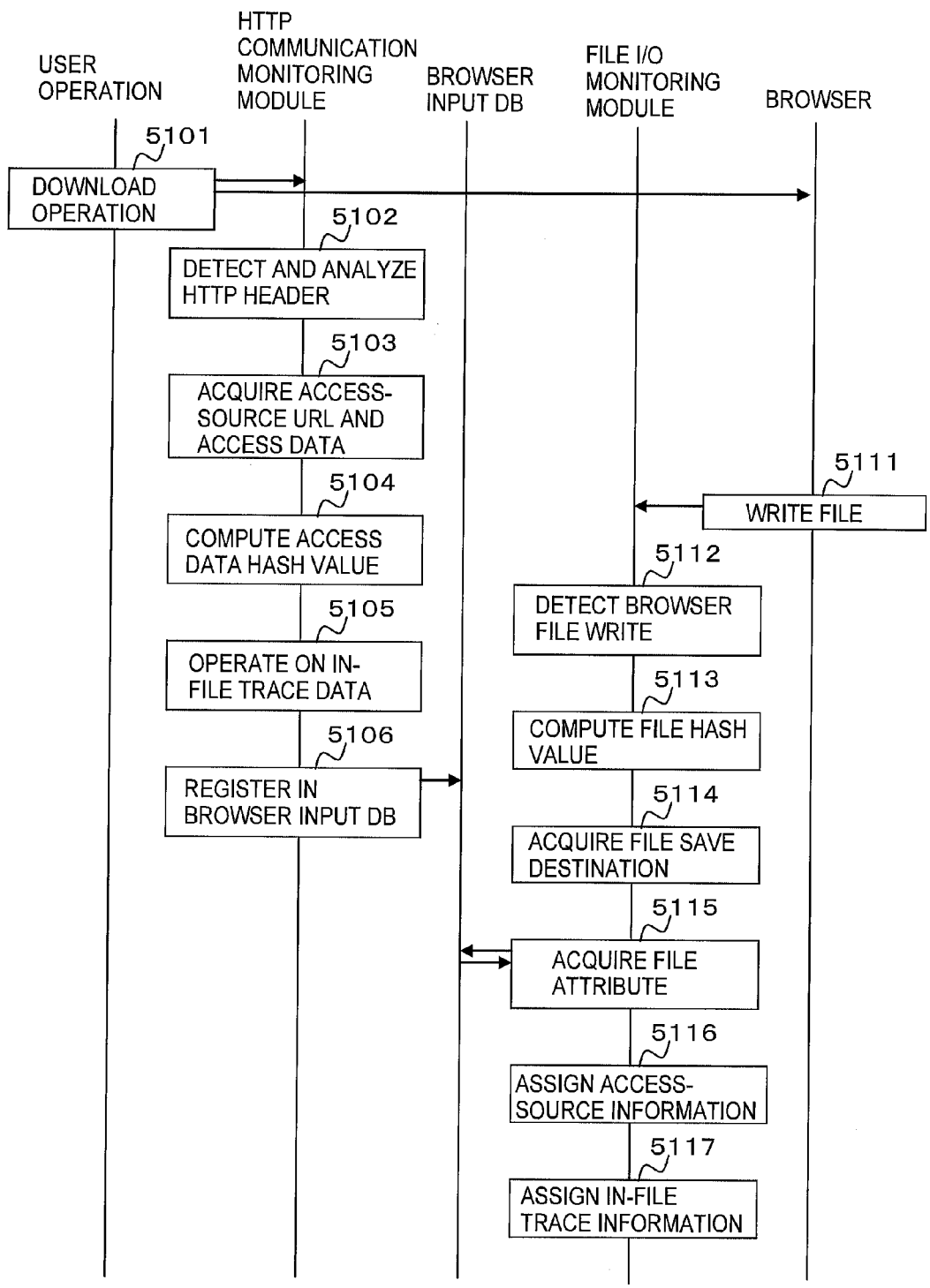
FIG. 43 shows a monitoring sequence in a case where a Web browser is used to download a file.

Refer to FIG. 43. FIG. 43 shows a sequence of steps for a case in which a file is downloaded using a browser.

Figure 44:
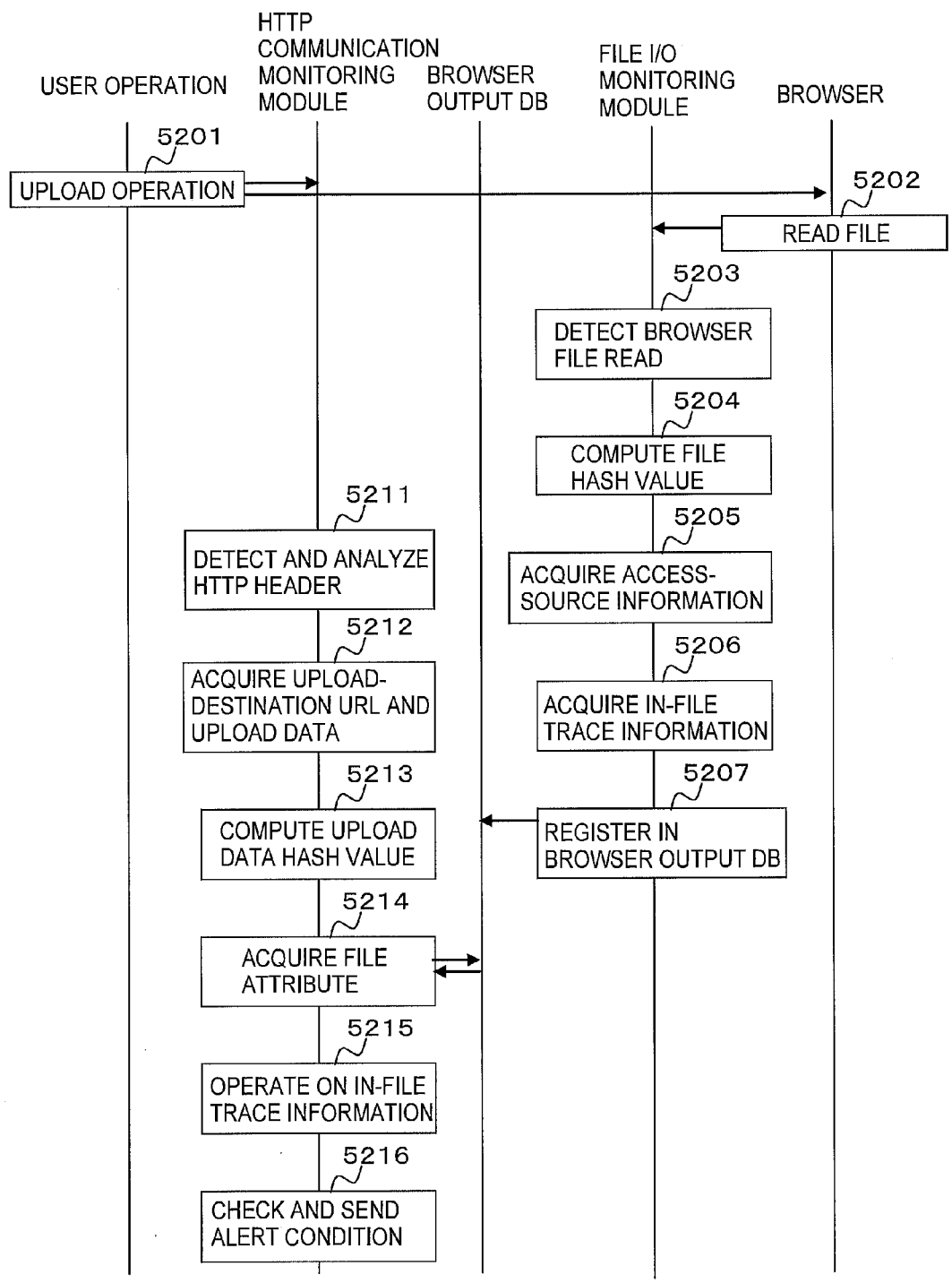
FIG. 44 shows a monitoring sequence in a case where a Web browser is used to upload a file.

The user uses the browser to start the file download (5101). The HTTP communication monitoring module detects the HTTP communication header, and analyzes this header (5102). When the result of the analysis is a receive operation, Step 5103 and subsequent steps are executed. In the case of a send operation, Step 5212 and subsequent steps of FIG. 44 are executed.

The HTTP communication monitoring module acquires the access-source URL and access data (the downloaded file) from the results of the analysis in Step 5102 (5103). The HTTP communication monitoring module computes the hash value of the access data acquired in Step 5103 (5104). The HTTP communication monitoring module performs the in-file trace information operation shown in FIG. 32 (5105). New in-file trace information is created here because the file download was via the browser. The HTTP communication monitoring module stores the access-source URL, the access data hash value, and the in-file trace information in the browser input DB 4901 (5106).

When the file download starts, the browser receives the download data from the socket 308, and writes the download data to the file system 204 (5111).

The file I/O monitoring module detects the operation in Step 5111 using a method such as an API (Application Programming Interface) hook (5112). The file I/O monitoring module finds the hash value of the data that the browser wrote to the file system 204 (5113). The file I/O monitoring module acquires the browser-based file write destination path (5114).

The file I/O monitoring module uses the hash value found in Step 5113 as a search key to search the browser input DB 4901. In a case where a record comprising the same hash value is found, the file being managed in accordance with this record is the user downloaded file. Accordingly, the file I/O monitoring module acquires the file attributes (the access-source URL and the file operation trace information) from the browser input DB 4901, and executes Step 5116 and subsequent steps.

In a case where a record comprising the same hash value as the hash value of the downloaded file is not found, this processing ends since a file write did not occur in accordance with the user download operation.

The file I/O monitoring module writes the access-source information (1311 of FIG. 13) to the alternate stream of the file discovered on the basis of the hash value (5116). In addition, the file I/O monitoring module writes the in-file trace information (3201 of FIG. 30) to the file alternate stream (5117).

FIG. 44 is a sequence of steps showing a file upload process via a browser. When the user uses the browser to start a file upload (5201), the browser reads the upload-target file (5202).

The file I/O monitoring module detects the operation of Step 5202 using an API hook or other such method (5203). The file I/O monitoring module finds the hash value of the file that the browser read (5204). The file I/O monitoring module acquires the access-source information from the file alternate stream (5205). In addition, the file I/O monitoring module acquires the in-file trace information from the file alternate stream (5206). The file I/O monitoring module stores the file path, the file hash value, the access-source information, and the in-file trace information in the browser output DB 4902 (FIG. 49).

The browser, upon completing the read of the upload file, uploads the file via the socket 308. This send operation is detected by the HTTP communication monitoring module (5211). The HTTP communication monitoring module analyzes the HTTP header (5211), and in the case of a send operation, executes Step 5212 and subsequent steps. In the case of a receive operation, the HTTP communication monitoring module executes 5103 and subsequent steps of FIG. 43.

The HTTP communication monitoring module acquires the upload-destination URL and the upload data from the results of the header analysis in Step 5211 (5212). The HTTP communication monitoring module computes the hash value of the upload data acquired in Step 5212 (5213).

The HTTP communication monitoring module searches the browser output DB 4902 on the basis of the hash value found in Step 5213, and acquires a record comprising the same hash value as the hash value of the uploaded file. In a case where the same hash value record is found, the file being managed by this record is the file that was uploaded by the user. Therefore, the HTTP communication monitoring module acquires the file attributes (the file path, the access-source information, and the file operation trace information (the FID, the OID, and the count)) from this record (5214), and executes Step 5215 and subsequent steps. In a case where the same hash value recorded is not found, this processing is ended since the communication was by a program other than the monitoring-target browser.

The HTTP communication monitoring module operates on the in-file trace information with respect to the file detected on the basis of the hash value (5215). In addition, the HTTP communication monitoring module checks whether or not the browser-based file upload satisfies the alert condition, and sends an alert as needed (5216).

Figure 45:
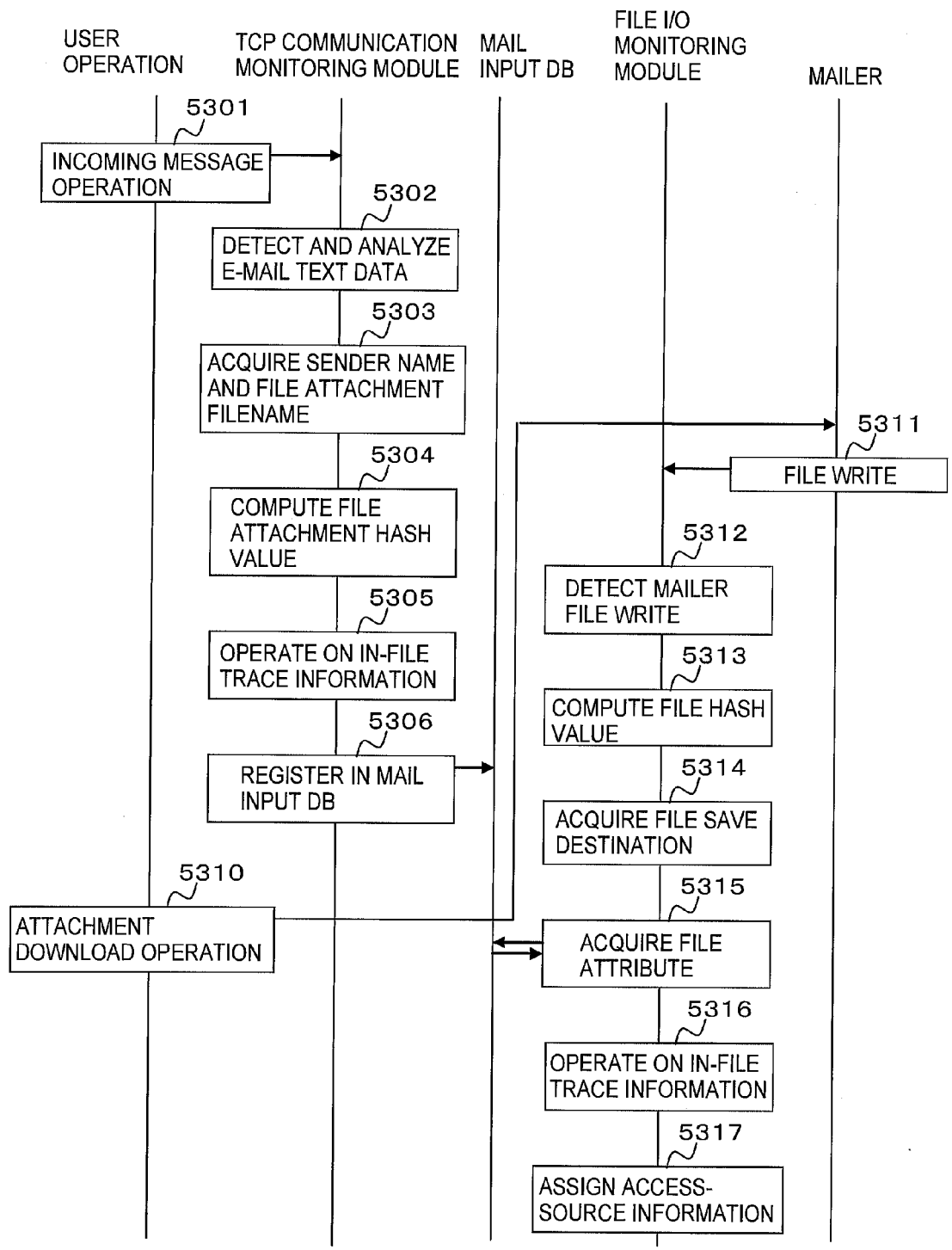
FIG. 45 shows a monitoring sequence in the case of an incoming e-mail.

FIG. 45 is a sequence of steps related to receiving a file using the mailer and saving the received file. When the user uses the mailer to start receiving an e-mail (5301), the TCP communication monitoring module detects the TCP communication header and analyzes this header (5302).

In a case where the result of the analysis is that a file is attached to the incoming e-mail, the TCP communication monitoring module executes Step 5303 and subsequent steps. Furthermore, in a case where the file attached to the e-mail is to be sent, the TCP communication monitoring module executes 5412 and subsequent steps of FIG. 44. In a case where either the e-mail that is sent/received does not have a file attachment, or it is a communication other than a mail send/receive, this processing is ended.

The TCP communication monitoring module acquires the e-mail sender name, the file attachment filename, and the file attachment data from the results of the analysis of Step 5302

(5303). Next, the TCP communication monitoring module computes the hash value of the file attachment data acquired in Step 5303 (5304).

The TCP communication monitoring module carries out the in-file trace information operation shown in FIG. 32 (5305). New in-file trace information is created because an e-mail with a file attachment has been received. The TCP communication monitoring module stores the file attachment filename, the sender name, the hash value of the file attachment data, and the in-file trace information in the mail input DB 4903 (FIG. 50) (5306).

When the user carries out an operation for saving the file that is attached to the e-mail (5310), the mailer writes the file attachment to the file system 204 (5311).

The file I/O monitoring module detects the operation of Step 5311 using an API hook or other such method (5312). The file I/O monitoring module finds the hash value of the file data written by the mailer (5313). In addition, the file I/O monitoring module acquires the path to the destination into which the mailer has written the file (5314).

The file I/O monitoring module searches the mail input DB 4903 (FIG. 50) based on the hash value determined in Step 5313. In a case where a record, which has the same hash value as the hash value of the file written to the file system by the mailer, is found, the file corresponding to this record is the file that was attached to the e-mail. Accordingly, the file I/O monitoring module acquires the file attributes (the file attachment filename, the sender name, and the file operation trace information) from this record (5315), and executes Step 5316 and subsequent steps.

In a case where a same hash value record is not found, this processing is ended because the file write of Step 5311 is not the file write that occurred in the file attachment download operation (5310).

The file I/O monitoring module performs an in-file trace information operation (5316). In the in-file trace information operation process, the file operation trace information is written to the alternate stream of the saved file (the file that was attached to the e-mail and stored in the file system 204) (5316). In addition, the file I/O monitoring module assigns the access-source information (1311 of FIG. 13) to the alternate stream of the saved file.

Figure 46:
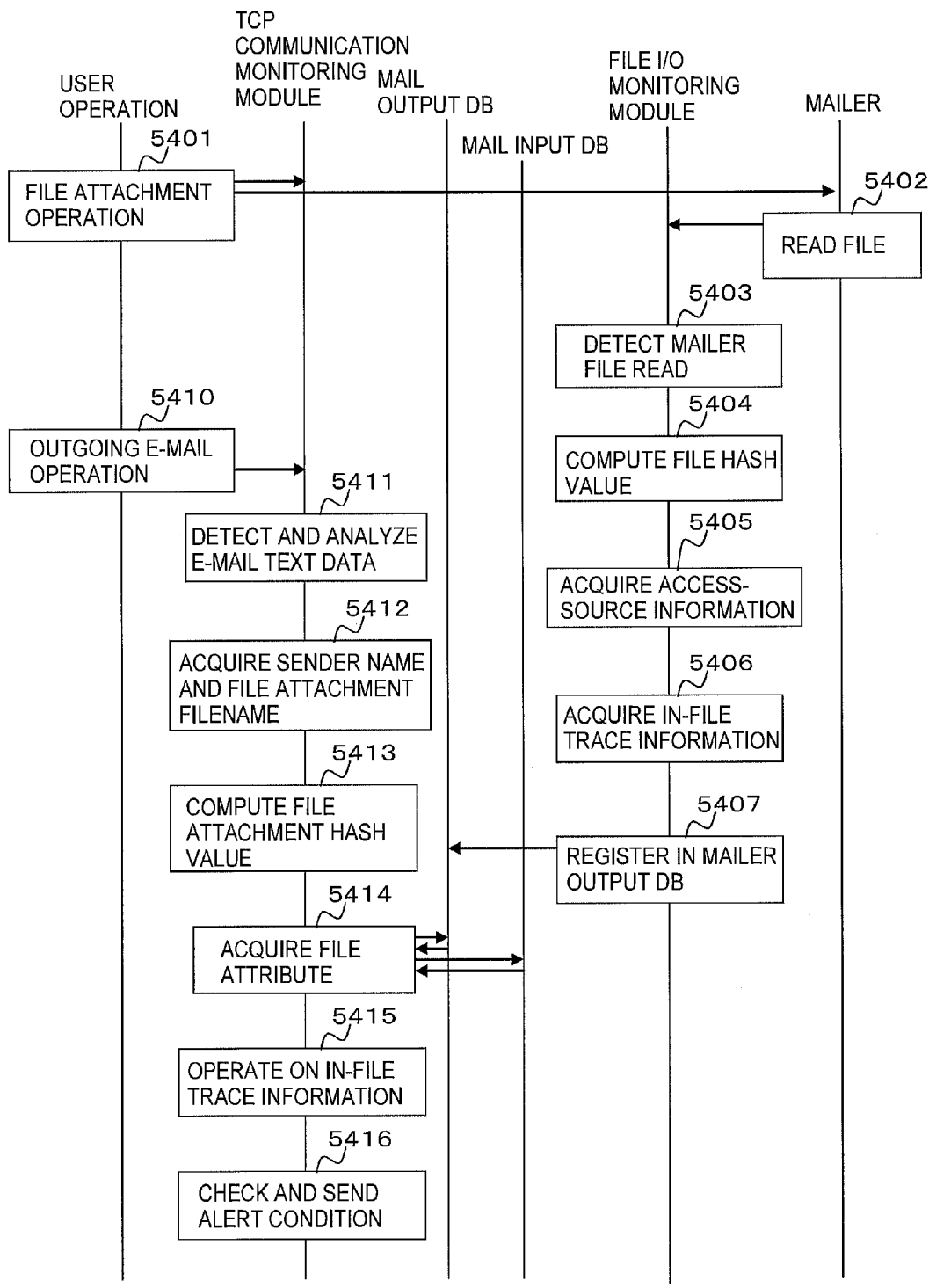
FIG. 46 shows a monitoring sequence in the case of an outgoing e-mail.

FIG. 46 shows a sequence of steps in a case where a file is attached to an e-mail and sent. When the user uses the mailer to attach a file to an e-mail (5401), the mailer reads the file to be attached to the e-mail from the file system 204 (5402).

The file I/O monitoring module detects the file write of Step 5402 using an API hook or other such method (5403). The file I/O monitoring module finds the hash value of the mailer-read file (5404). The file I/O monitoring module acquires the access-source information from the file alternate stream (5405). The file I/O monitoring module acquires the in-file trace information from the file alternate stream (5406). The file I/O monitoring module stores the file path, the file hash value, the access-source information, and the in-file trace information in the mail output DB 4904 (FIG. 51) (5407).

When the user sends the e-mail to which the file is attached (5410), the mailer sends the file-attached e-mail via the socket 308. The TCP communication monitoring module detects this outgoing e-mail and analyzes the TCP header (5411). In a case where the file-attached e-mail has been sent, the TCP communication monitoring module executes Step 5412 and subsequent steps. Furthermore, in a case where the file-attached e-mail has been received, the TCP communication monitoring module executes 5303 and subsequent steps of FIG. 45. In a case where an e-mail to which a file is not attached is either sent or received, or the case of a communication other than a mail send/receive, this processing is ended.

The TCP communication monitoring module acquires the destination e-mail address and the data of the file attached to the e-mail from the header analysis results of Step 5411 (5412). The TCP communication monitoring module computes the hash value of the file data acquired in Step 5412 (5413).

The TCP communication monitoring module searches the mail output DB 4904 and the mail input DB 4903 based on the hash value determined in Step 5413, and acquires the file attribute (5414). The reason for searching the mail output DB 4904 and the mail input DB 4903 will be explained further below.

The TCP communication monitoring module operates on the in-file trace information with respect to the file detected on the basis of the hash value (5414), checks the alert condition, and sends an alert as needed (5416).

Figure 47:
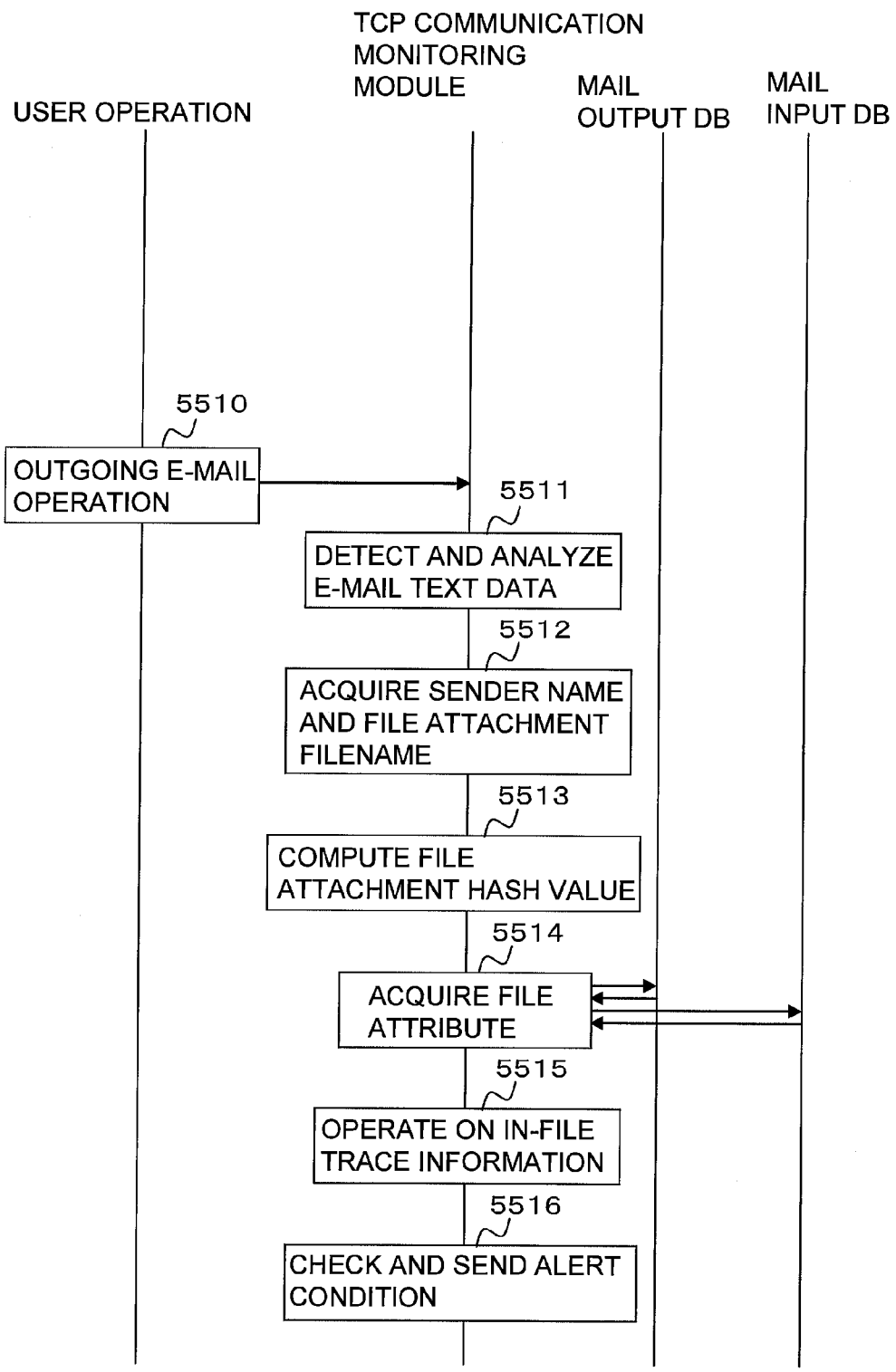
FIG. 47 shows a monitoring sequence in a case where an e-mail is transferred.

FIG. 47 shows a sequence of steps in a case where an e-mail to which a file has been attached is transferred. The processing in a case where the file-attached e-mail is transferred is the same processing as that from Step 5410 through Step 5416 shown in FIG. 46. That is, since Steps 5510 through 5516 of FIG. 47 are the same as Steps 5410 through 5416 of FIG. 46, an explanation will be omitted.

The reason for searching both the mail output DB 4904 and the mail input DB 4903 in Step 5414 of FIG. 46 will be explained. In a case where the user attaches a file to an e-mail and sends this e-mail (FIG. 46), a record is stored in the mail output DB 4904.

Alternatively, in a case where a file-attached e-mail has been transferred (FIG. 47), the user receives this e-mail prior to the e-mail transfer (FIG. 45). In a case where the mailer of the client PC 121 has received the file-attached e-mail, a record is stored in the mail input DB 4903.

The TCP communication monitoring module is simply monitoring the communication, and is not able to make a determination as to whether the monitored communication is the communication (mail send) corresponding to FIG. 46 or the communication (mail transfer) corresponding to FIG. 47. Accordingly, in this example, both the mail output DB 4904 and the mail input DB 4903 are searched in both cases regardless of whether it is a mail send or a mail transfer.

Being configured like this, this example monitors communications between the client PC and the network, and, in addition, monitors the input/output to/from the file system. Then, the file is identified by comparing the hash value of the file detected in the communication with the hash value of the file being managed in the file system. The access-source information and the in-file trace information are associated with the identified file.

Therefore, compared to a configuration that identifies a file either based on a user operation via the browser or based on a character string inputted to a dialog, this example is able to identify a file relatively easily, and to associate path information, or an e-mail address or a URL with the file.

For example, the type of browser that the user is using may change, or the browser may be upgraded. Furthermore, there may also be cases in which the configuration of a dialog changes in accordance with an upgraded version of an application program, or a completely new application program may be installed in the client PC 121. To deal with these environment changes, the computer program for acquiring the path from either the browser or the dialog must be adjusted frequently by hand, making it troublesome to maintain this system. By contrast, in this example, a communication monitoring result and the result of system input/output monitoring are associated with a common hash value. Therefore, the impact of changes in the environment like those described above can be minimized, and this system can be maintained and operated relatively easily. Furthermore, this example can be combined with either the first example or the second example.

Furthermore, the present invention is not limited to the above-described examples. A person having ordinary skill in the art will be able to make various additions or changes within the scope of the present invention. For example, the second example may also be combined with the first example, and a configuration that is independent of the first example may also be used. That is, it is possible to manage a file operation history and visualize same using a tree structure either inside a single client PC or inside a group comprising multiple client PCs.

REFERENCE SIGNS LIST

111 Management server
114 Mail server
115 File server
116 In-house Web server
121 Client PC
122 Agent program
123 Network printer
204 Local file system
310 Process monitoring module
320 Printer monitoring module
330 Browser monitoring module
340 Dialog operation monitoring module
350 File operation monitoring module
360 TCP communication monitoring module
370 File I/O monitoring module
380 HTTP Communication monitoring module
393 Access-source DB
1311 Access-source identifier
3201 In-file trace information

The invention claimed is:

1. A management method for a computer system, which includes a client computer for storing a file, and a management apparatus for managing the client computer, the method comprising:
    storing, in the client computer and in management information of the management apparatus, meta-information related to an operation on the file, the meta-information comprising meta-information related to an operation-source file and/or meta-information related to an operation-destination file;
    acquiring the meta-information related to the operation-source file from the client computer when the file is put into operation;
    creating meta-information related to the operation-destination file based on the meta-information related to the operation-source file;
    storing, in the client computer and in the management information, the meta-information related to the operation-destination file;
    updating the meta-information related to the operation-source file, which is stored in the client computer, in accordance with operation content of the operation-source file; and
    detecting a file operation history of the operation-source file and/or the operation-destination file based on the management information;
    storing the meta-information for the file in an alternate stream of the file;
    storing information corresponding to the meta-information related to the operation-source file and/or the operation-destination file in the management apparatus; and
    outputting the detected operation history in a tree structure so as to display relationships between files,
    wherein the client computer is configured to store meta-information related to the operation-source file and/or the operation-destination file in a predetermined area inside the file,
    wherein the meta-information related to the operation-source file and/or the operation-destination file comprises file storage identification information, operation generation information, and copy count information,
    wherein the operation generation information is configured such that a number of digits increases each time the operation-source file is put into operation, and
    wherein the method further comprises:
        when an operation to the operation-source file comprises copying the operation-source file to the operation-destination file,
            (a) incrementing the copy count information in the meta-information related to the operation-source file, and
            (b) configuring the operation generation information included in the meta-information related to the operation-destination file based on the operation generation information and the copy count information included in the meta-information related to the operation-source file.

2. The computer system management method according to claim 1,
    wherein the file storage identification information comprises identification information configured in the file when the file is stored in a file system of the client computer, and which provides for identifying the file,
    wherein the operation generation information comprises information denoting a number of times the file has been put into operation, and
    wherein the copy count information denotes a frequency with which the file has been copied.

3. The computer system management method according to claim 1, wherein:
    when the number of digits with respect to the operation generation information has reached a predetermined value, the operation generation information related to the operation-destination file is not updated until an output destination of the operation-destination file is determined to be a predetermined output destination even when the operation-source file has been put into operation, and
    when the output destination of the operation-destination file has been determined to be the predetermined output destination, the operation generation information related to the operation-destination file is updated.

4. The computer system management method according to claim 3, wherein, when a value of the copy count information has reached another predetermined value, a predetermined code is added to the operation generation information included in the meta-information related to the operation-destination file when the output destination of the operation-destination file has been determined to be the predetermined output destination.

5. The computer system management method according to claim 4, wherein, when the operation history is detected, respective records of the management information are collected together for each respective piece of file storage identification information, and the operation history is detected by sorting the respective records of each of the respective pieces of file storage identification information based on the operation generation information.

6. The computer system management method according to claim 5, wherein the operation history is displayed and outputted as a tree structure.

7. The computer system management method according to claim 6, wherein the computer system comprises an illegal operation detection system for detecting an illegal operation, the illegal operation detection system comprising:
   a monitoring apparatus configured to perform:
      treating a client computer microprocessor as a monitoring target,
      monitoring an operation with respect to information on a screen of an output apparatus that is coupled to the monitoring target;
      responding to an operation for inputting information to the monitoring target;
      identifying an access source of input information to be inputted to the monitoring target;
      assigning to the input information an identifier for denoting the access source of this input information;
      responding to an operation for outputting information from the monitoring target;
      identifying an output destination of output information to be outputted from the monitoring target;
      retrieving an identifier denoting the access source of the output information;
      determining whether a combination of the output destination of the identified output information and the access source of the retrieved output information conforms to an illegal operation condition, and in accordance with the result of this determination;
      creating an alert; and
   a management terminal configured to treat the monitoring apparatus as a management target and to manage a monitoring result of the monitoring apparatus.

8. A client computer, which is managed by a management apparatus, the management apparatus comprising:
   a communication interface configured to communicate with the client computer;
   a memory configured to store management information and a management program the client computer; and
   a microprocessor configured to manage the client computer based on the management information stored in the memory by reading and executing the management program stored in the memory, and
   the client computer comprising:
   another communication interface configured to communicate with the management apparatus via the communication interface of the management apparatus;
   a file system configured to store a plurality of files;
   another memory configured to store another management program; and
   another microprocessor configured to manage meta-information related to the respective files by reading and executing the other management program,
   wherein the another microprocessor is configured to:
   store, in other management information and the management information of the management apparatus, the meta-information related to an operation with respect to a file stored in the file system;
   acquire meta-information related to an operation-source file from the other management information when a file stored in the file system is put into operation;
   store the meta-information for the file in an alternate stream of the file;
   create meta-information related to an operation-destination file based on the meta-information related to the operation-source file;
   store in the other management information and the management information of the management apparatus the meta-information related to the operation-destination file;
   store information corresponding to the meta-information related to the operation-source file and/or the operation-destination file in the management apparatus;
   update the meta-information related to the operation-source file stored in the other management information in accordance with the operation content of the operation-source file;
   detect an operation history of the operation-source file and/or the operation-destination file based on the management information; and
   output the operation history that has been detected in a tree structure so as to display relationships between files,
   wherein the other management information is disposed in either the file or the memory,
   wherein the meta-information includes:
   file storage identification information, which is identification information that is configured in the file when the file is stored in the file system, and provides for identifying the file,
   operation generation information denoting a frequency corresponding to a number of times that the file has been put into operation, and
   copy count information denoting a file copy frequency,
   wherein the operation generation information is configured such that a number of digits for the operation generation information increases each time the operation-source file is put into operation, and
   wherein the operation generation information included in the meta-information related to the operation-destination file is configured based on the operation generation information and the copy count information included in the meta-information related to the operation-source file.

9. The client computer according to claim 8, wherein, when the number of digits with respect to the operation generation information has reached a predetermined value, the operation generation information related to the operation-destination file is not updated until an output destination of the operation-destination file is determined to be a predetermined output destination even when the operation-source file has been put into operation, and
   when the output destination of the operation-destination file has been determined to be the predetermined output destination, the operation generation information related to the operation-destination file is updated.

10. The client computer according to claim 9, wherein the client computer is configured to:
   create a first hash value for identifying a first file based on data of the first file input/output to/from the file system,
   create a second hash value for identifying a second file based on data of the second file input/output via the other communication interface,
   compare the first hash value and the second hash value, and
   when the first hash value and the second hash value match, determine that the first file and the second file are the same and associate path information denoting the first file with the second file such that either the meta-information related to the first file is associated with the second file or the meta-information related to the second file is associated with the first file.

11. The client computer according to claim 8, wherein the operation generation information is configured such that a number of digits increases each time the operation-source file is put into operation, and wherein the client computer is configured to:
when an operation to the operation-source file comprises copying the operation-source file to the operation-destination file,
(a) increment the copy count information in the meta-information related to the operation-source file, and
(b) configure the operation generation information included in the meta-information related to the operation-destination file based on the operation generation information and the copy count information included in the meta-information related to the operation-source file.

* * * * *